US006968513B1

(12) United States Patent
Rinebold et al.

(10) Patent No.: US 6,968,513 B1
(45) Date of Patent: Nov. 22, 2005

(54) ON-LINE LOCALIZED BUSINESS REFERRAL SYSTEM AND REVENUE GENERATION SYSTEM

(75) Inventors: Walter A. Rinebold, Addison, IL (US); Robert G. Deeds, Jr., Villa Park, IL (US)

(73) Assignee: ShopNTown.com, Inc., Villa Park, IL (US)

( * ) Notice: Subject to any disclaimer, the term of this patent is extended or adjusted under 35 U.S.C. 154(b) by 0 days.

(21) Appl. No.: 09/527,734

(22) Filed: Mar. 17, 2000

Related U.S. Application Data

(60) Provisional application No. 60/124,966, filed on Mar. 18, 1999.

(51) Int. Cl.[7] .............................................. G06F 13/00
(52) U.S. Cl. ...................................... 715/854; 715/743
(58) Field of Search ................................ 715/854, 817, 715/816, 818–820, 802, 748–749, 762–763, 751, 741–743, 747, 708, 712–714; 345/749, 760, 853–855, 739–740, 711–714, 748, 703, 707–713, 738, 741–743, 744–747, 811; 705/14, 27, 23; 707/10, 13, 200, 500, 505

(56) References Cited

U.S. PATENT DOCUMENTS

| | | | | |
|---|---|---|---|---|
| 5,710,886 A | | 1/1998 | Christensen et al. ........... | 705/14 |
| 5,727,163 A | | 3/1998 | Bezos .......................... | 705/27 |
| 5,761,648 A | | 6/1998 | Golden et al. ................. | 705/14 |
| 5,794,207 A | | 8/1998 | Walker et al. ................. | 705/27 |
| 5,930,474 A | | 7/1999 | Dunworth et al. ........... | 345/853 |
| 5,960,409 A | * | 9/1999 | Wexler ......................... | 705/14 |
| 5,974,398 A | * | 10/1999 | Hanson et al. ................ | 705/14 |
| 6,029,141 A | | 2/2000 | Bezos et al. ................. | 345/741 |
| 6,035,280 A | | 3/2000 | Christensen .................. | 705/14 |
| 6,035,330 A | | 3/2000 | Astiz et al. .................. | 704/218 |
| 6,118,449 A | * | 9/2000 | Rosen et al. ................. | 345/741 |
| 6,427,140 B1 | * | 7/2002 | Ginter et al. ................. | 705/80 |
| 6,487,538 B1 | * | 11/2002 | Gupta et al. .................. | 705/14 |
| 6,601,103 B1 | * | 7/2003 | Goldschmidt Iki et al. . | 709/231 |
| 6,615,183 B1 | * | 9/2003 | Kolls .......................... | 705/26 |
| 6,629,135 B1 | * | 9/2003 | Ross et al. ................... | 709/218 |
| 6,671,736 B2 | * | 12/2003 | Virine et al. ................. | 709/238 |
| 6,677,894 B2 | * | 1/2004 | Sheynblat et al. ........ | 342/357.1 |

FOREIGN PATENT DOCUMENTS

EP       1 061 465 A2 *   6/2000   ........... G06F/17/60

OTHER PUBLICATIONS

Trinity Mirror PLC, "Trinity Mirror Announces Major Investment in Internet Strategy" Mar. 2000, Trinity Mirror Press Release 2000, United Kingdom.*

* cited by examiner

*Primary Examiner*—Steven Sax
(74) *Attorney, Agent, or Firm*—Patzik, Frank & Samotny Ltd.

(57) ABSTRACT

An online interactive system comprising a business referral and income generation system linked to one or more listed web sites of businesses in a particular locality or geographical area. Revenue is generated by way of such methods as: Merchants listing their web sites in one or more web site directories for multiple communities; banner ads; local and national coupons issued by merchants; classified job listings; classified realty listings; "4 Sale" ads; and fees for supplemental services called "Extended Services" serving to provide interactive capabilities to static web sites. The system enables quicker and substantially automated and on-line self-posting, design, selection, updating and payment for listings, ads and coupons, among other things.

55 Claims, 74 Drawing Sheets

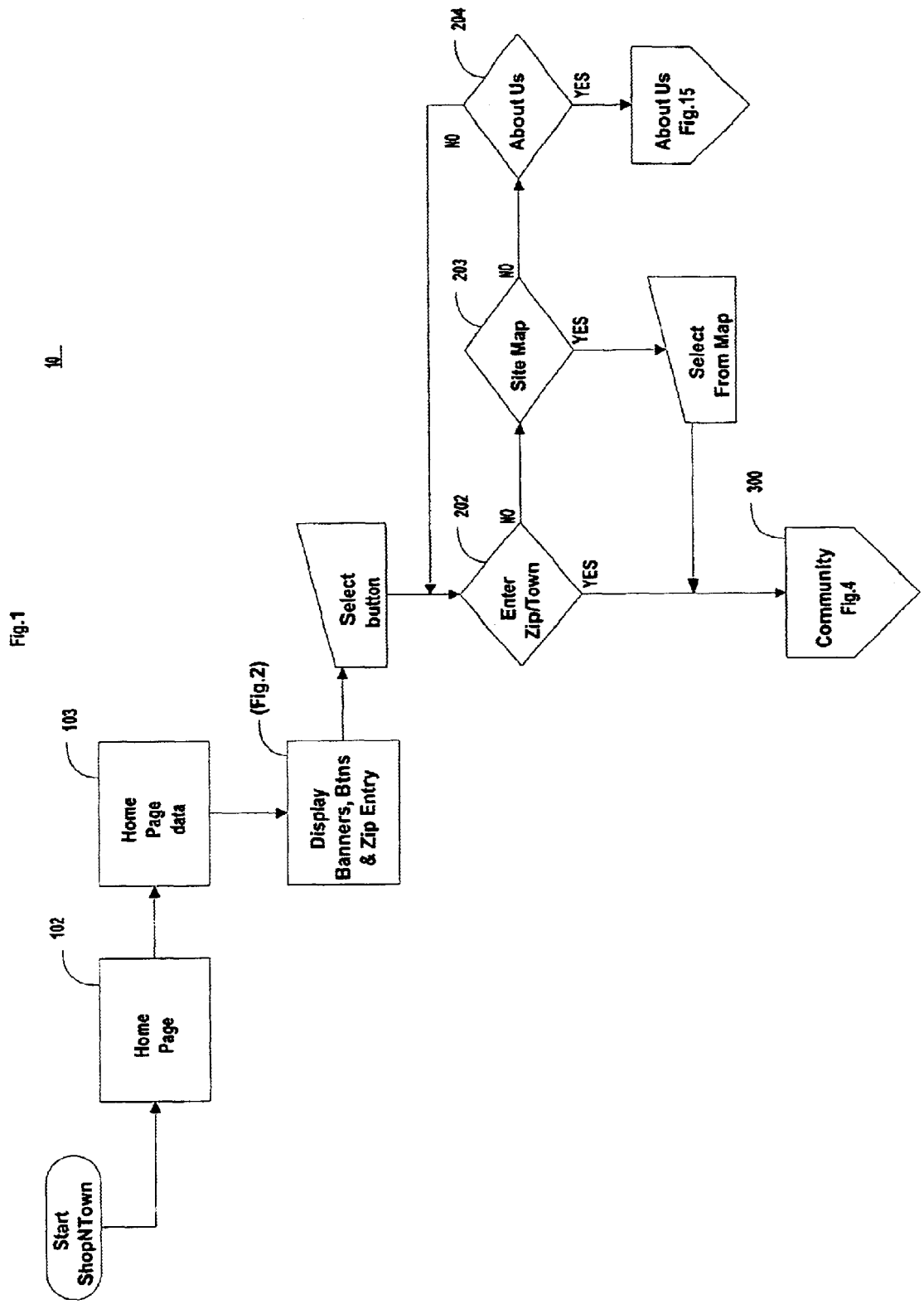

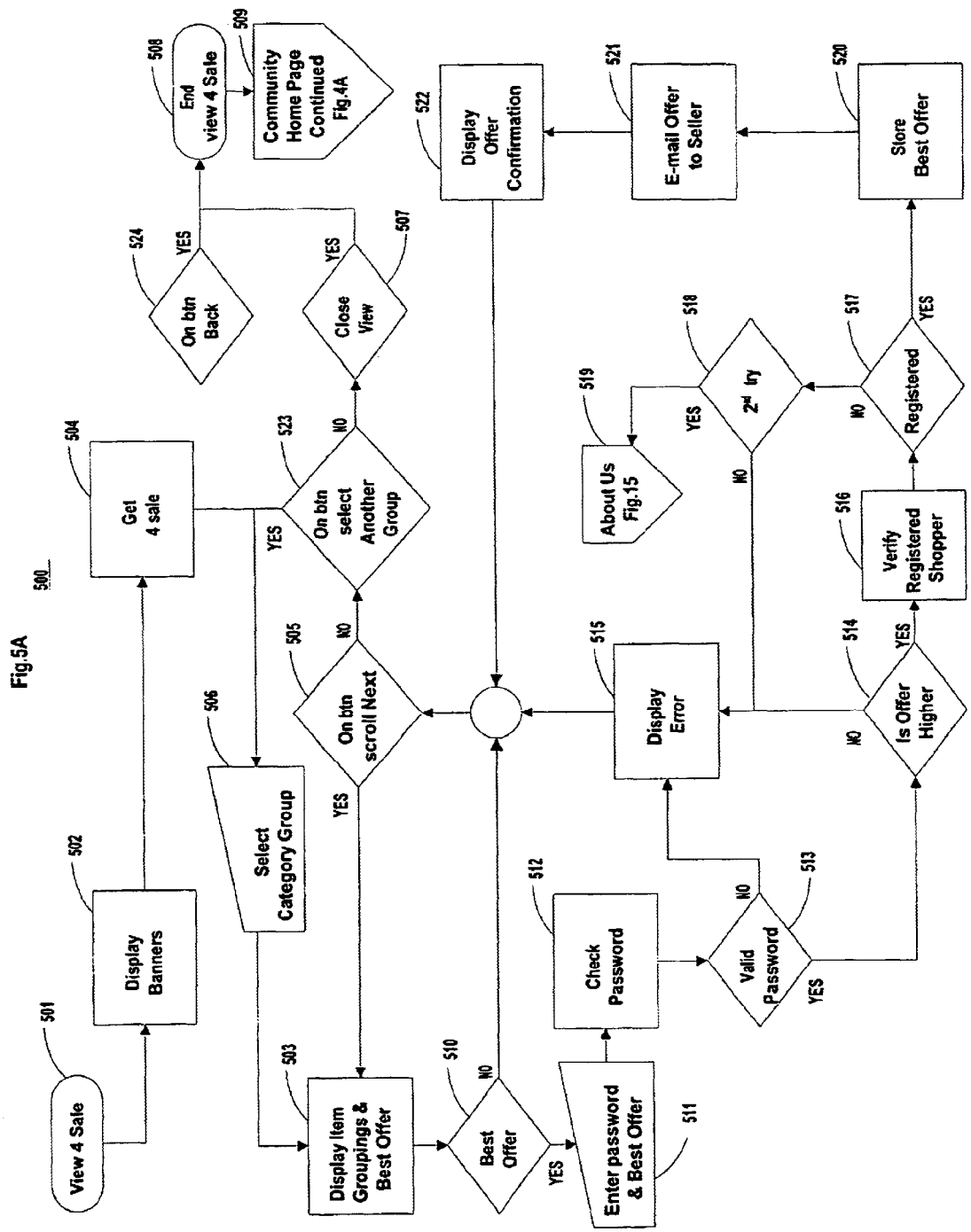

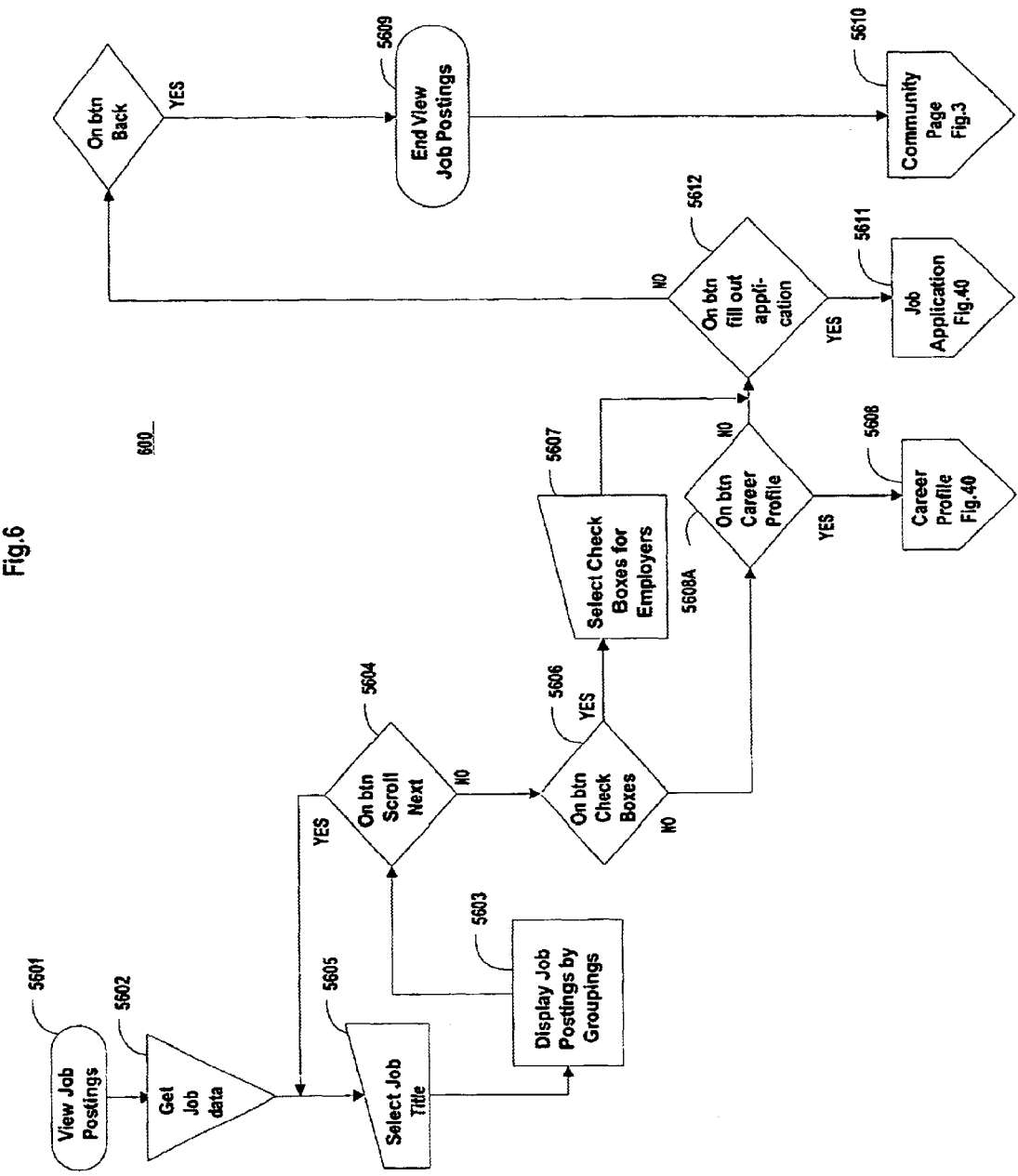

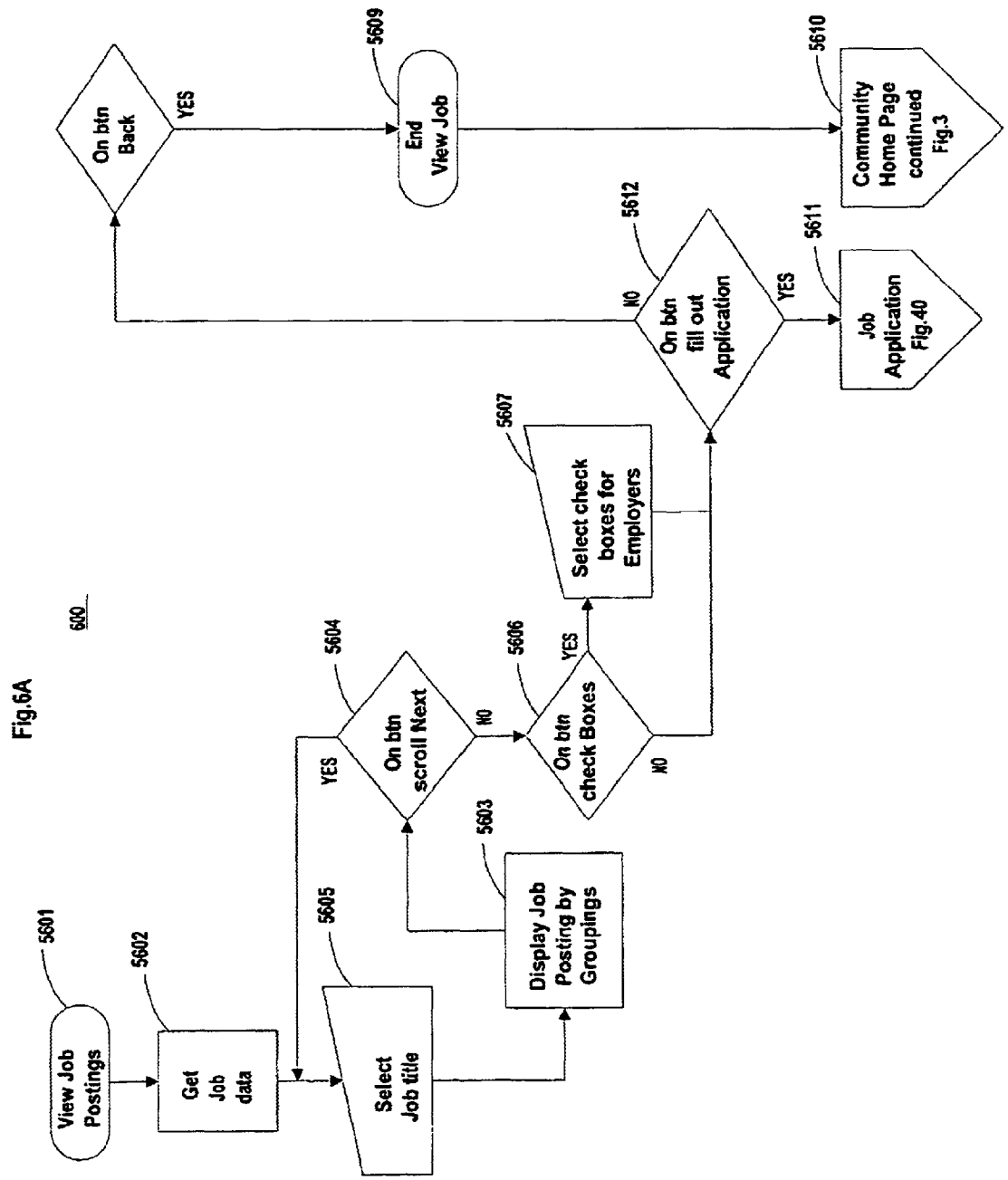

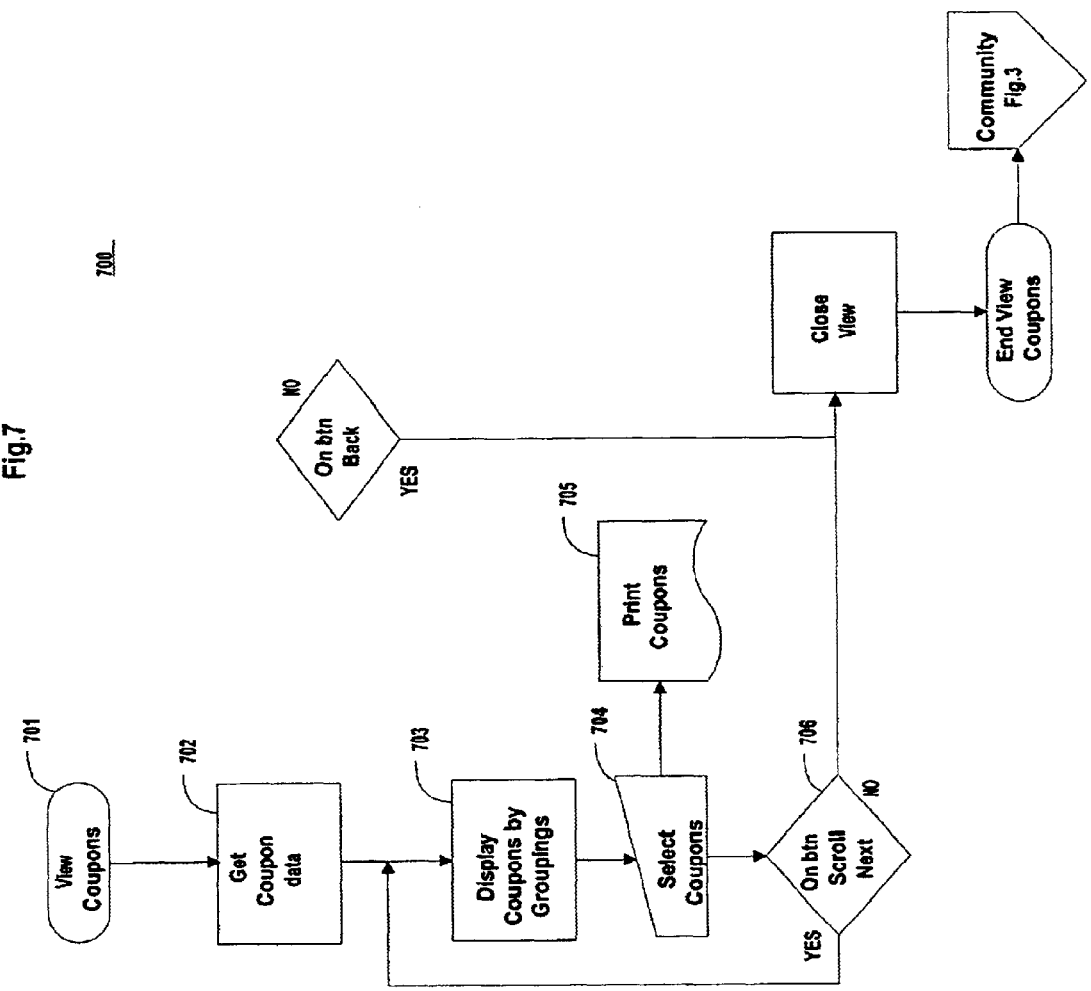

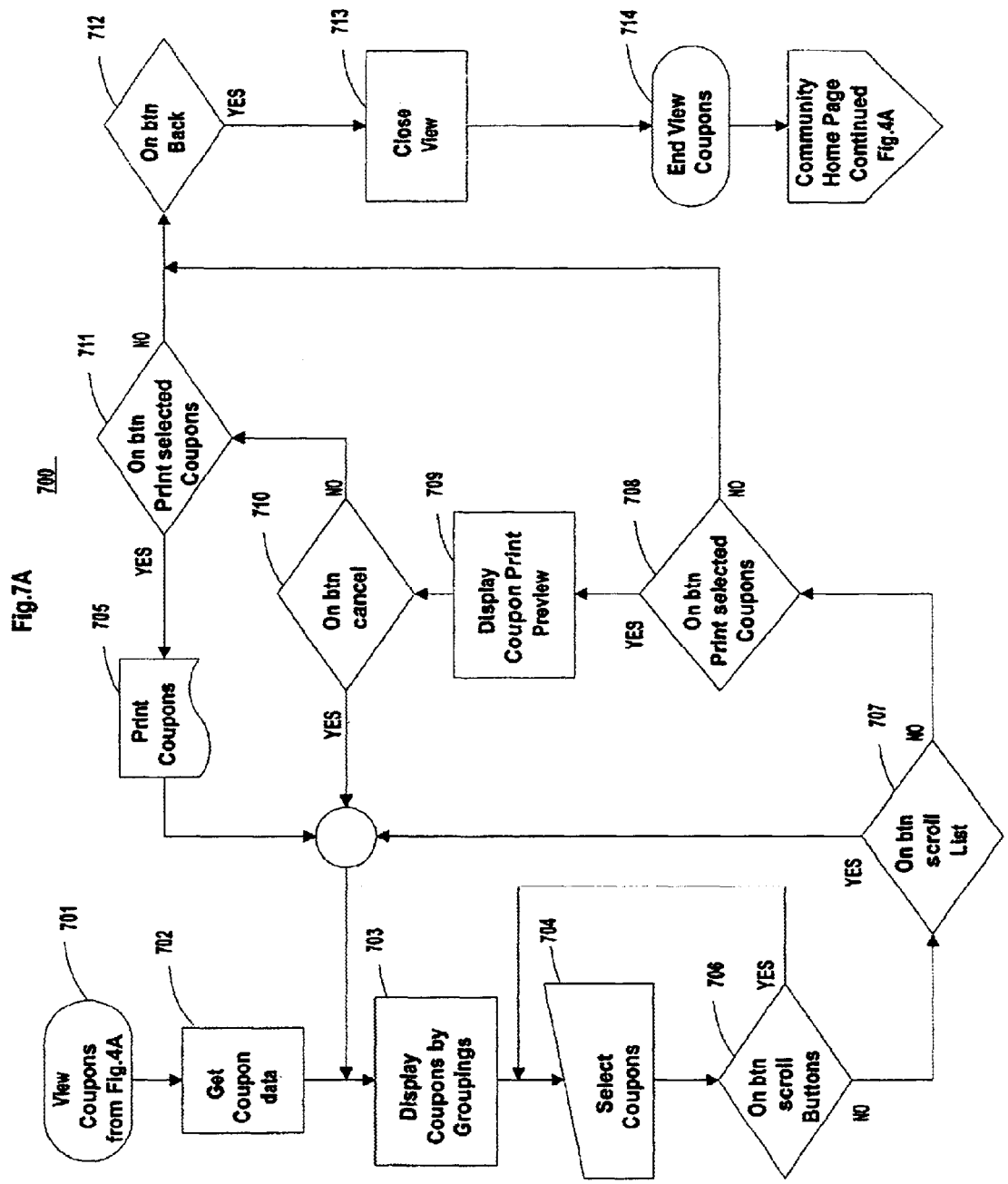

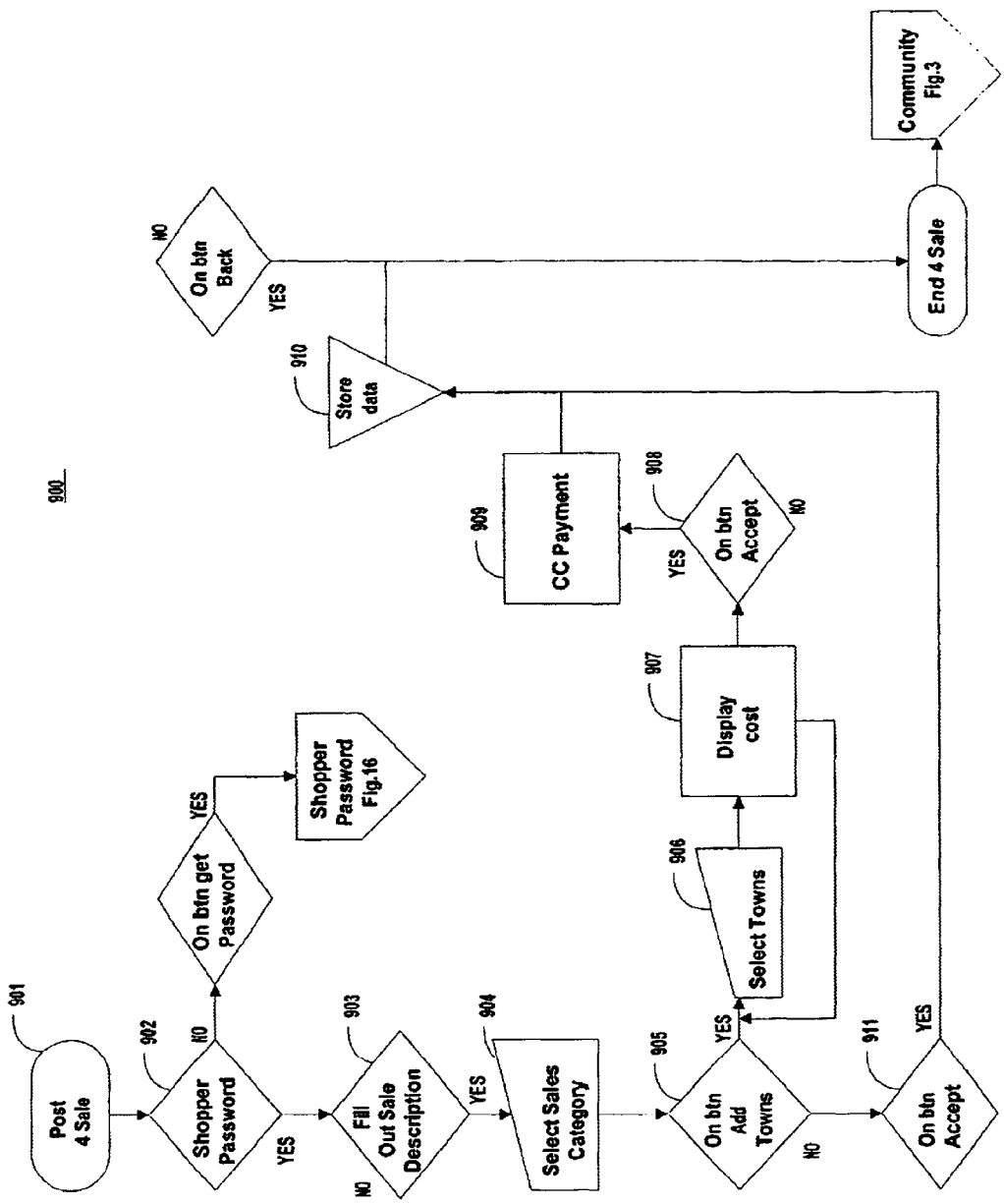

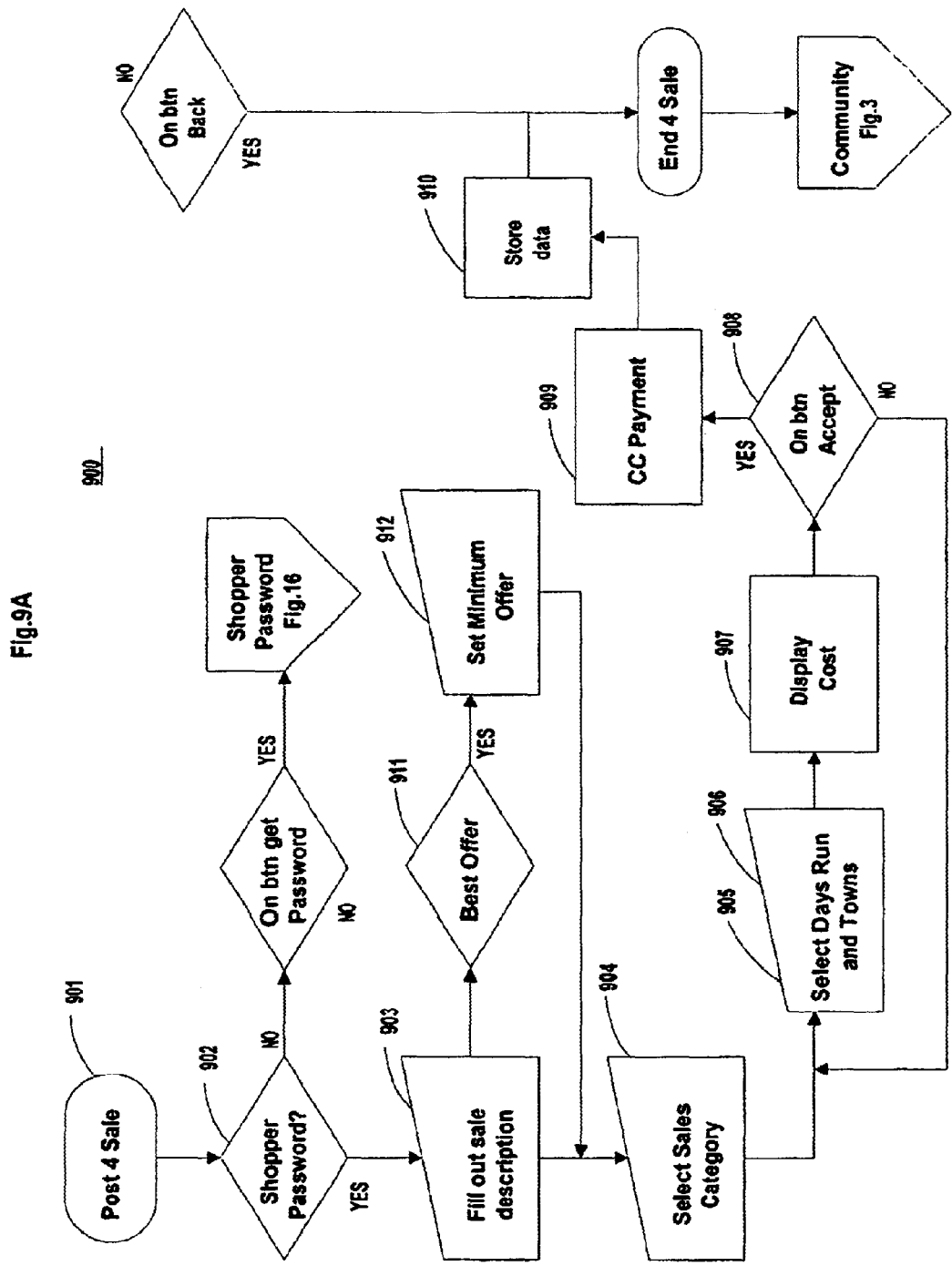

Fig.10B

Welcome to
ShopNTown.com, inc.
Lombard, IL

| Coupons | 4 SALE | JOBS | Real Estate |

454A — 501 — 456A — 457A

5 Day forecast for Chicago/O'Hare Int'l Arpt, IL and Vicinity
last updated Wednesday, September 8 th at 5:07 am CDT

| WED | THR | FRI | SAT | SUN |
|---|---|---|---|---|
| AM T-Storms | Scattered Showers | Partly Cloudy | Sunny | Scattered T-Storms |
| lo -° hi 82° | lo 54° hi 72° | lo 49° hi 69° | lo 48° hi 71° | lo 58° hi 78° |

Click for Weather.com

Community Search
Enter Name
[ Bus/Org ] — 453A

Market Watch

| NASDAQ | 2043.11 | ▲ +192.67 |
| DJIA | 11076.45 | ▲ +225.24 |
| S&P 500 | 1357.24 | ▲ +36.13 |
| 30 YR BOND(I) 6.621 % | | ▼ -0.12 |

Rotating Banners — 451A

VILLAGE OF
LOMBARD
Since 1806

ILLINOIS.GOV

- BACK
- ABOUT OUR TOWN
- BEAUTY & FASHION
- COMPUTERS
- EDUCATION
- EMPLOYMENT
- ENTERTAINMENT
- FOOD & DRINK
- HEALTH & MEDICAL
- HOME & GARDEN
- PROFESSIONAL
- REAL ESTATE
- VEHICLES
- ABOUT US

Fig.10C

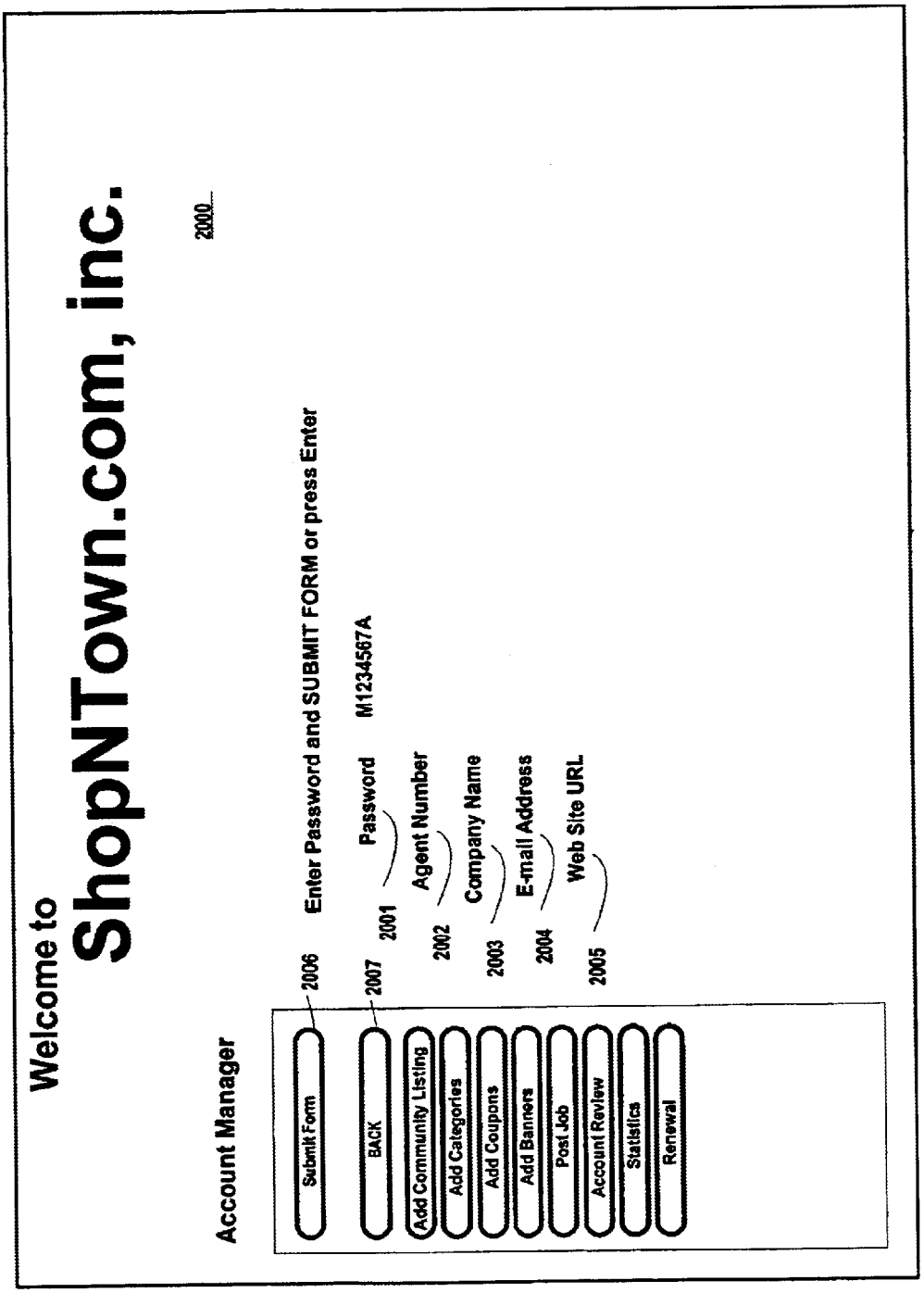

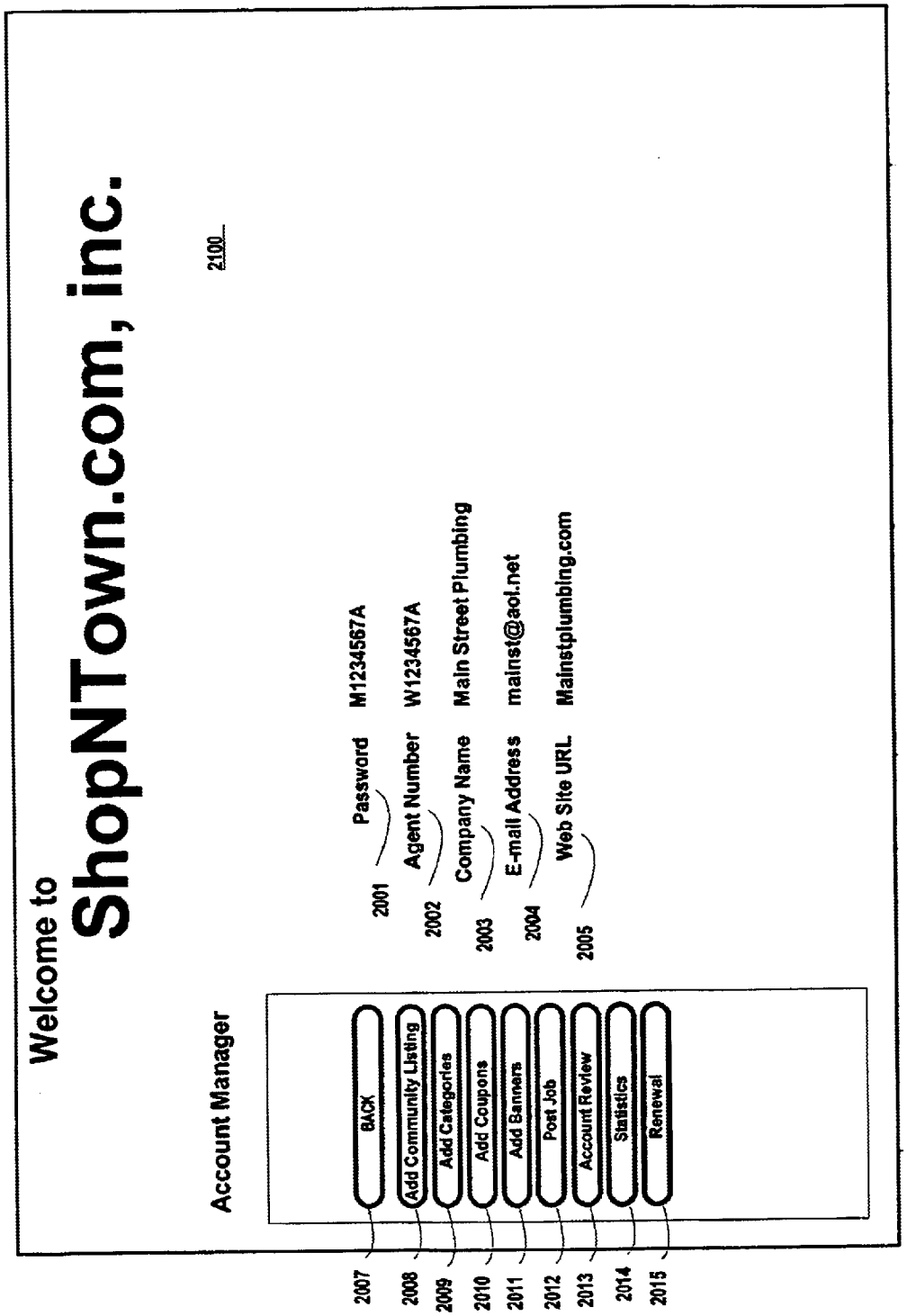

Fig. 25

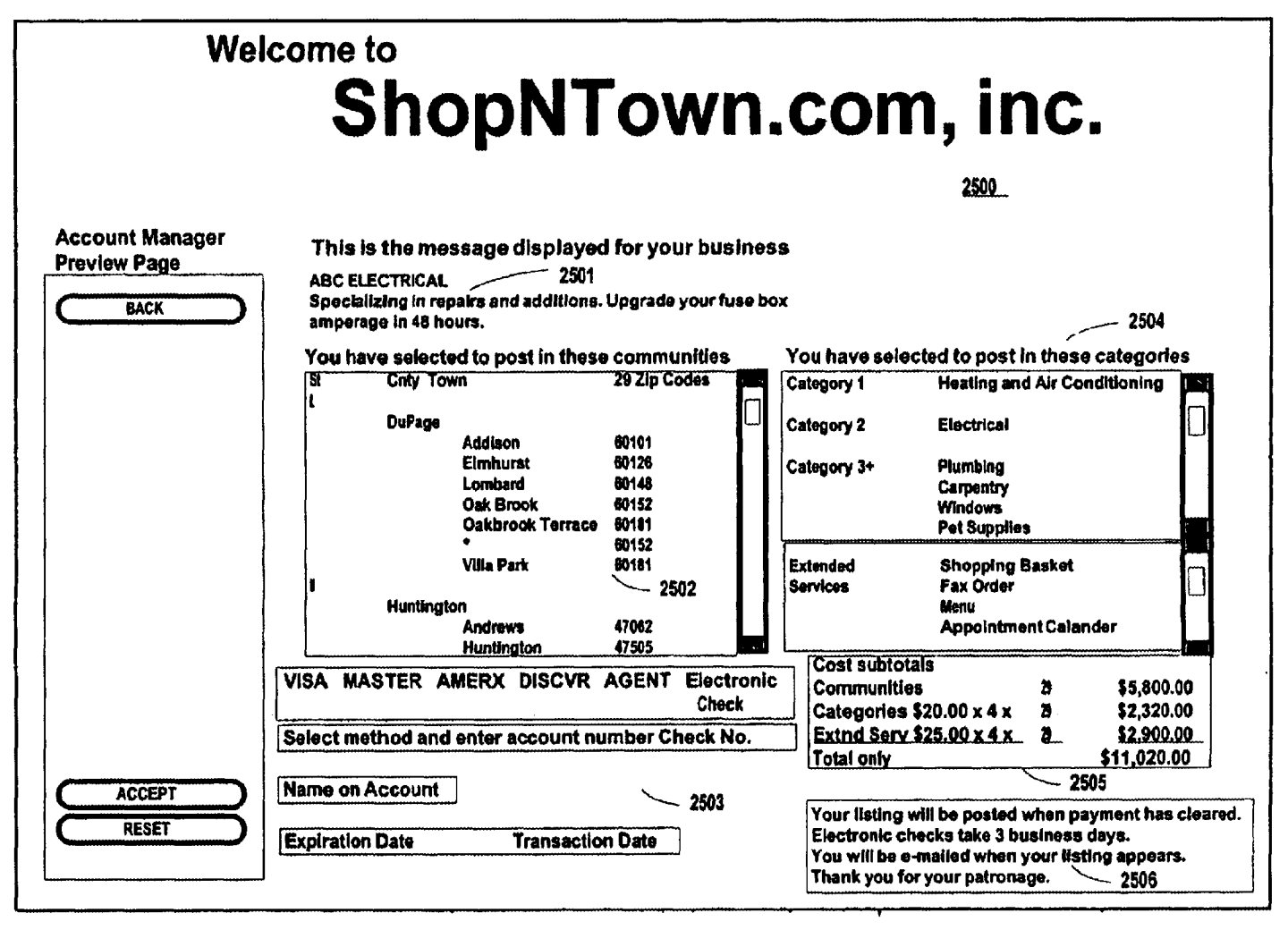

Welcome to
ShopNTown.com, inc.
*2500*

Account Manager Preview Page

[BACK]

This is the message displayed for your business — 2501

ABC ELECTRICAL
Specializing in repairs and additions. Upgrade your fuse box amperage in 48 hours.

You have selected to post in these communities

| City Town | 29 Zip Codes |
|---|---|
| DuPage | |
| Addison | 60101 |
| Elmhurst | 60126 |
| Lombard | 60148 |
| Oak Brook | 60152 |
| Oakbrook Terrace | 60181 |
| * | 60152 |
| Villa Park | 60181 |
| Huntington | |
| Andrews | 47062 |
| Huntington | 47505 |

2502

You have selected to post in these categories — 2504

| Category 1 | Heating and Air Conditioning |
| Category 2 | Electrical |
| Category 3+ | Plumbing |
| | Carpentry |
| | Windows |
| | Pet Supplies |
| Extended Services | Shopping Basket |
| | Fax Order |
| | Menu |
| | Appointment Calender |

Cost subtotals
Communities                                    $5,800.00
Categories $20.00 x 4 x                        $2,320.00
Extnd Serv $25.00 x 4 x                        $2,900.00
Total only                                    $11,020.00

2505

Your listing will be posted when payment has cleared.
Electronic checks take 3 business days.
You will be e-mailed when your listing appears.
Thank you for your patronage. — 2506

VISA  MASTER  AMERX  DISCVR  AGENT  Electronic Check

Select method and enter account number Check No.

2503

Name on Account

Expiration Date    Transaction Date

[ACCEPT]
[RESET]

ON-LINE LOCALIZED BUSINESS REFERRAL SYSTEM AND REVENUE GENERATION SYSTEM

This application claims the benefit of U.S. Provisional Patent Application Ser. No. 60/124,966 filed Mar. 18, 1999.

BACKGROUND OF THE INVENTION

1. Field of the Invention

The present invention generally relates to a system for organizing Internet information based on discrete geographic and topical categories, and more particularly to a substantially automatic system for organizing Internet information based on discrete geographic and topical categories which permits Merchants to select for themselves one or more geographic and topical categories the merchant wishes to be referred from. The present invention further relates to a system that permits Merchants to conduct commercial transactions with users or Shoppers using the system.

The invention is directed to an online interactive system comprising a business referral system linked to one or more listed web sites of businesses in a particular locality or geographical area. Revenue is generated by way of such methods as: Merchants listing their web sites in one or more web site directories for multiple communities; banner ads; local and national coupons issued by merchants; classified job listings; classified realty listings; "4 Sale" ads; and fees for supplemental services called "Extended Services" such as credit card payments, appointment schedules, menus, forms, estimates, surveys, fax orders, shopping cart, order confirmation, newsletters, menu of products, email orders, product catalogs, merchant bill payments, etc. Among the Merchants which use such revenue generating methods are: wholesalers and retailers; web site developers; advertising agencies; coupon resellers; employment agencies; and real estate agencies—in addition to local shoppers.

2. Description of the Related Art

On-line computer services, such as those found on the Internet, provide a user with access to a hierarchically structured database containing information. This information is typically accessed via a plurality of computer servers interconnected by a data transfer means (i.e.: a conventional telephone line or T1 connection). Because each and every computer server is not directly connected with every other computer server, a plurality of direct routers is employed to direct data to and from the desired computer server.

A user may access the Internet using a home personal computer (PC) equipped with conventional modem and Internet interface or browsing software. To access the Internet, the PC's modem dials a telephone number associated with an Internet Service Provider (ISP). The ISP's server then directs the user to a local or point of presence (POP) router, which in turn connects the users to the Internet.

Devices utilizing the Internet communicate using a certain Internet communication protocol HyperText Transport Protocol (HTTP) Every device communicating on the Internet is assigned a unique address call and Internet Protocol (IP) address. The IP address identifies where in the network of interconnected computer servers a device is connected. Currently, an IP address consists of thirty-two (32) binary bits. Because this is difficult for a user, IP addresses are assigned mnemonic representations. A typical address reads as follows: www.uspto.gov.

Usually, an IP address is associated with a web site having a plurality of documents organized in a plurality of directories and subdirectories. The first document to appear on a user's PC viewing screen is usually a "home page". The home page gives the user access to a web site's directories and subdirectories, and may allow the user to gain access to other web sites or subdirectories within other web sites.

Data exchanged over the Internet is typically encoded in HyperText Mark-up Language (HTML) format. As is well known in the art, HTML marks portions of a document so that when the document is accessed by a user, each portion appears in a specific location on the user's screen and in a specific format. The document may consist of text, graphic images, and/or hyper-links that allow a user to move from document to document on the Internet. A hyper-link is an underlined or otherwise emphasized portion of a document that permits a user to display other documents located either within a web site's directories or subdirectories, or within another web site altogether. A user activates a hyper-link by "clicking" on the underlinked or otherwise emphasized portion of a document using a peripheral device such as a mouse.

Although the Internet has been used as a means for widely sharing information amongst a plurality of users, a central database for organizing the location and nature of all the information available via the Internet has not been established. However, several systems employ "search engines" which locate web sites containing specific desired information. Search engines operate by searching every web via "spiders", also called controllers or bots, which search for keyboards contained within metatags located at the web site. A user inputs one or more keywords into the search engine which relate to the desired information, and the search engine retrieves and displays a listing of the web sites found along with a brief description of and a hyper-link to each web site. From this list, the user may then select the web site he or she wishes to view.

Most search engines are worldwise in scope, and therefore will usually provide the user with information from around the globe. However, when the user seeks goods and services from a business located within a specific geographical region, a search becomes more difficult. Several search engines operate by locating all web sites which contain the name of the geographic region within a metatag, and then allowing the user to input one or more keywords to further narrow his or her search. U.S. Pat. No. 5,930,474 to Dunworth et al. describes such a method for retrieving information based on geographic location. However, these types of search engines are inadequate because the quality of the search becomes dependent upon the quality of the metalags employed within the web site. For example, if a user was seeking a business which specialized in home repair within their geographic region, a user may input the words "home repair" and the name of the geographic region into the search engine, therefore yielding only those web sites whose metatags contain those words. Therefore, if the web site fails to list within their metatags the geographic location, a search engine would likely fail to list the particular web site in the search results. Further, such search engines typically yield so many results that it would require an unreasonable time span in order to view each and every web site contained within the search results.

Other search engines operate using a "referral" system. Often, corporations who also maintain a vast array of server computers maintain the search engines. These companies then use these server computers to "host" or provide memory space for merchant web sites owned by merchants. Employees of the corporation view each merchant web site and create a set of web site keywords. The web sites keywords are maintained in a web site content database. Merchant web sites hosted by other corporations may also request the corporation which maintains the search engine to list their keywords within the web site content database for referral to search engine users. When a user conducts a search using the corporation's search engine, the search engine searches the web site content database for web site keywords which match those keywords input by the user, and then displays a listing of the merchant web sites found along with a brief description of and a hyper-link to each web site. These types of search engines are inadequate, however, because the corporations often give preference to, and therefore lists first, those merchants whose merchant web site is hosted by the corporation who maintains the search engine, and preference is often given to those merchant web sites who generate the most revenue to the corporation.

Further, such search engines typically yield so many results that it would require a tremendous amount of time in order to view each and every web site contained within the search results. In addition, most search engines are "state" (and therefore not "interactive") because they only allow a user to locate a merchant web site and then view the merchant web site via the hyper-link provided in the search results. If a user wishes to communicate directly with the merchant operating the merchant web site, the user must do so via the merchant's web site (i.e.: an electronic mail (e-mail) communication hyper-link provided within the web site). Further, commercial transactions between the user and the merchant must be conducted at the merchant's web site as well.

In addition to the Internet's inadequate organization of information, commercial advertising on the Internet has become difficult for merchants. An Internet commercial advertisement typically takes the form of a "banner ad" located and displayed on hosting web sites. A banner ad may be textual or graphical, and is a hyper-link to the merchant's web site. Currently, merchants, through a third-party broker, purchase banner advertisements. An employee of the broker either inputs the banner ad onto the desired document of a hosting web site (as the broker has direct access to the web site), or contacts the hosting web site, requests the banner ad and an employee of the hosting web site's owner places the banner ad onto the desired document. This method or purchasing banner ads is both time consuming and costly because personnel skilled in the art of computer programming are often required to input the information onto the hosting web site's document. Further, banner ads as currently utilized are inadequate as they are hyper-links only, and typically fail to communicate both the goods or services provided or sufficient information to allow the user to contact the commercial enterprise without viewing the commercial enterprise web site.

The invention comprises an on-line, interactive web site information system having one or more functions for displaying advertising, information and business listings and referring users such as shoppers or merchants to the web sites of merchants listed with respect to certain geographic locations such as towns and cities, and certain categories.

It further includes capability for substantially automated creation of business listings and advertising by users of the system. It further includes substantially automated selection by said merchants of the categories and towns wherein said advertising and listings will appear so as to enable geographic targeting of said users of the system. The system displays the advertising, information and business listings for duration of time in a substantially automatic manner.

Furthermore the system enables on-line shoppers to view the advertising, information and business listings. The advertising, business listings and information are linked to the web pages of others. At least one hyper-link corresponding to a category is provided in order to link users to the web site of at least one merchant.

Databases are built from the information provided by users of the system. The system can also record and provided account review information to users of the system. Users, such as Merchants, can add and delete the information, business listings and advertisements for display on the system. Such users can also select the specific towns and categories in which to display the advertising, business listings and/or information. Shoppers or Merchants can also obtain Extended Services. These Extended Services serve to provide interactive web site qualities or functions to static web sites. Statistics are recorded about usage of the system and, marketing analysis is performed for monitoring activity among the various functions of the System.

The system can generate revenue from usage of the system. Accounting functions serve to keep track of the revenues generates by the System and any commissions owed to others. The system further provides for substantially automated updating of the business listings, advertising and information. The system provides for substantially automated, on-line payment for said business listings, information and advertising. The system is further capable of substantially automated display of single day duration coupons or ads wherein the coupons or ads automatically stop being displayed upon the expiration of the selected time period.

The system is capable of generating revenue in the following ways, among others:
 a. fees obtained from merchants for listing their web sites in specified towns;
 b. fees from banner ads displayed in specified towns;
 c. fees from coupons made available in specified towns;
 d. fees from 4 sale listings displayed in specified towns; and,
 e. fees from extended services.

The nature and amount of the fees charged by the system depend on the location, type and duration of the listing, ad or coupon.

The system provides for different levels of passwords for different types of users of the system. The 4 sale listings of classified ads further include the capability to offer items for sale on a "best offer" basis.

The hyper-link can be one or more areas on a page with an appearance simulating the appearance of a button that can be selected. The hyper-link further appears to be lit up when links to business web pages exist for that category. The hyper-link is further capable of indicating that there are no links to business web pages in a given category. In order to indicate that there are no links to business web pages in a given category, the hyper-link comprises an area having the appearance of a darkened button.

Therefore, it is a first object of the present invention to provide a system for organizing Internet information based on discrete geographic and topical categories.

A second object of the present invention to provide a substantially automated system for organizing Internet information based on discrete geographic and topical categories which permits merchants to select for themselves one or more geographic and topical categories the merchant wishes to be listed in.

Another object of the present invention is to provide a system that is substantially automated and more easy to use than conventional web sites.

It is a further object of the present invention to provide a substantially automated system for organizing Internet information based on discrete geographic and topical categories without the need for employing a large personnel staff by the system's owner.

Another object of the present invention is to provide a substantially automated system for organizing Internet information and providing links to business web pages based on discrete geographic and topical categories that can accommodate a higher volume of transactions than a system utilizing personnel staff to enter the information.

Yet another object of the present invention is to provide a substantially automated system adapted to permit Internet users to contact merchants directly through the system of the present invention.

Another object of the present invention is to provide a system wherein merchants can design, purchase and place advertising, information and business listings and links directly and by themselves.

Yet another object of the present invention is to provide a system wherein the listings, banner ads, and coupons are terminated on their expiration date or updated substantially automatically.

Still another object of the present invention is to provide a system where merchants can target potential shoppers by geographic area, as opposed to conventional on line systems which rely on the potential shopper to select merchants based on key words or geographic proximity of the merchant to the shopper.

Another object of the present invention is to provide a system wherein ads or coupons are displayed more quickly after design or selection and payment than on conventional web sites, so as to enable last minute, short duration and/or off hour ad or coupon placements.

Yet another object of the present invention is to generate revenue through such features as: merchant fees for listing and hyper linking to the web pages of their businesses; fees for banner ads; fees for coupons; fees for 4 Sale classified listings; fees for real estate listings; and extended services which are viewable only from the system.

Another object of the prevent invention is to provide a system wherein advertising agents receive automated, on-line commissions or discounts for placing or having others place ads on the system and wherein such commissions can be automatically direct deposited to the bank accounts of such agents.

A still further object of the present invention is to provide a system adapted to permit merchants to design, purchase and place banner ads on selected pages or categories by directly contacting the system on-line.

SUMMARY OF THE INVENTION

The above-listed objects are met or exceeded by the present substantially automated system for organizing Internet information based on discrete geographic and topical categories. The system of the present invention provides Internet users or Shoppers with information regarding businesses or Merchants who transact business in a particular geographic location. The Merchants who place advertisements on the system select which Communities to display a hyper-link which links the system to their web site, by a combination of Zip Codes and two names.

Moreover, Merchants automatically list themselves on the system. Accordingly, the need for data entry staff or human screening of the information is eliminated. Likewise, without the need for a sales staff, Merchants can purchase ad space in additional communities or under additional categories and pay for it online by credit card or electronic check. The system tracks and retrieves records of such transactions.

Merchants can also offer local or national online Coupons. The Shopper is able to select and print the Coupons on his or her own printer; hence, Merchants need not have coupons printed or delivered to consumers. The Coupon page is categorized. Moreover, Merchants can enter Coupons into the system virtually anytime, day or night. Since, Coupons can be created or changed on a daily basis, this attracts Shoppers to the system on a daily basis, if nothing else, to see the latest offers or "specials" being offered by Merchants.

While other web sites have had Banner Advertising, Merchants can go to an online form, build their own Banner ads, pay for them online, and have them displayed in minutes or hours, instead of days.

Merchants can also better target their customers with the system. Banner Ads can be put on the: Home Page as a "National Banner"; Community Page as a "Local Banner"; and on the Category Directory Page as a "Category Banner." On the page listing businesses in a Category and thereby providing links to the web pages of such business, a Banner Ad will appear for a business in that Category. Hence, customer targeting for that advertiser is by both Category and Geographic location. system and will serve as advertising brokers and receive either discounts or commissions for ads they place.

The system also provides Extended Services. Unlike common referring web sites, which are basically "static" and convey information only outwardly, the Merchant a can select Extended Services, for a fee, so as to provide an interactive capability. While one or more these services may be provided on other web sites, the system allows the Merchant to add these services to their otherwise static web sites. Among the Extended Serviced that can be provide dare: Credit Card and Electronic Check Purchases; Appointment Book Functions; Menus; Information Forms; Polling Data; Fax Orders; Estimate Calculator; E-mail Orders; Reservations; Shopping Cart; Appointment Scheduling; Event Calendar; Ticket Sales; News Letters; Video Playback; Audio Playback; Special Sale Items with Inventory Count Displays; Fax; Confirmation by Fax or E-mail; menu of products; merchant bill payments; Local Services or National Listing; and Seating Charts.

Unlike other online systems, Shoppers do not have to create a name or category for searching purposes. In the system, shoppers need only select from a list categories that narrows a step at a time to a Final Specific Category. Indeed, from the Shopper's perspective, the system provides, among other things: easy access to their neighborhood directories; weather forecasts, stock quotes and/or headline news; a neighborhood "4 Sale" posting directory to buy or sell items; coupons from local merchants and national business; help wanted ads; career search profile forms for employers to view; and/or local merchants' web sites listed in easy to find categories. Moreover, Extended Services will provide online interactive web site enhancements to aid local merchants in e-commerce development.

Because there is no need for orders to be taken or filled physically, the system can accept thousands of orders at a single time. Hence, operating expense is greatly reduced.

In the system, web site listings, Banner Ads, Coupons and Job Listings are all organized and placed on a geographic basis. Moreover, the operations of: acquiring the system Services; previewing; ordering; payment confirmation by e-mail; and/or placement are all handled online, without the need for a human order taker or processor. In addition, referral compensation is provided to Agents/Brokers. The referral compensation can be transferred automatically, even directly to the bank accounts of the Agents/Brokers. Client Account Statements can also be accessed at any time by the advertisers.

Unlike other computer systems, the system enables accurate accounting of and compensation of authorized Agent/Brokers of the system who refer advertisers. The Agents use an identifying account number to order advertising services online at the system. Once a client places an Ad, Listing or Coupon using an Agent's Identification Number, the Agent is compensated by receiving a referral fee based on the revenue generated to the system, as a result of the Client ordering advertising services from the system. Agents can review a history of the referrals they have made, as well as statement of the amounts paid and due to date, by accessing the Account Manager function of the system. Accounting Means are also provided as part of the system to track such financial matters.

The system generates revenue in several ways. In one version, Merchants which list their web site in two or more Community Directories pay a fee for each additional Community. Merchants listing their web sites in three or more Categories within Community Directories pay an additional fee for each such added Category.

Merchants enter banner Ads from a selection of designs available from system forms and FTP. Fees are based upon the number of "hits" or impressions on that ad. Banner Agents can also enter banner Ads from the aforementioned selections. Volume discounts can be provided to the Agents, with fees to the advertiser also being based upon "hits" or impressions to that Banner Ad. Pricing for the banners increases as the targeting narrows. The Banners Page comprises a page of all banners. Preset designs can be used. National Placement is on the system's Home Page. Banner Ads can also be placed on the Community Page or on specific Categories thereof.

Coupons can be entered by Merchants and selected from an assortment of a available designs from the system's forms or FTP. Coupon fees are charged. Specific Communities are targeted with such Coupons.

Shoppers may place items in "4 Sale" Section for their own Community for free and in other Communities for a fee. This serves to generate a daily following of garage sale announcements, autos and homes for sale.

The Extended Services that serve to enhance otherwise static web sites by making them interactive are offered on an annual fee basis or on a "by transaction" fee basis.

Hence, significant advantages are provided over such competitive web sites and/or search engines as: Yahoo®; Sidewalk.com; Infospace.com; quikpage.com; go.com and/or beyond.com.

BRIEF DESCRIPTION OF THE DRAWINGS

FIG. 1 is a system flow diagram that illustrates the sequence of events that occurs when a user or Shopper enters the system.

FIG. 5A is a system flow diagram for an alternative for the "4 Sale" operations for the Community Page.

FIG. 6 is a system flow diagram of the Job Opening operations for the Community Page.

FIG. 6A is a system flow diagram for an alternative for the Job Opening operations for the Community Page.

FIG. 7 is a system flow diagram of the Coupon viewing operations for the Community Page.

FIG. 7A is a system flow diagram for an alternative for the Coupon viewing operations for the Community Page.

FIG. 9 is a system flow diagram of the "4 Sale" advertisement posting operations for the Community Page.

FIG. 9A is a system flow diagram for an alternative the "4 Sale" advertisement posting operations for the Community Page.

FIG. 10B is a first alternative exemplary screen display of the First Community Page for the Village of Lombard, Ill.

FIG. 10C is a second alternative exemplary screen display of the First Community Page for the Village of Lombard, Ill.

FIG. 20 is an exemplary screen display of the Shopper password application.

FIG. 21 is an exemplary screen display of the Shopper password application after the application has been completed.

FIG. 25 is an exemplary screen display of the Preview page.

FIG. 31 is a system flow diagram for an alternative for the Job Postings operations with respect to Merchants.

DETAILED DESCRIPTION OF THE PREFERRED EMBODIMENT

Figure 1A:
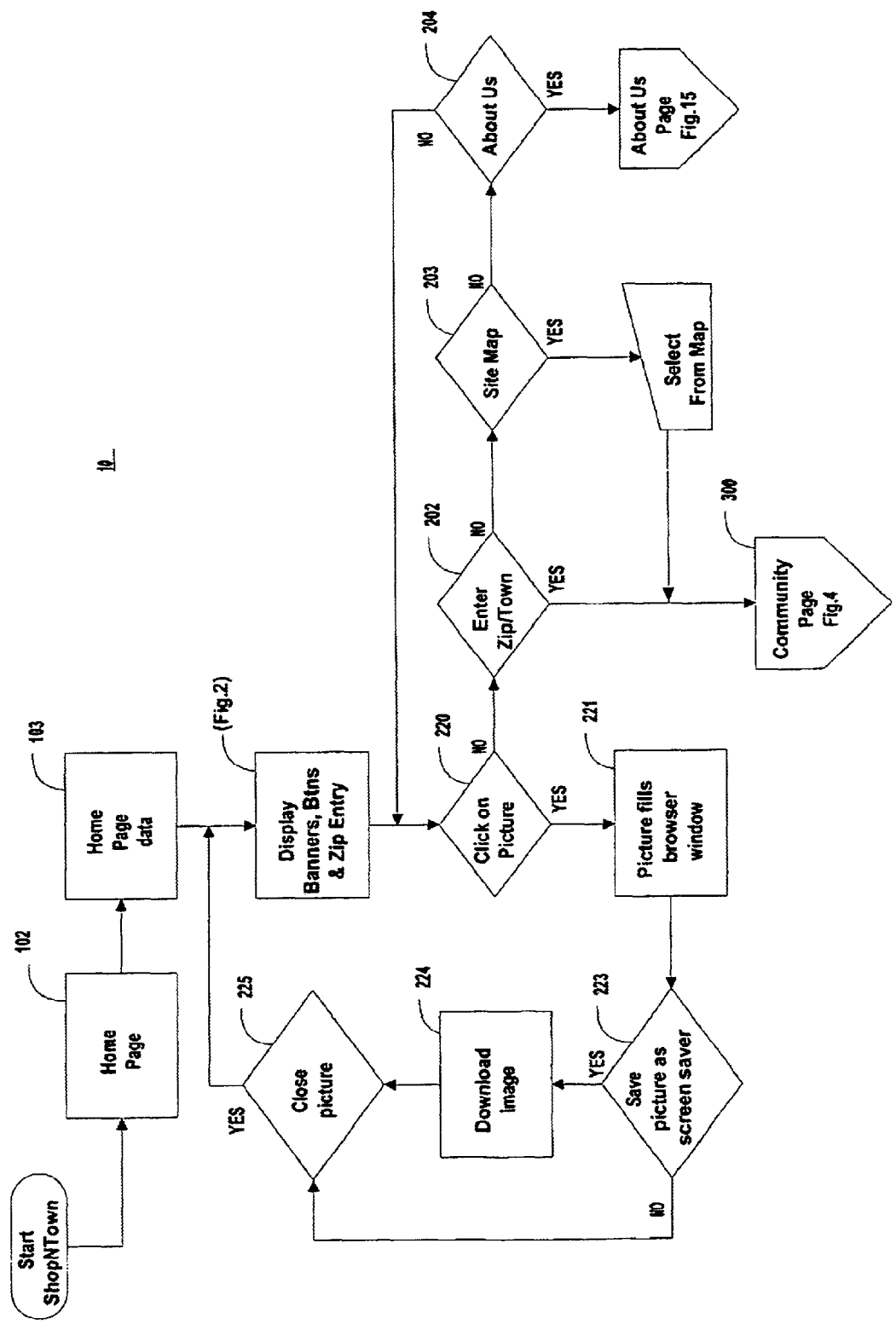
FIG. 1A is a system flow diagram that illustrates the sequence of events that occurs when a user or Shopper enters an alternate embodiment of the system.

While this invention is susceptible to embodiment in many different forms, there is shown in the drawings and will be described below in detail, specific embodiments with the understanding that the embodiments are to be considered to be an exemplification of the principles of the invention, and the embodiments are not intended to limit the invention to the embodiments illustrated.

Figure 54:
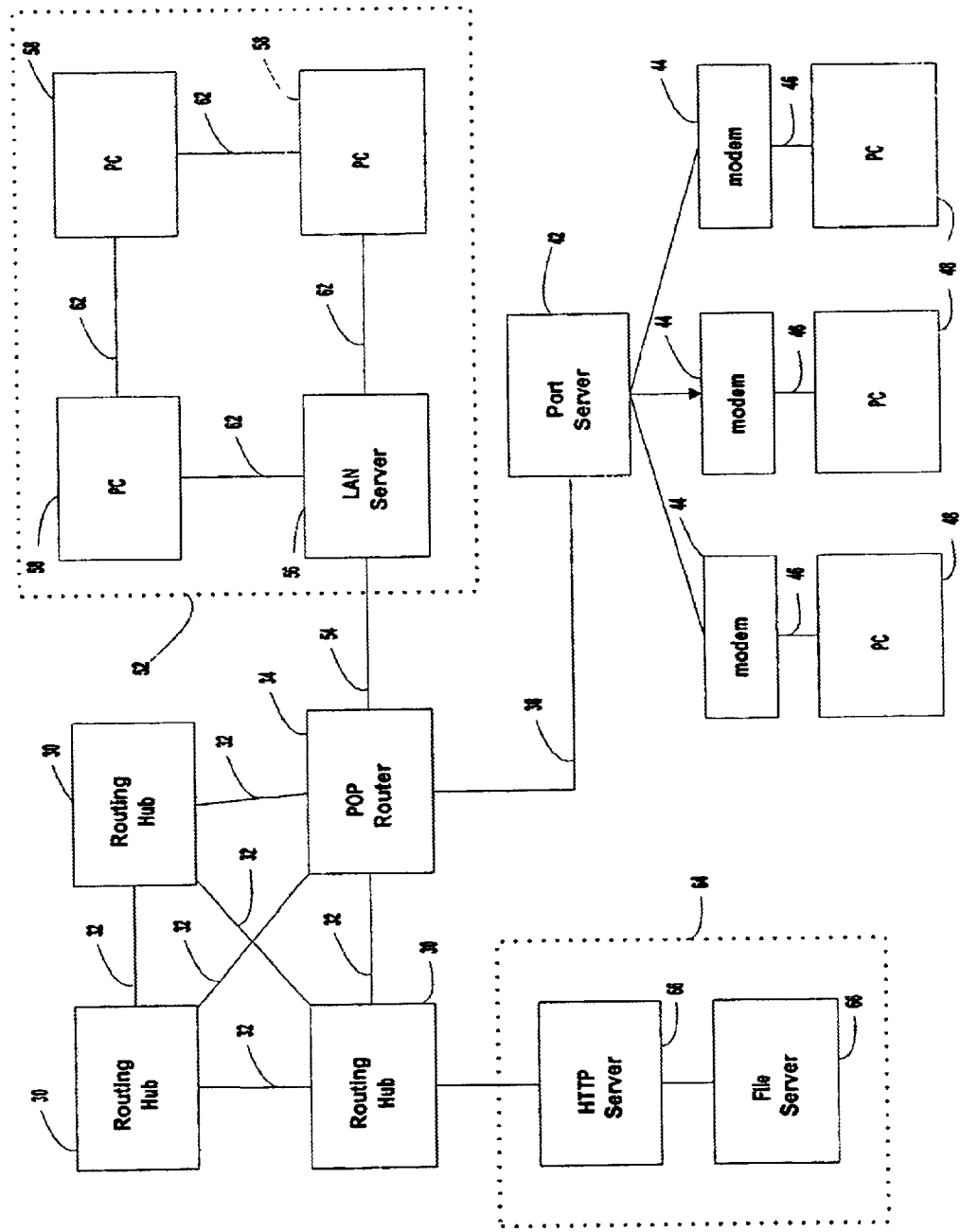
FIG. 54 is a simplified schematic diagram of the general structure of the Internet.

As is well understood by those skilled in the art, as shown in FIG. 54, the Internet includes a plurality of routing hubs 30, each interconnected via high-speed data transfer backbone 32 (i.e.: T1 links, T3 links, DSL links, etc.). Each routing hub 30 includes one or more Domain Name System Server (DNS) which translates domain names into and from Internet protocol (IP) addresses. Routing hubs 30 are typically connected to Internet Service Providers (ISP's), which in turn interface the Internet with stand-alone personal computers. The routing hub that connects to an ISP is usually referred to as a Point of Presence (POP) router 32. The POP router 32 then connects to an ISP 36 via an ethernet connection 38. The ethernet connection 38 communicates with a plurality of servers 42 (not shown) operated by the ISP 36, one or more of such servers being a port server 42 which communicate with a plurality of modems 44 via a modem link (i.e.: a telephone line) wherein each modem 44 communicates with one or more stand-alone personal computers (PC) 48.

The POP router 32 could also be connected to a local are network (LAN) 52 via a high-speed link 54. The LAN 52 includes a LAN server 56 which communicates with a plurality of LAN-linked stand-alone computers 58 (LAN PC) via a LAN communication link 62 such as a token ring interface link.

An Internet site 64 includes data files (called "web pages") in its file server 66. Such data files are typically written in HyperText Markup Language (HTML). The file server 66 can be accessed via a HTTP (HypertText Transfer Protocol) server 68. However, languages other than HTML can be used and this invention is not limited to only the user of HTML. If a user using a modem-linked PC wishes to view a web page from the Internet site 64, the user initiates a connection with the Internet by activating software (typically called "browsing software") installed on the users PC. The software instructs the modem 46 to establish a connection between the ISP's port server 42B and the PC 48, and therefore between the PC 48 and the POP router 34. Once connected to the Internet, the user then instructs the PC to communicate with the Internet site 64 by the entering the Internet site's mnemonic address into the software which, in turn, converts the address into a numerical internet protocol (IP) address. The software instructs the POP router 34 to locate the particular device connected to the internet having that particular IP address, or in this case, the Internet site 64. The file server 686 then sends the requested web page to the HTTP server 66, which sends the requested web page to the PC 48. The web page the user receives may contain "prompts" or hyper-links which allow the user to request additional files from the file server 68 or from a file server of a different web site.

The system can be run on servers such as those on GTE's® backbone having 2–4 Sun® Servers with the UNIX® operating system, Oracle® Application Server and Oracle® Database Server applications. Data recovery and tape backup equipment can be included as part of the system together with dual power supplies and around the clock ("24/7") host monitoring staff.

As referred to herein, with respect to a ShopNTown system 10, means are provided for linking users to the web sites of others. Shoppers are visitors to the web site System 10 which by visiting the system 10, gain access to businesses, (hereinafter called Merchants) having web sites listed on and thereby linked to the System 10. Shoppers can view Banner Ads or select and print Coupons. Shoppers can likewise view items in a "4 Sale" section. If shoppers are willing to apply for and receive a Password online, they can then fill out a personal profile for automated Job Searches or post items in the "4 Sale" section.

Merchants receive one file business listing, which serves as a link to the Web site of the Merchant, under two Categories of Goods or Services in a Single Zip Code area. Additional listings in other Categories or other Zip Code Areas are available for a fee. Extended Services, are also available to the Merchant for a fee. Merchants can also advertise via Coupons or Banner Ads for a fee. Where Merchants create their own web pages. Ads or Coupons, a special Agent Number will be given to such merchants so that no agent commission will be paid. Such Means for generating revenues are described hereinbelow.

Figure 2:
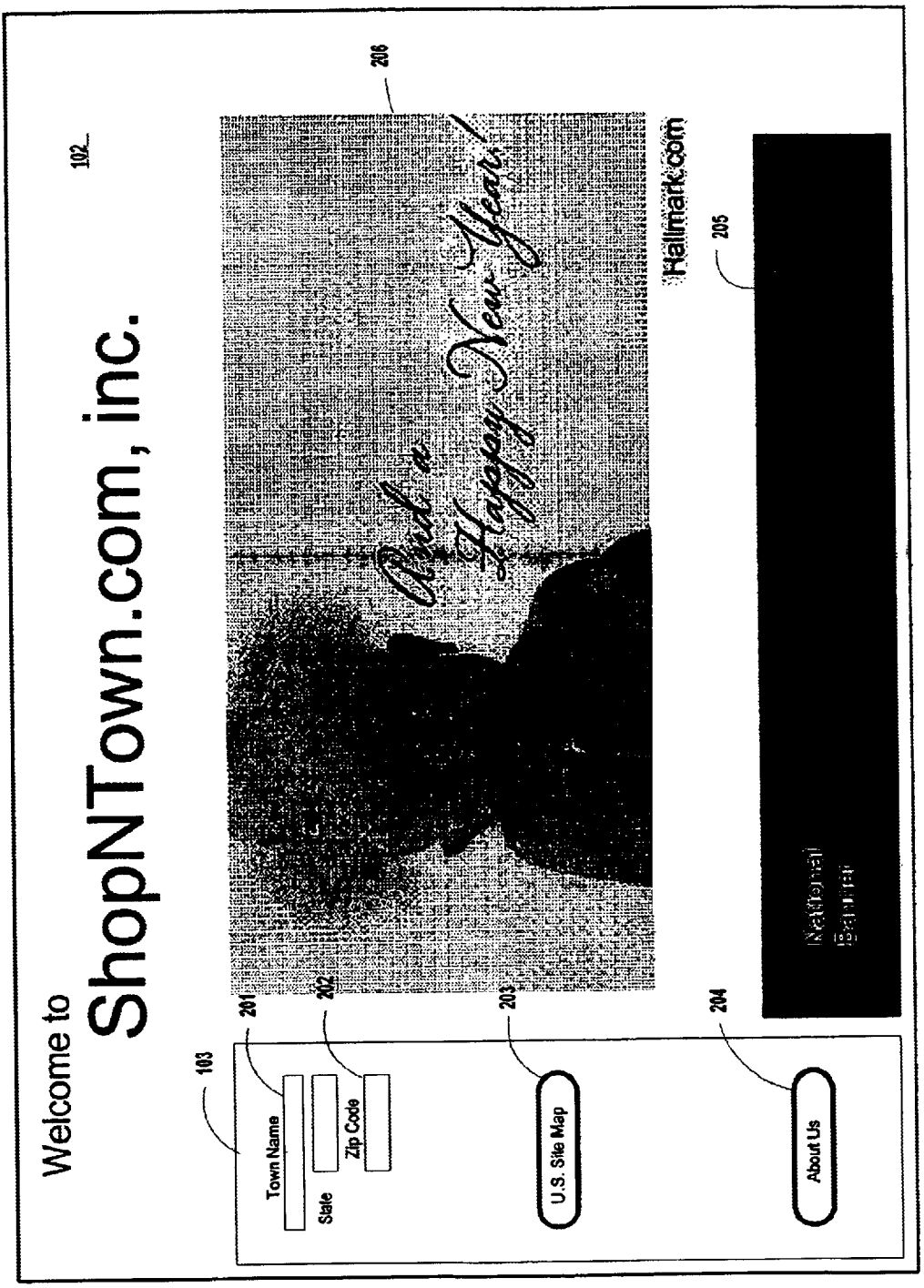
FIG. 2 is an exemplary screen display of the National Home Page.

Referring to FIGS. 1 and 2, a system for organizing Internet information based on discrete geographic and topical categories 10 is shown. While particular graphics, text, categories, hyper links and buttons are shown, it should be understood that other combinations, types and/or shapes of such items should be considered as likewise being within the scope of this invention.

The system 10 includes a plurality of software programs and a database. The software programs permit a user or Shopper to access and vary information contained within the database via the Internet. A shopper accessing a national home page 102 via the Internet initiates the system 10. The national home page 102 display home page data 103 illustrated in FIG. 2, which can include display banners, buttons and a zip code entry area. While zip codes are used in these examples, other postal symbols, codes or indicates of geographic location could be used within the scope of this invention.

Alternatively, as shown on FIG. 1, one or more small pictures 220 can be provided on home page 102. Clicking on one or more of those pictures 220 causes them to expand and fill a browser window. The national home page 102 is the first page or screen that the Shopper will see. The home page data 103 may include, but is not limited to, a "Select A Community" fill-in hyper-link 201; a "Zip Code" fill-in hyper-link 202; a "U.S. Site Map" hyper-link 203; an "About Us" hyper-link 204; a National Banner ad hyper-link 205; and/or an Ornamental Ad hyper-link 206. Fill-in hyper-links direct or link a user to a sub-directory, and therefore a different screen or page, based on information input into the space provided. For example, a fill-in hyper-link relating to states, such as Montana, would function by directing the user to a sub-directory relating to the state of Montana upon entry of the word "Montana" into the fill-in portion of the hyper-link. This type of hyper-link, therefore, saves screen space by eliminating the necessity of presenting a hyper-link for each state. The National Banner ad hyper-link 205 and the Ornamental Ad hyper-link 206 can be linked to an advertiser's web site.

Figure 10A:
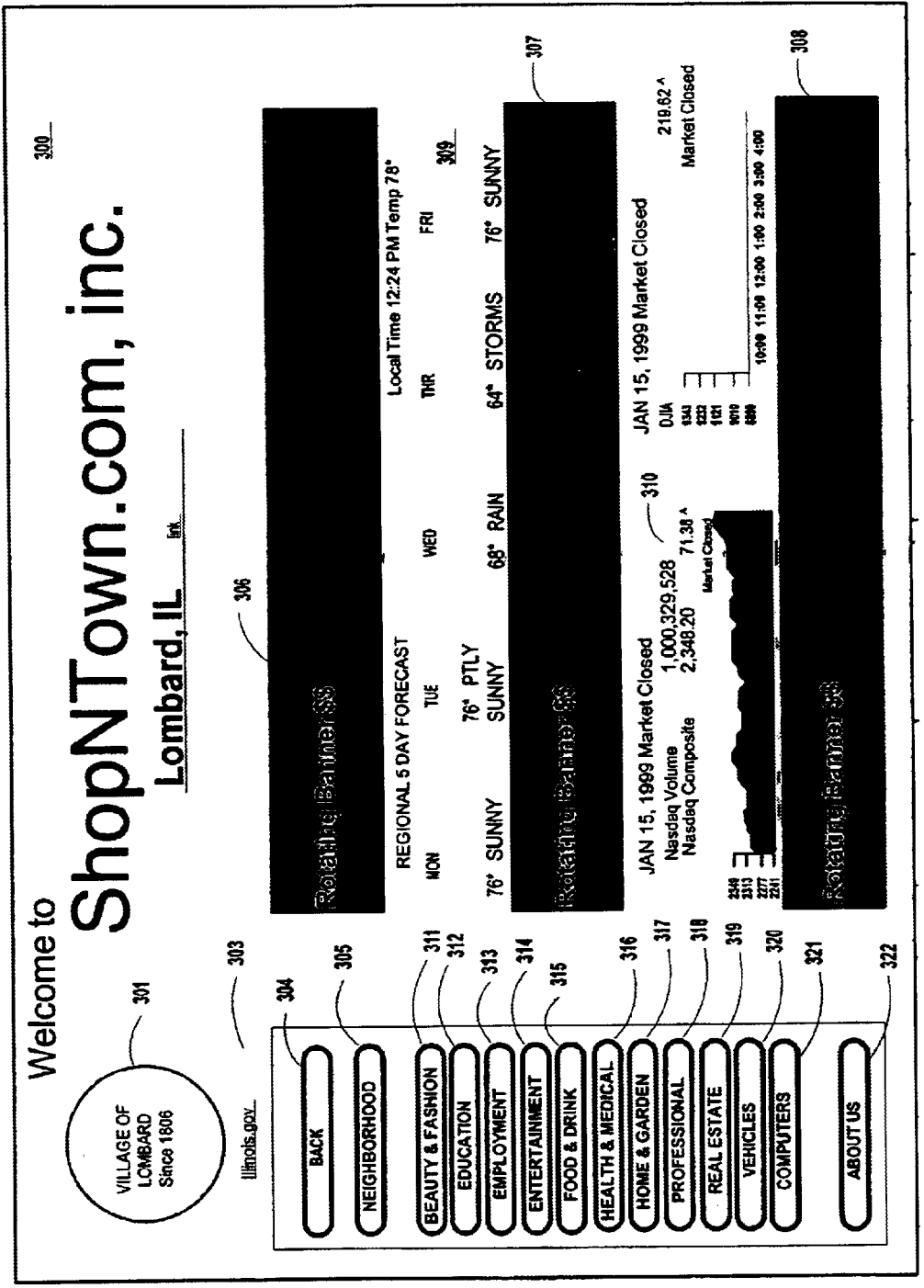
FIG. 10A is an exemplary screen display of the First Community Page for the Village of Lombard, Ill.

When the Shopper inputs either a zip code into the "Zip Code" hyper-link 202 or a name of a town into the "Town Name" hyper-link 201, the Shopper is linked to a First Community Page 300, as illustrated in FIG. 10A. Alternatively, the Shopper can select the Site Map hyper-link 203 and select a Town from the Site Map shown thereon. A town can be selected by clicking on one of the towns shown on the Site Map. The First Community Page 300, as illustrated in FIG. 10A, is typically the second page or screen, which the Shopper will see.

Figure 3:
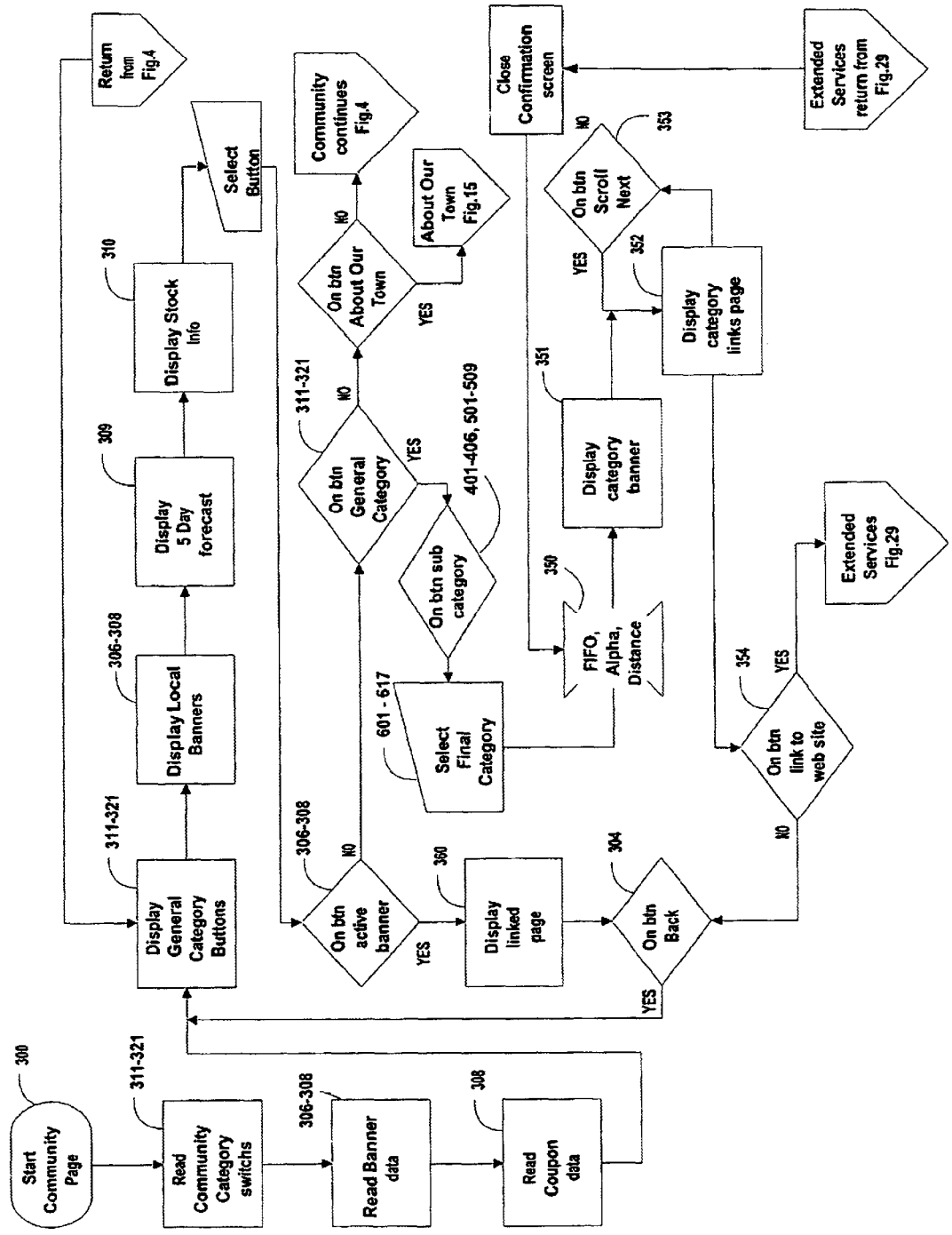
FIG. 3 is a system flow diagram that illustrates the sequence of events that occurs when a user or Shopper enters the First Community Page.
Figure 3A:
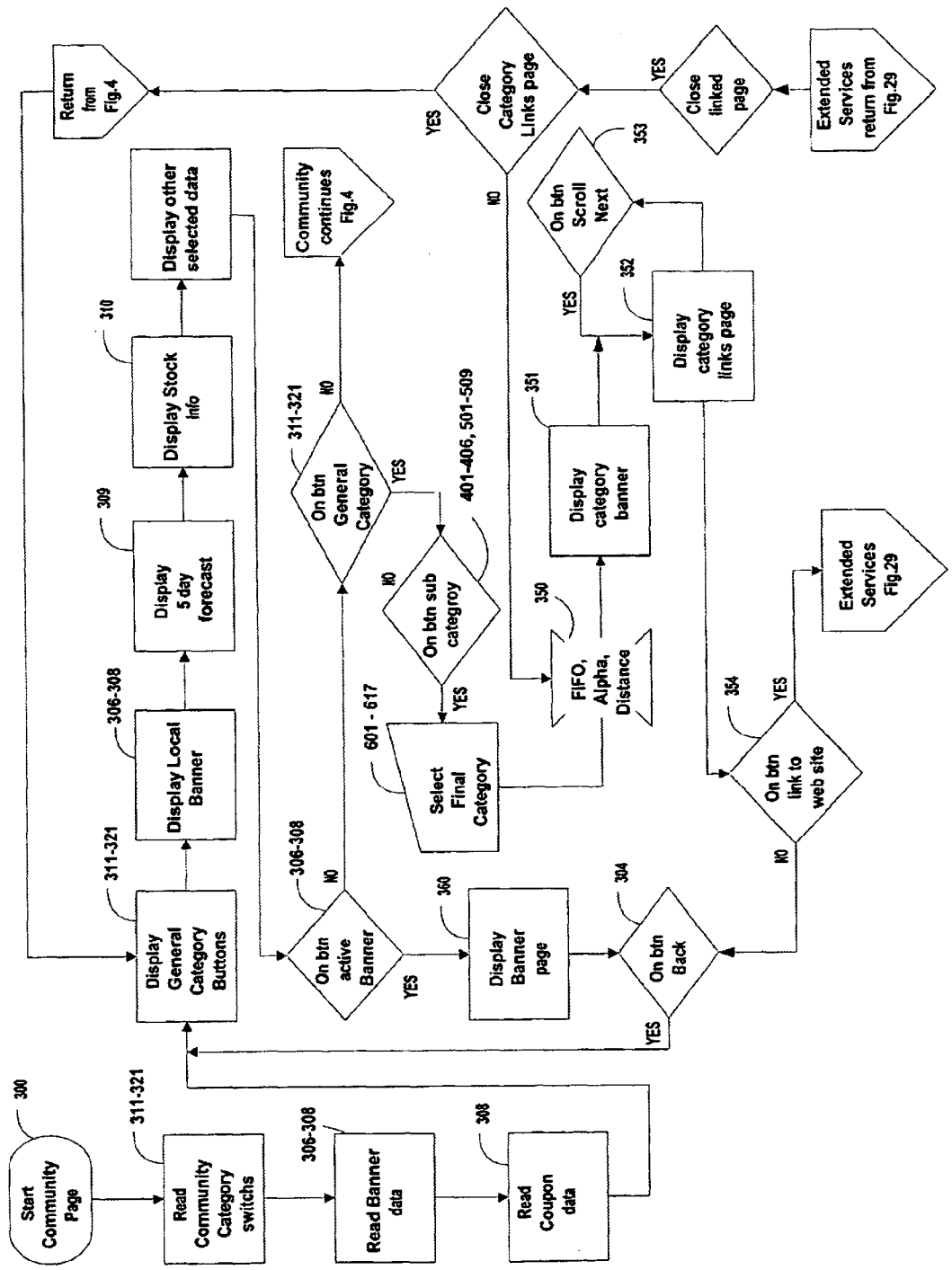
Figure 55:
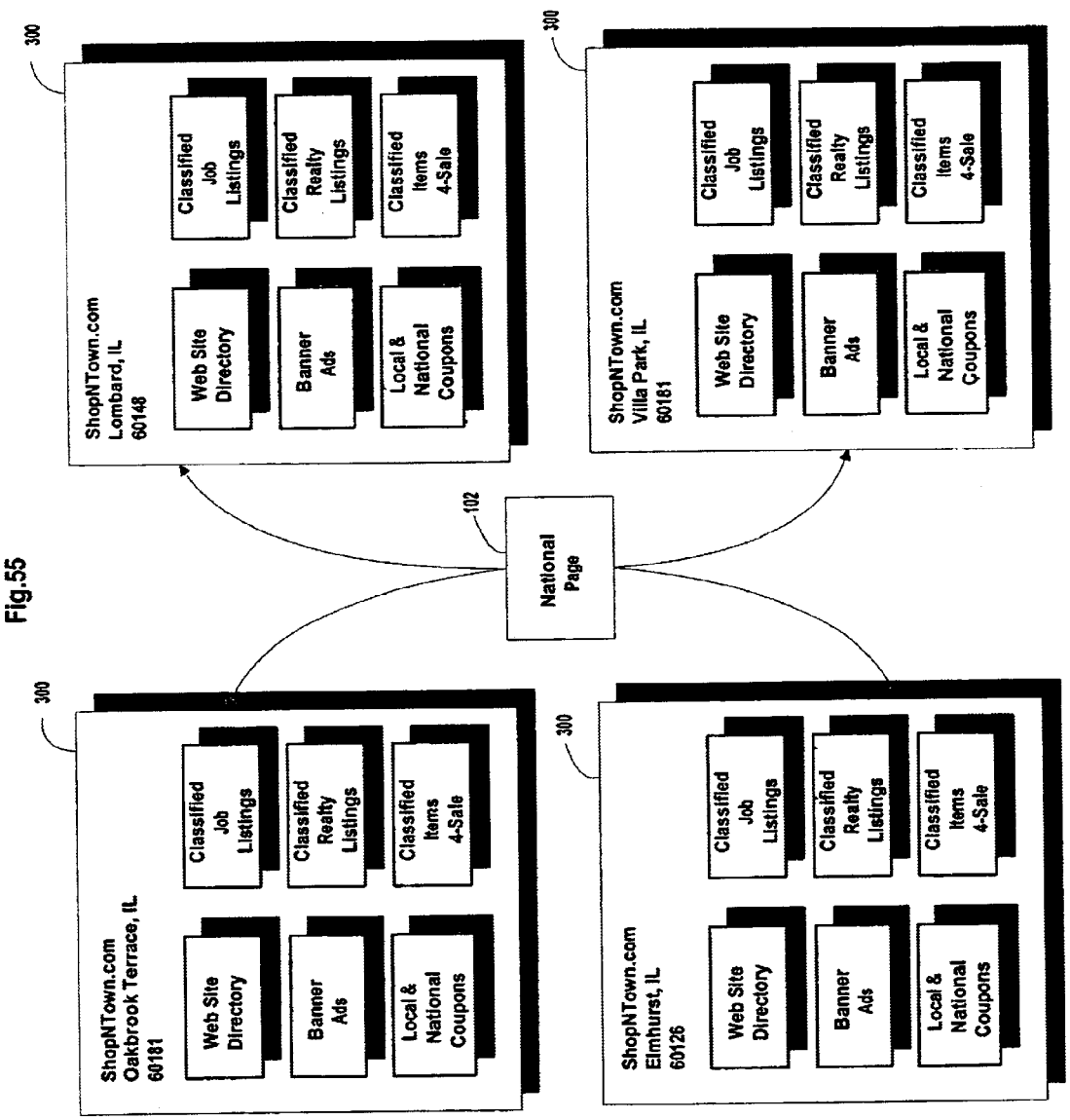
FIG. 55 is an illustration of several Community pages.

Each zip code relates to a separate First Community Page 300. For example, FIG. 55 shows four separate First Community Pages 300, each relating to a different zip code and town name. Though each community page 300 includes banner ads, local and national coupons, and topical listings, namely, classified job listings, classified items for sale, and classified realty listings, the specific information relating to each will usually vary between each First Community Page 300. The layout of each First Community Page 300 is generally the same as well, but the hyper-links and data will vary. The schematic or flow chart for a typical First Community Page 300 and, in particular, the Means for displaying information and Means for selecting categories is shown in FIG. 3. Each Community Page 300 will relate to a particular community, town or other indicators or indices of geographic area. For example, FIG. 10A is an exemplary screen display for the First Community Page 300 for Lombard, Ill. and contains a Village Seal 301 for the Village of Lombard, which serves as the hyper-link that would link the system 10 to the web site for the Village of Lombard. Likewise, an Illinois Government hyper-link 303 links the system 10 to the official web site for the State of Illinois. The button displays and hyper-links on the First Community Page 300 include, but are not limited to: a "Back" hyper-link 304, a "Neighborhood" hyper-link 305; Rotating Banners 306–308 which are advertising banners; a Weather Chart display 309; and a Stock Information display 310. Since advertising revenue is generated, at least in part, based upon the number of Shoppers which visit the system 10 (commonly referred to as "hits") the Weather Chart 309 information hyper-links and Stock Information 310 information hyper-links are provided as both a public service and means for attracting the maximum number of Shoppers to the system. The "Back" 304 hyper-links takes the Shopper back to the previous screen. The First Community Page 300 can also contain information about schools, churches, organizations and/or local government.

The general categories of businesses available to the Shopper on the First Community Page 300, as shown in FIG. 3, are accessed by using the following General Category hyper-links; a "Beauty and Fashion" hyper-link 311; an "Education" hyper-link 312; an "Employment" hyper-link 313; an "Entertainment" hyper-link 314; a "Food & Drink" hyper-link 315; a "Health & Medical" hyper-link 316; a "Home & Garden" hyper-link 317; a "Professional" hyper-link 318; a "Real Estate" hyper-link 319; a "Vehicles"

hyer-link 320; and a "Computer" hyper-link 312. An "About Us" hyper-link 322 can also be provided. If a general category 311–321 is selected, then sub-categories 401–406, 501–509 becomes available for selection. If no general category button 311–321 is selected, then the Community page 300 continues, as shown in FIG. 4.

Figure 4:
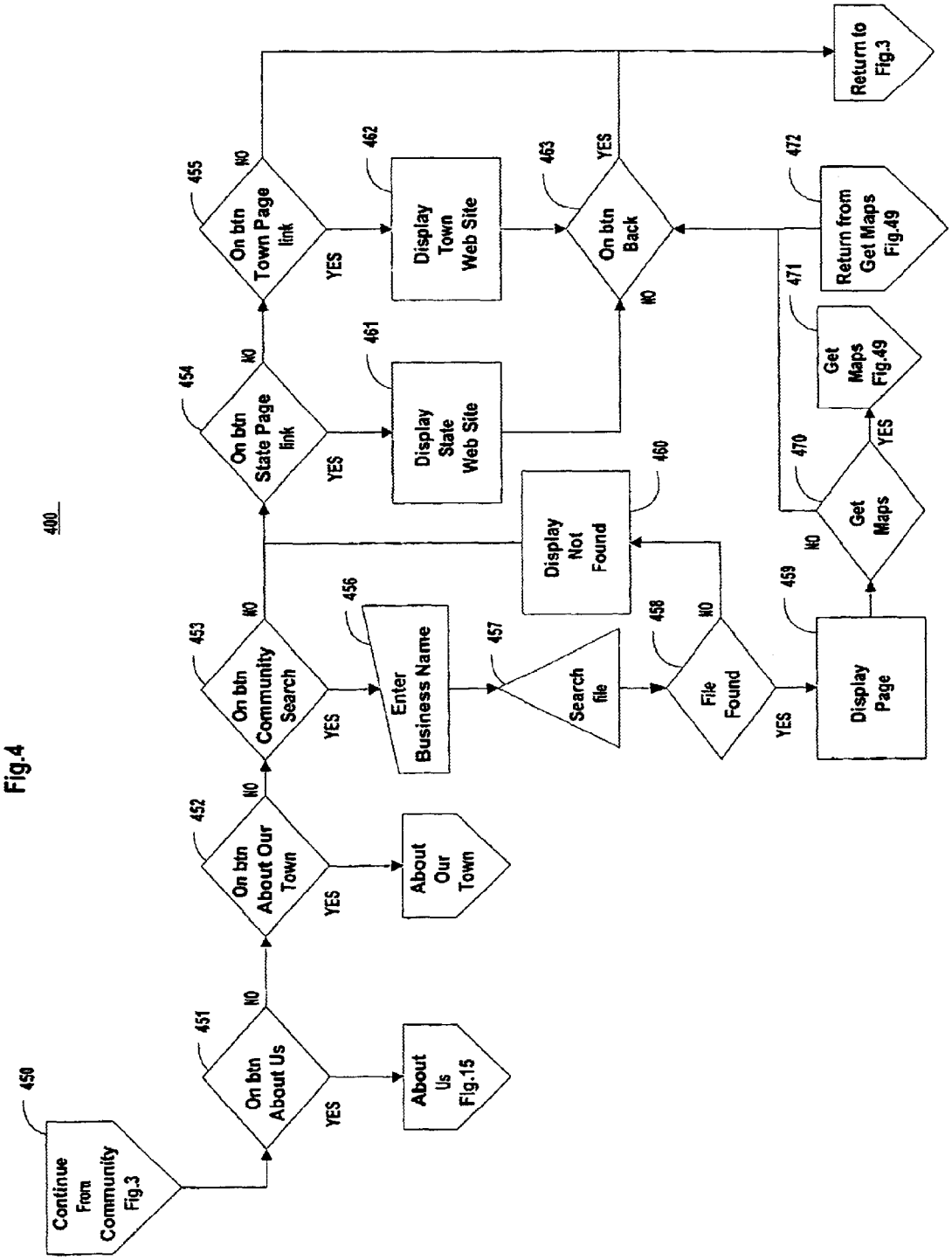
FIG. 4 is a system flow diagram that illustrates the sequence of events that occurs when a user or Shopper enters the Second Community Page.
Figure 15:
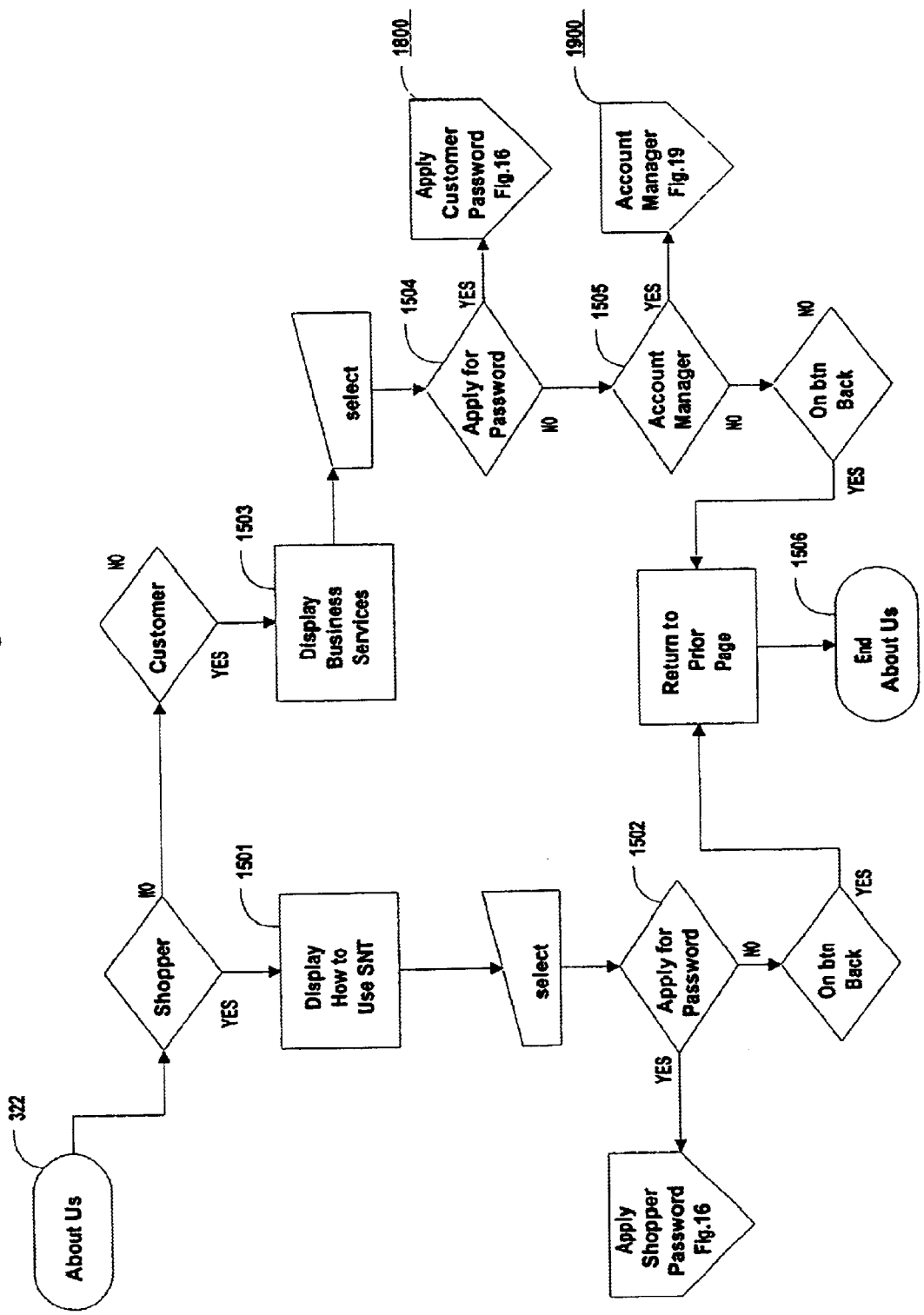
FIG. 15 is a system flow diagram of the "About Us" operations for the Community Page.
Figure 41:
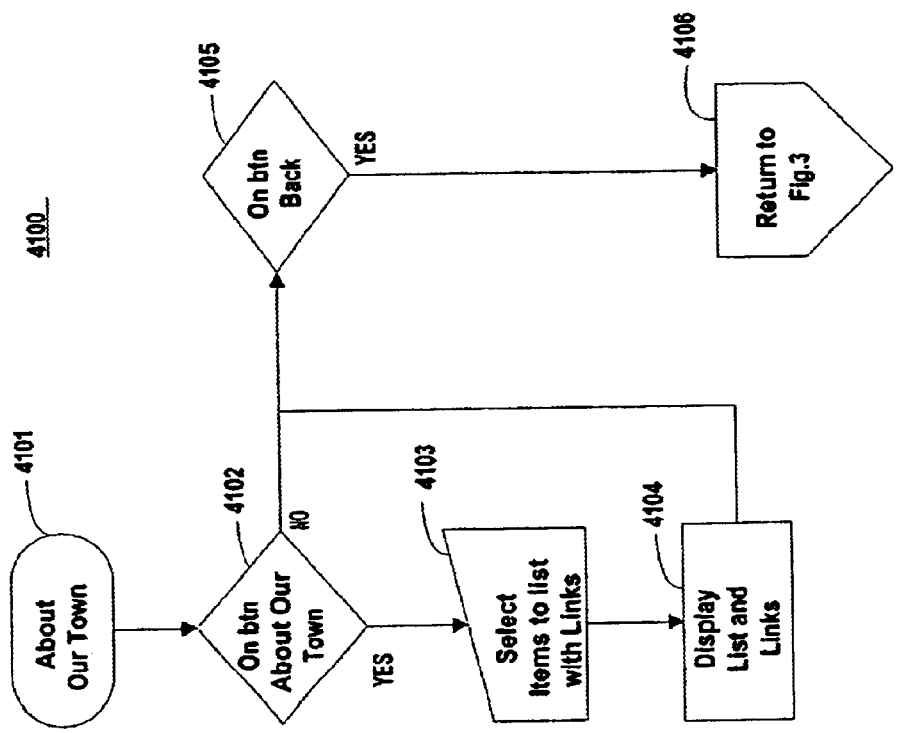
FIG. 41 is a system flow diagram of the Town specific operations.

As shown in FIG. 4, a Second Community Page 450 includes hyper-links which can be linked to the following pages: an "About Us" page 451 described in FIG. 15; an "About Our Town" hyper-link 452 described in FIG. 41; a "Community Search" fill-in hyper-link 453; a "Town" fill-in hyper-link 455; and a "State" hyper-link 454 which would display the State's 461.

In the Community Search fill-in hyper-link 453, the Shopper may enter a Business Name 456. A file is searched 457, and if found 458, it is then displayed 459. The "Town" fill-in hyper-link 455 displays Town 462. The "Back" hyper-link 463 is used to return the Second Community Page 450 (FIG. 3). When a page is displayed 459, the opportunity is provided to select to get maps 470 and obtain such maps 471. (See, FIG. 49). A return from the map page is provided by back button 463.

Figure 4A:
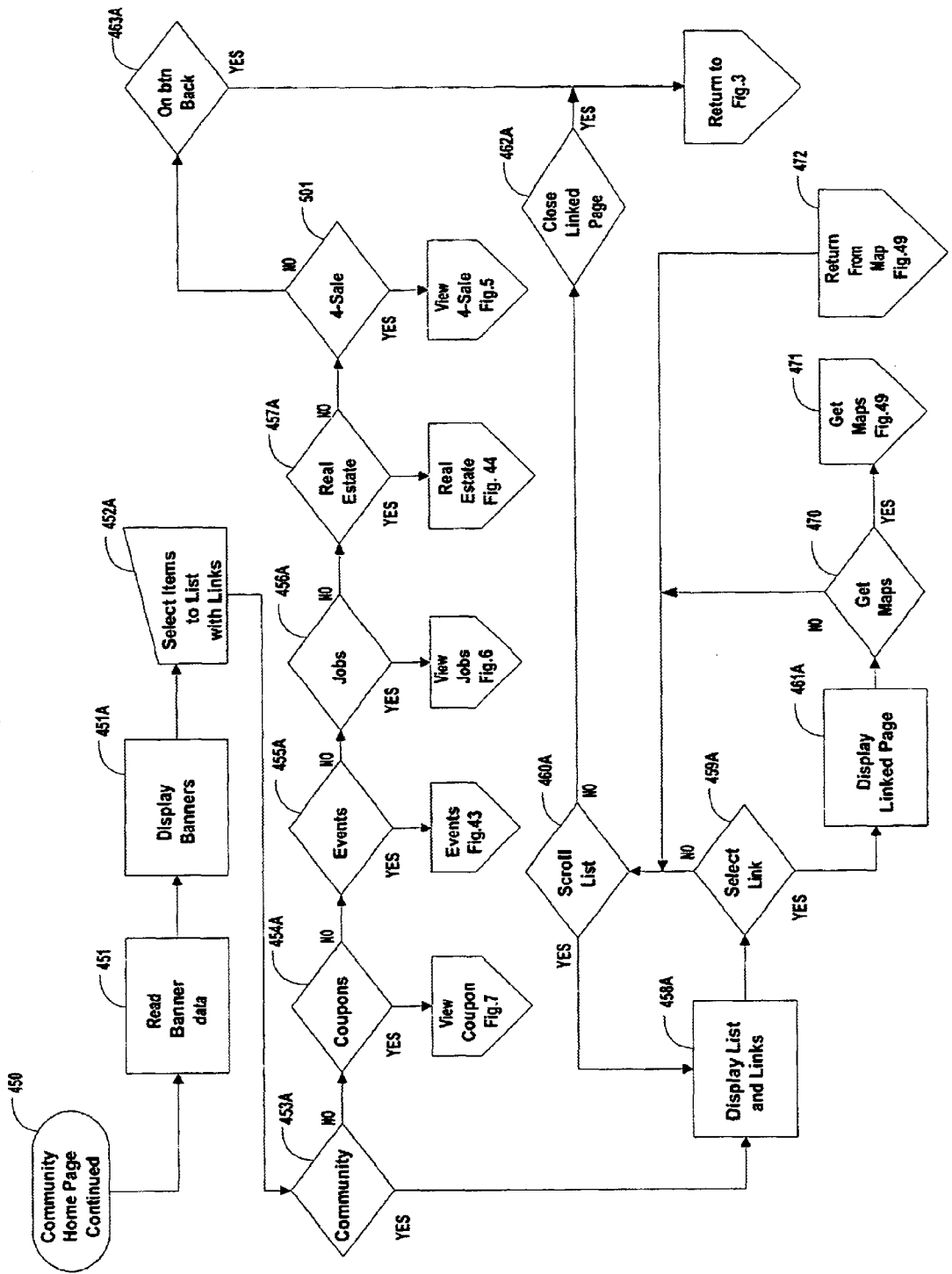
FIG. 4A is a system flow diagram of the town specific operations for the Community Page.
Figure 10C:
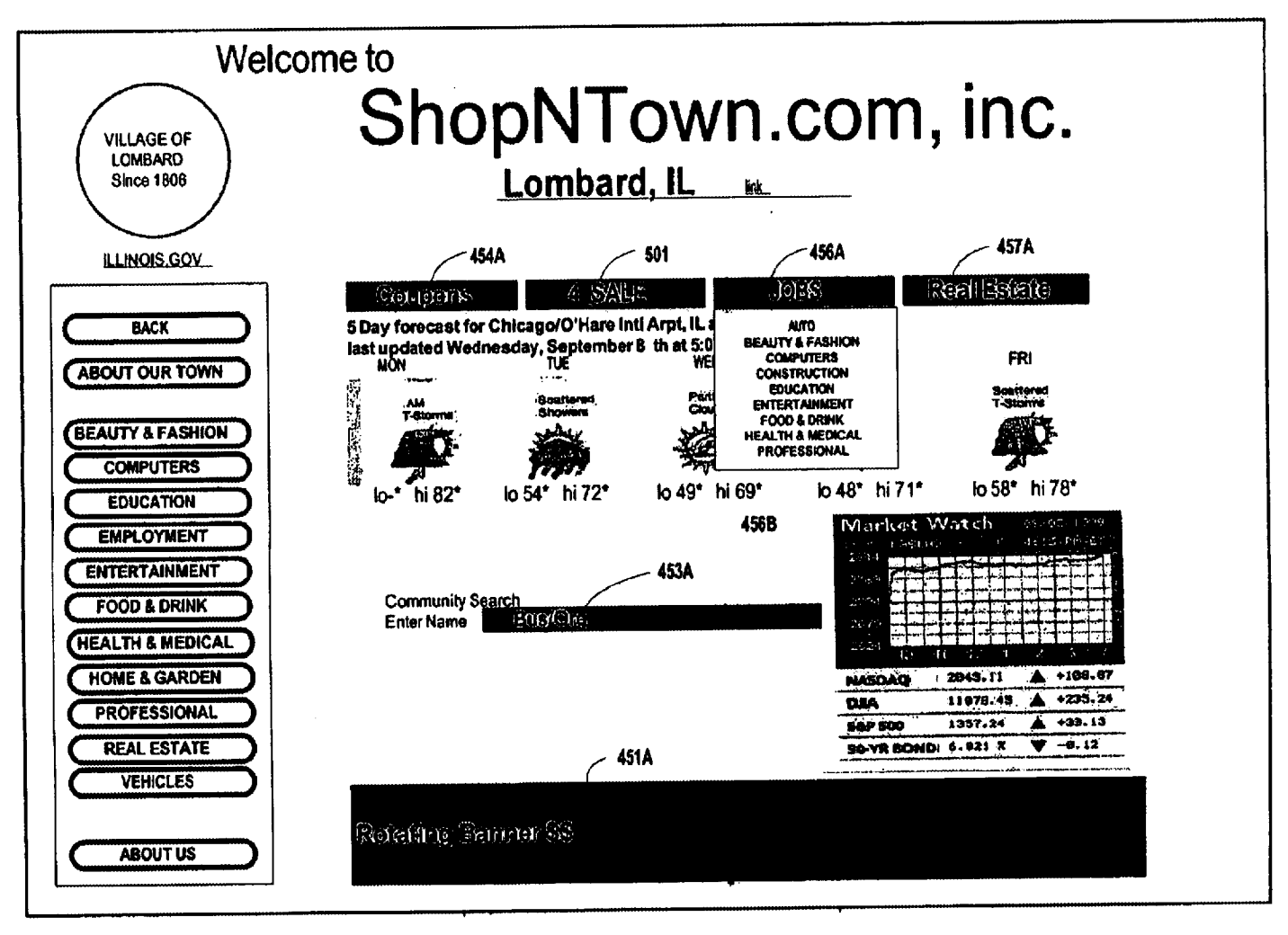

Town specific operations are shown in FIG. 4A. Community page 450 of FIG. 4A, as shown in FIG. 10B, provides the opportunity to read Banner data 451, such as Banner 451A. The displays or hyper-links which can be selected 452A include: Community 453A; Coupons 454A; Events 455A; Jobs 456A; Real Ester 457A; and 4-Sale 501. Selection of Coupons 454A links one to the Coupon Page described in FIG. 7. Selection of Events 455A links one to the Events Page process or view described in FIG. 43. Selection of Jobs 456A links one to the View Jobs Page described in FIG. 6. Selection of Real Estate 457A links to the process or view described in FIG. 44. As shown in FIGS. 10B and 10C, selection of any one of the links 454A, 501, 456A and 457A, and for example 456A, results in a pull down menu 456B for selecting categories. Selection of 4-Sale 501 links to 4-Sale Page view or process described in FIG. 5. Selection of Community 453A displays list and links 458A specific for that community. If a link is selected 459A, one can scroll through the list of links 460A and if a link is selected, the linked page is displayed 461A. The opportunity to select maps 470–472 can also be provided. Once the linked page is closed 462A, one is returned to community Page 300.

Items posted in "4 Sale" 501 classified ads are grouped by category such as by the nature of the items being sold. Means are provided for such items to be viewed by anyone reaching the system 10 for free, without the need to use a password, by selecting "4 Sale" hyper-link 501, as shown on the page of FIG. 10B so as to hyper-link to the "4 Sale" page. Posting items to the "4 Sale" 501 list is also free of charge in one community, but requires a Password obtained via e-mail. If a user wishes to post an item in more than one Community, the user is required to pay a fee. The information provided in order to obtain a Password can also be used to make sure that multiple community listings are not obtained without paying the requisite fee. The posting on "4 Sale" 501 will run for a set number of days and then will be automatically deleted.

Figure 5:
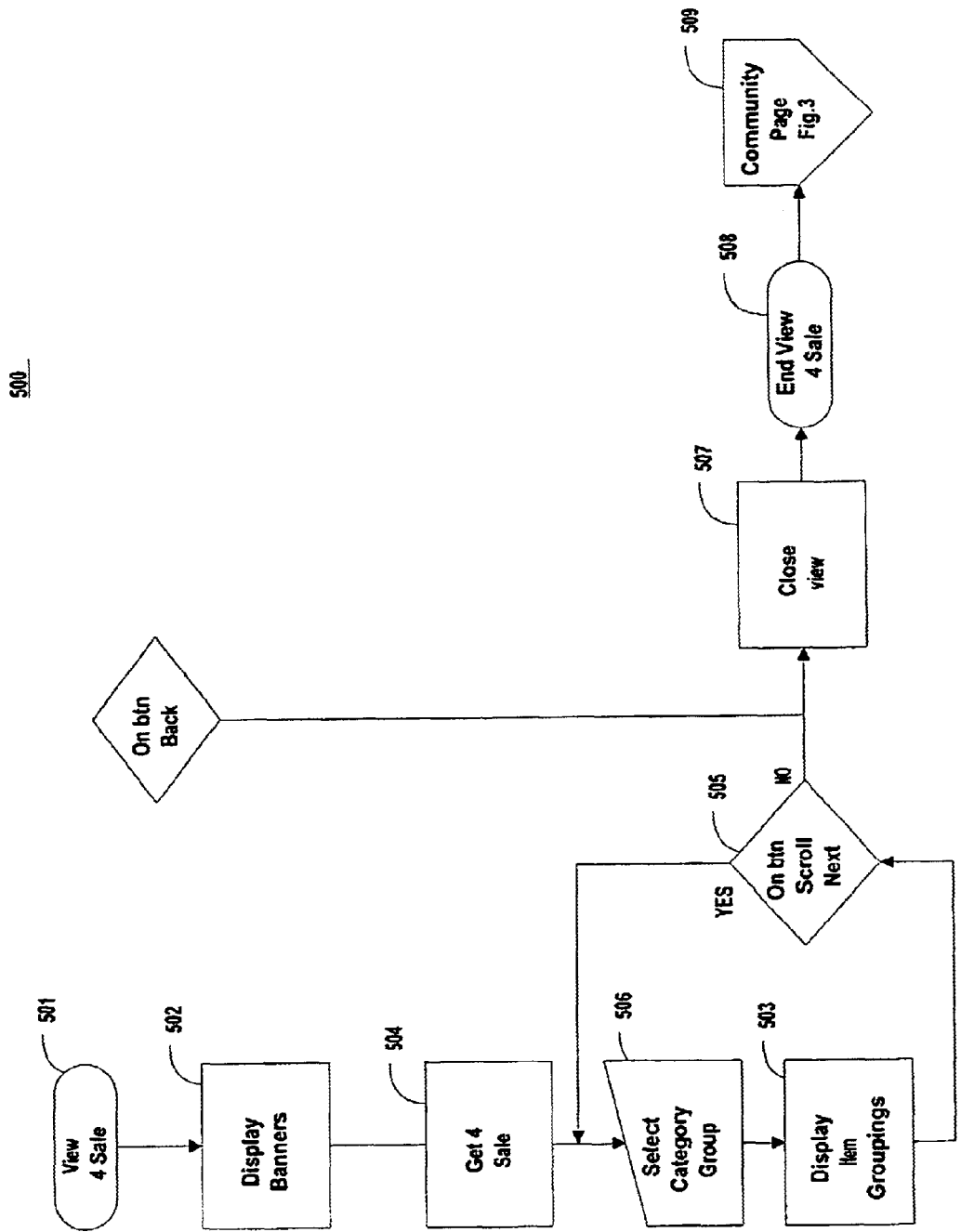
FIG. 5 is a system flow diagram of the "4 Sale" operations for the Community Page.

As shown in FIG. 5, once the user requests to view the "4 Sale" 501, display banners are shown 502. A Category Group 506 is selected, Item Groupings 503 are shown within "4 Sale" 501 and the scroll button 505 is used to move between end View 4 Sale 508 and return to Community Page 509 (FIG. 3). If a shopper finds an item listed of interest, the Shopper may make an offer to the seller of the posted sale item by e-mail or fax.

Alternatively, as shown in FIG. 5A, the means for posting an item for sale on a "Best Offer" basis, instead of posting a selling price or no selling price at all, can be provided. Such a posting could be free, but require the Shopper to be registered with the system. Item Groupings and Best Offers would be displayed 503. The user would select Best Offer 510 and enter their Password and designate that the items was being sold on a Best Offer 511 basis. The password would be checked 512 and if invalid, an error message would be displayed 515. If valid, the Shopper Registration is verified 516. If the Shopper is Registered 517, then the best offer is stored 520, a fax or email is sent 521 and the offer confirmation displayed 522. The originator of the Best Offer listing can choose whether to receive such Best Offers by email or fax. A close date can be set by the user/seller, after which no further offers will be accepted and the transaction processed with respect to the verified Shopper making the best offer during the period when the offers could be made.

Figure 40:
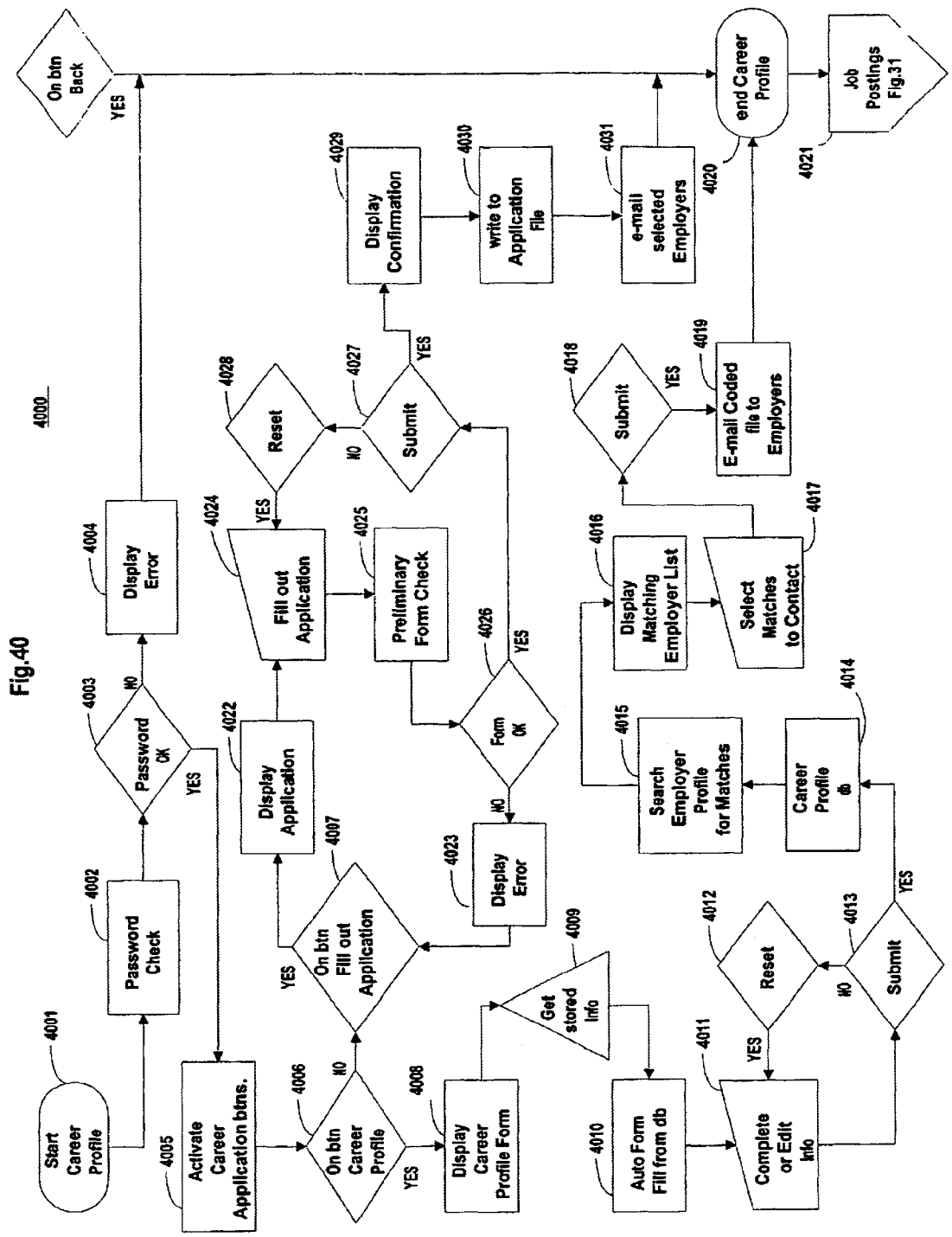
FIG. 40 is a system flow diagram of the Career Profile operations.

Job Description provides means to list Job Openings for viewing by Shoppers, Employers or Merchants, without the need for a Password. As shown in FIG. 6, Job Data 5602 is accessed, a Job Title is selected 5605 and Job Postings 5603 are displayed by groupings. The Shopper can scroll between listings 5604. The A "Check Boxes" button is activated 5606 and Check Boxes for Employers is selected 5607. The user or Shopper may select which employers the user wishes to send his or her employment information (i.e. resume) to by "checking" a box 5607 located proximal to each listing 5604. After Boxes are checked for Employers 5607, the Application is sent to the selected Employers by e-mail (FIG. 40). If the "Check Boxes" button is not selected, the user skips to a Career Profile page 5608. Alternatively, as shown in FIG. 6A, Career profile steps 5608A and 5608 can be omitted. With respect to applications or resumes for job openings, the originator of the listing being responded to can choose to receive such responses by email and/or fax.

Means for viewing coupons on the system 10 by Shoppers are provided without the need for a Password 701. As shown in FIG. 7, the coupon data is retrieved 702 and the coupons are displayed by groupings 703. Coupons are then selected 704 and printed 705. Shoppers can scroll between the Coupons 706.

As alternatively shown in FIG. 7A, the list of coupons can be scrolled 707, selected and coupons printed 708. A coupon print preview is displayed 709 and printing can be cancelled if desired 710. If cancelled, the groupings of coupons are repeated 703. If not cancelled, then the selected coupons 711 are printed 705. Otherwise, the back link 712 leads to closing the view 713 and ending the View Coupons page 714 and return to the Community Home Page as described in FIG. 4A.

Merchants with a password can access the system, and for a fee can select or create a coupon having expiration as short as one day or as long as desired. Once the expiration date is reached, the system automatically removes the coupon from these being displayed. Accordingly, a Merchant using the system can not only target the town or locality in which a coupon will be displayed; but can also specify the amount of time it will be display and available for a Shopper to download, print and use. Because of the substantially automated manner in which a Merchant can itself design, post and pay for a coupon or ad online, as well as the substantially automated nature in which the ad or coupon becomes displayed in the selected geographic areas and categories, within a short period of time. Merchants can quickly respond to sudden overages or perishable product situations. Such Merchants can create, place and pay for ads or coupons at other than normal business times or on very short notice and have such ads run for only a day or even less. Also, a percentage of each fee could be designated to go to a selected or default charity.

Figure 8:
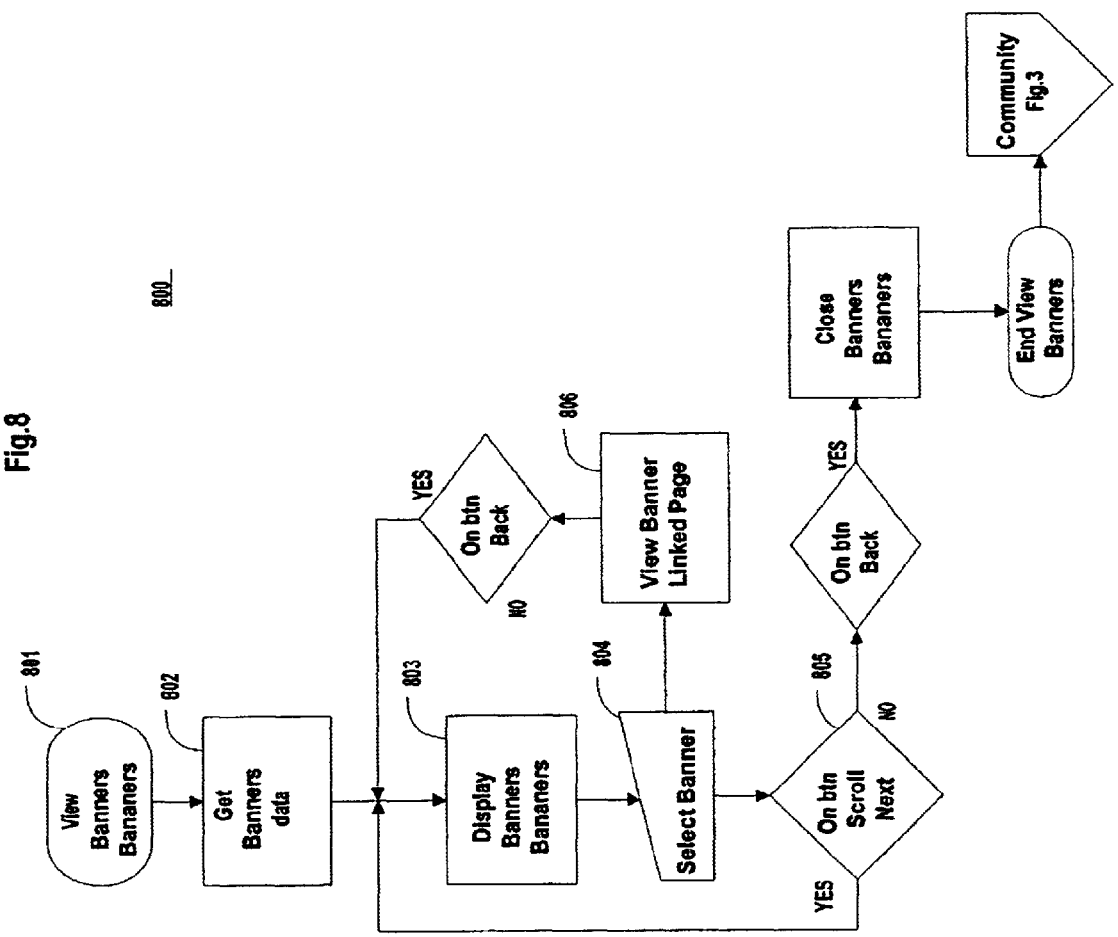
FIG. 8 is a system flow diagram of the Banner Advertisement viewing operations for the Community Page.
Figure 8A:
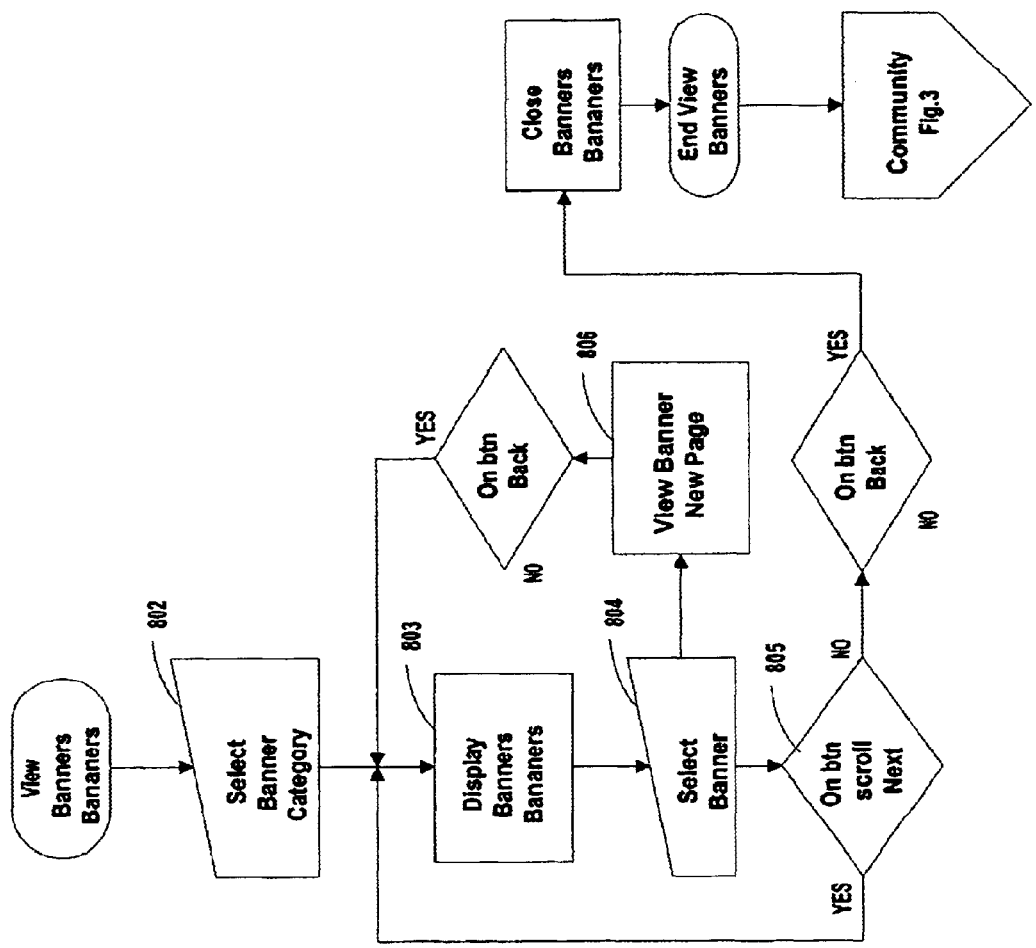
FIG. 8A is a system flow diagram for an alternative for the Banner Advertisement viewing operations for the Community Page.

Means for viewing Banner Ads by Shoppers are provided without the need for a Password. As shown in FIG. 8, Banner data 802 is retrieved and Banner Ads 803 are displayed on the system 10. The Banner Ads 803 are hyper-links which direct or link the user to the web site of the advertiser 806. Selection of a Banner Ad results in viewing the web site of the advertiser 806. Shoppers can scroll between the Banner Ads 805. Alternatively, as shown in FIG. 8A, the banner category can be selected 803, corresponding to 306–308 of FIG. 3, before the banners are displayed 803.

Means for Shoppers to post "4 Sale" 501 items, by using their Password, are also provided. Such 4 Sale posting could be, but need not be, free of charge. Such items can be posted only one a single Community page. E-mail addresses of the Shoppers are used to confirm that they are listing such "4 Sale" 501 items only on a single Community page.

As shown in FIG. 9, the Shopper uses his or her Password 902 and provides a sale description 903. A Sales Category 904 is selected as is a Town 906. The cost is displayed 907 and if accepted 908, credit card payment is made 909 and the data stored 910 prior to returning to the Community Page. Alternatively, as shown in FIG. 9A, after the sale description is filled out 903, it can be designated as a Best Offer sale 911 and a minimum offer can be set 912, before the sales category is selected 904.

Means are provided for Shoppers viewing the Community Page 300 to read the Community Category information 311–321; the Banner Ads 306–308; the Weather Chart 309 and Stock Information 310. The Community Page 300 can also contain Coupons 323 (not shown) which can be selected and printed out by the Shopper for use at the business establishment of the advertiser. The Banner Ads 306–308, in the preferred embodiment, are placed by Merchants in that town or area.

Community Page 300, as shown in FIG. 10A, displays General Category s hyper-links 311–321; Local Banner Ads 306–308 which can be linked to the web sites of those advertisers; Weather Forecast chart 309 and Stock Information chart 310. Means are provided for a Shopper to click on the active Local Banner ads 306–308 which are hyper-linked to the web site of the relevant advertiser.

Figure 11:
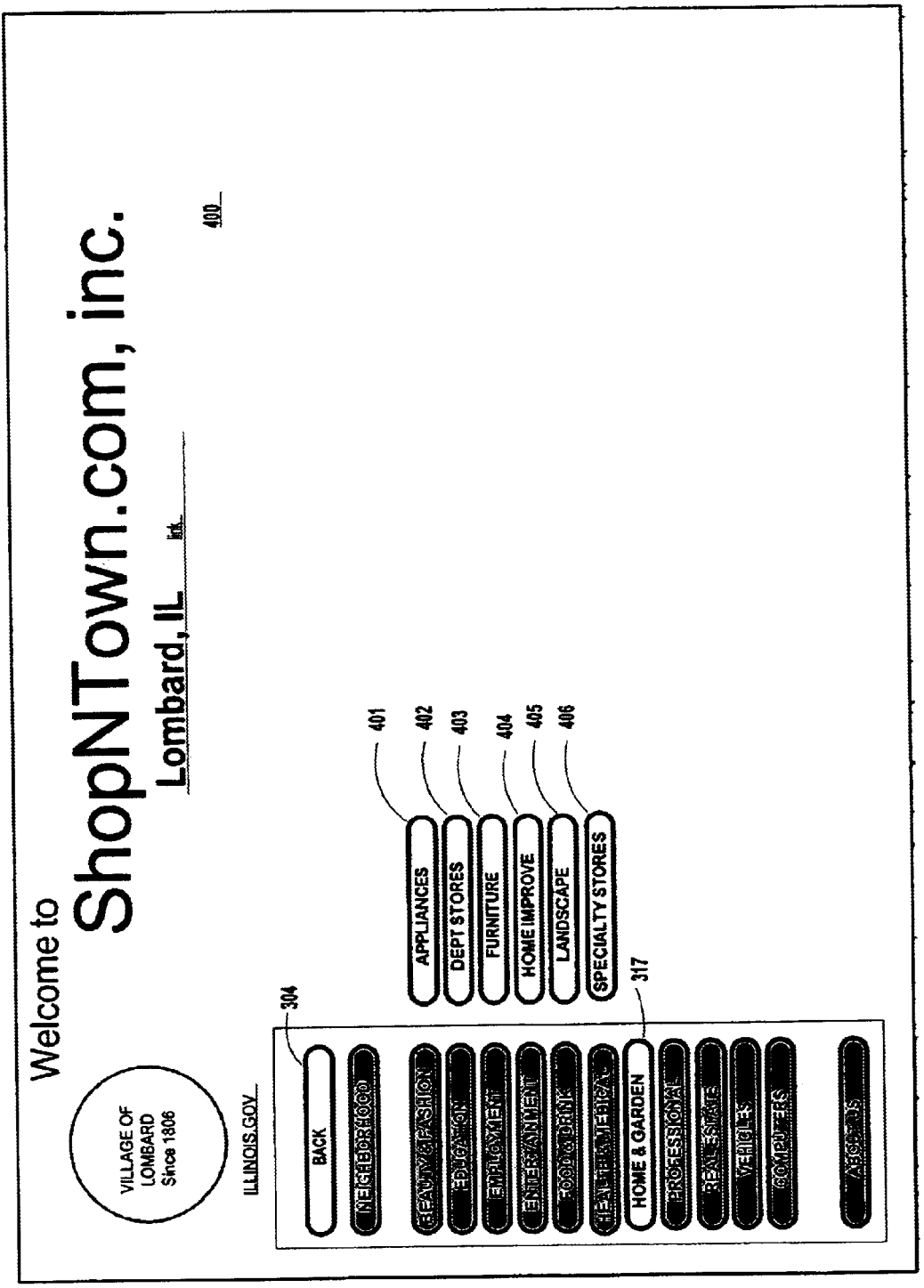
FIG. 11 is an exemplary screen display of the "Home & Garden" categories for the Village of Lombard, Ill.

Alternatively, the Shopper can select the General Category buttons 311–321, as shown as in FIG. 11 with respect to the General Category hyper-link 317 for "Home & Garden", the next Screen 400 will show the following sub-category hyper-links: ∫"Appliances" 401; "Department Stores" 402; "Furniture" 403; "Home Improvement" 404; "Landscape" 405; and "Specialty Stores" 406.

Figure 12:
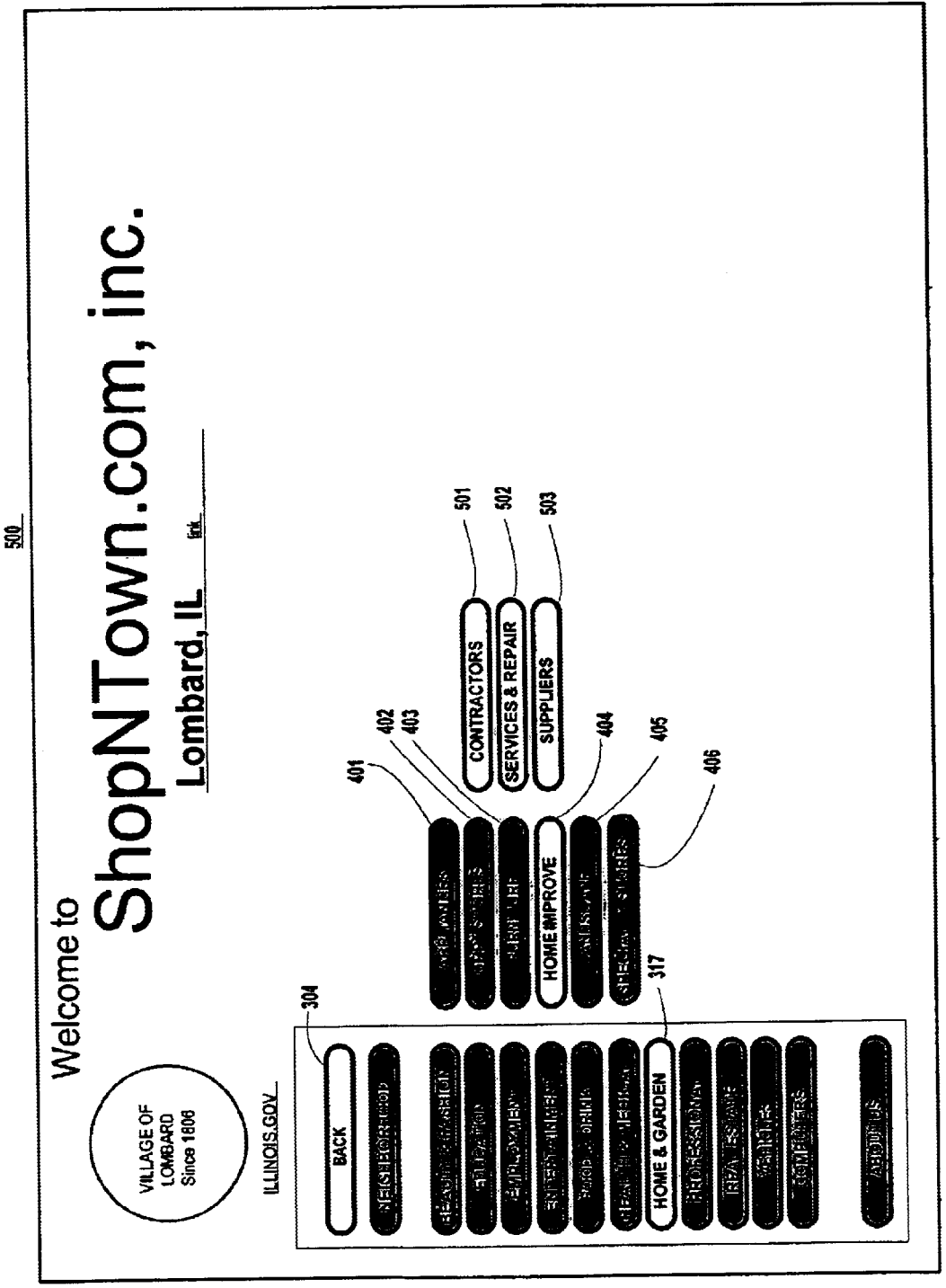
FIG. 12 is an exemplary screen display of the "Home Improv" sub-categories for the Village of Lombard, Ill.

As shown in FIG. 12, if "Home Improve" 404 is selected, the next screen will display categories relating thereto, such as: "Contractors" 501; "Services & Repair" 502; and "Suppliers" 503. As shown in screen FIG. 13, if, for instance, "Contractors" 501 is selected, the following Final Categories would appear on the next screen Contractors Final Categories 600: "Additions" 601; "Blacktop" 603; "Brick & Masonry" 603; "Carpenters" 604; "Cabinet Makers" 605; "Concrete" 606; "Counter Tops" 607; "Decorators" 608; "Electricians" 609; "Flooring" 610; "General Contractor" 611; "Paint & Wallpaper" 612; "Plumbers" 613; "Siding & Windows" 614; "Glass & Mirrors" 615; "Heating & Cooling" 616; and "Roofing & Gutters" 617. Hyper-links which are not selected such as "Suppliers" 503 and "Services & Repair" 502 would appear as darkened or unlit. Likewise, Final Categories that are not linked to businesses, or which have no businesses listed in that category, in this example, such as "Heating & Cooling" 616 and "Roofing & Gutters" 617 are shown as darkened in FIG. 13 and otherwise rendered as inoperative since there are no business web pages to link to in that category. Hence, Shoppers will not be made to select links that do not lead to relevant business web sites.

Figure 13:
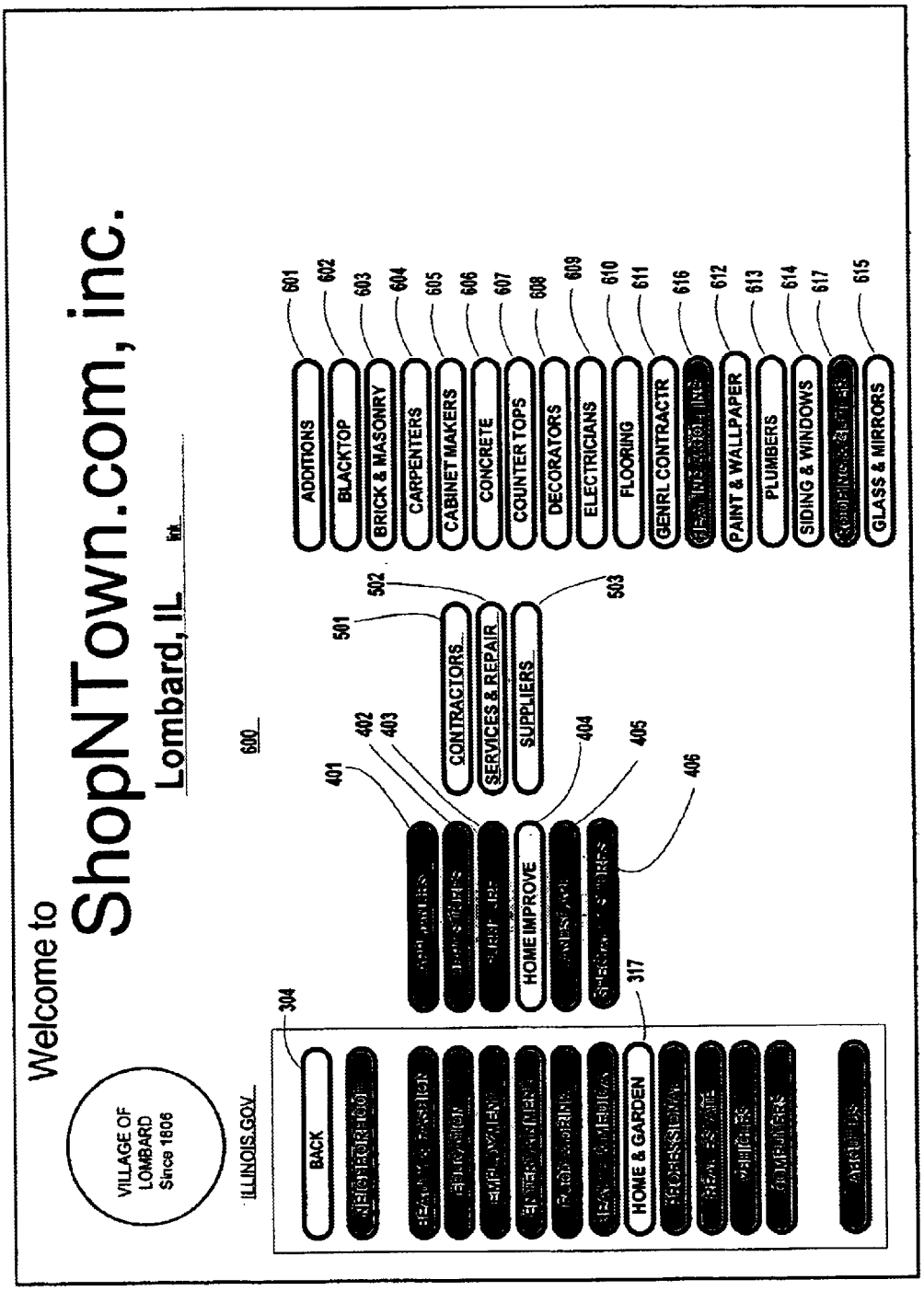
FIG. 13 is an exemplary screen display of the "Contractors" final categories for the Village of Lombard, Ill.

On the Contractors Final Category Screen 600 shown in FIG. 13, the Shopper can scroll between Subcategory hyper-links 401–406. Likewise, the Shopper can scroll between several Second Level Categories 501–503. When the Shopper reaches the Contractors Final Category Screen 600 shown in FIG. 13, one of the Final Categories 601–615 can be selected.

As shown in FIG. 3, the First Community Page 300 starts by reading Community Category 311–321, Banner data 306–308 and Coupon date 308. General Category Buttons 311–321; Local Banner 306–308; Weather Forecast 309 and Stock Information 310 are displayed. Selecting Active Banner Ads 306–308 displays a linked web site of that Merchant. Selecting General Category 311–321 displays Sub-Categories 401–406, 501–503 and leads to Final Categories 601–617. FIFO, Alpha and/or Distance 350 are algorithms which can be used to determine the order in which the Merchants within a given category are displayed. For instance, the Merchant that subscribed first in time would be shown first in FIFO, which stands for "first in, first out". Merchants would be displayed in order or proximity to the locality in a Distance algorithm. Merchants would be listed alphabetically if an Alpha algorithm is used. A Category Banner 351 is displayed which by scrolling 353 displays the Category Links page 352 and, in turn, the linked 354. The Back hyper-link 304 can then be used to return to prior screens and thereby select from the Categories or Subcategories. Active Banner Ads 306–308 lead to linked web pages 306.

Figure 14:
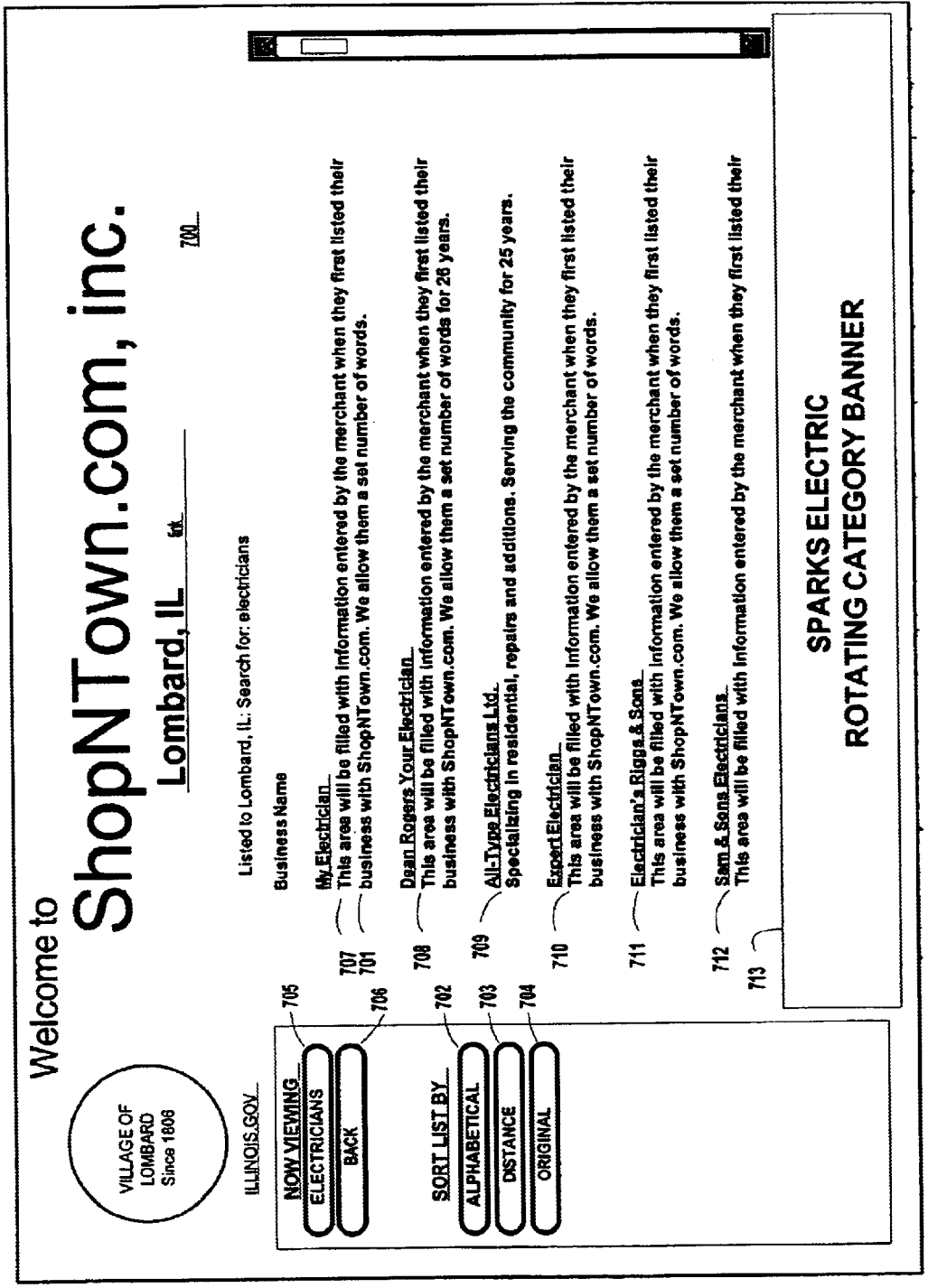
FIG. 14 is an exemplary screen display of the "Electricians" business listings for the Village of Lombard, Ill.

For instance, as shown in FIG. 13, Means are provided for selecting a listed Merchant. If "Electricians" 609 is selected by the Shopper, an Electricians Screen 700, as shown in FIG. 14, displays a listing of "Electricians" 701 which can be stored by selecting the following hyper-links: "Alphabetically" 702; "Distance From Town" 703; or "As Originally Listed" 704. The Electricians Screen 700 of FIG. 14 also displays which Final Category are being displayed 705, as well as a "Back" hyper-link 706 which allows the user to return to prior screens. Each of the business listings 707–712 contains advertising text selected by the Merchant being listed. The screen of FIG. 14 also contains an Active Banner Ad 713 that has relevance to the Community and the Category selected. Selection of the Active Banner Ad 713 can also provide a direct link to the web page of that Merchant.

Selecting the "This Community or Neighborhood" hyper-link 305 in FIG. 10A is a main category button that drills to listings of events, classifieds, government, and organizations. In FIG. 10B, About Our Town replaces "Neighborhood". FIG. 4 shows that the First Community Page 300 includes an "About Us" hyper-link which is linked to an About Us page 322. As shown in FIG. 15, the "About Us" page 322 provides information for Shoppers and Merchants. Merchants or Customers can comprise the businesses and organizations listed on the system 10 to promote their business.

Figure 16:
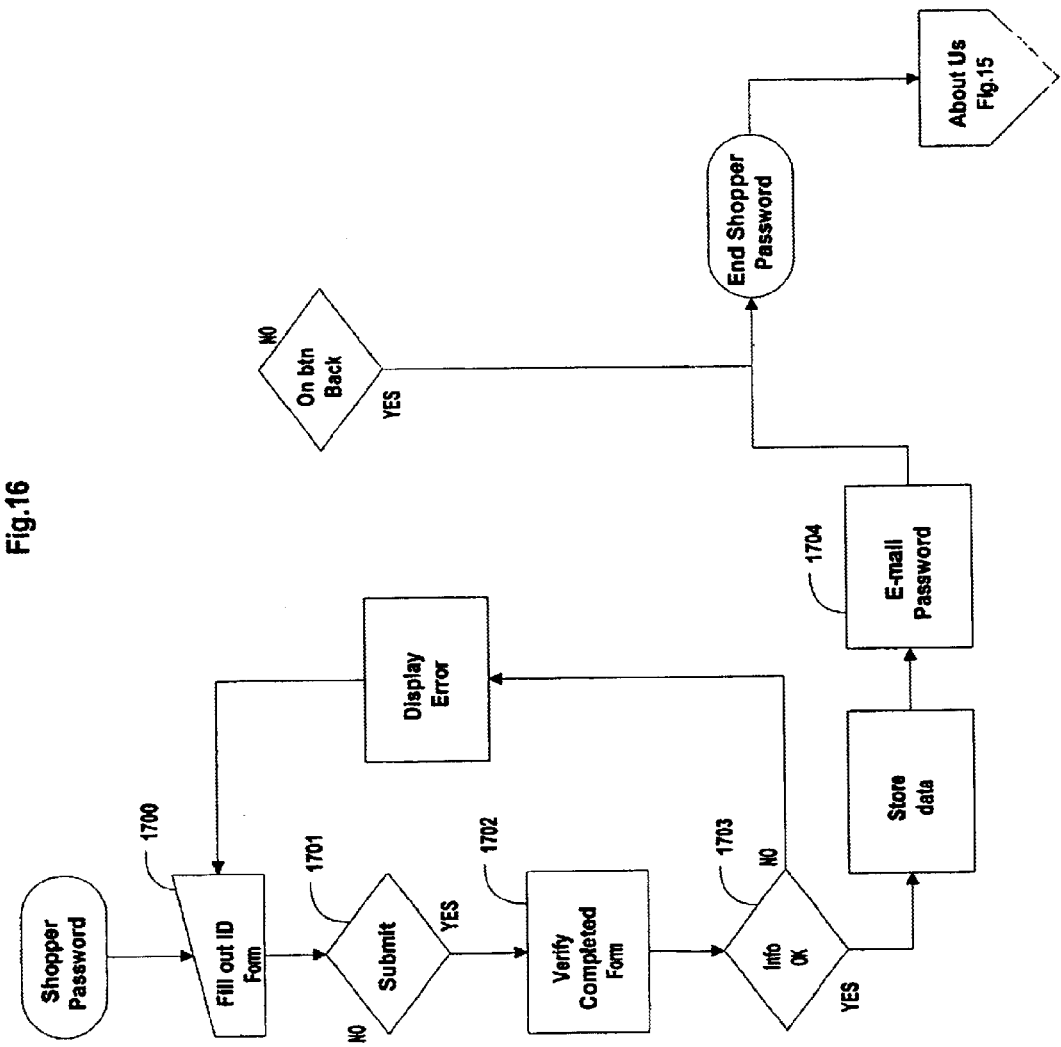
FIG. 16 is a system flow diagram of the Shopper password operations for the Community Page.

As shown in FIG. 15, Means 1501 are provided in About Us to enable Shoppers to select information about hot to use system 10. Likewise, to access such services as automated job searches and posting of ads for items for sale, Shoppers must apply for a Password 1502. As shown in FIG. 16, Password Means are provided because Shoppers need a Password e-mailed or faxed to them 1704 in order to be able to post their resume and/or items which are for sale.

Figure 17:
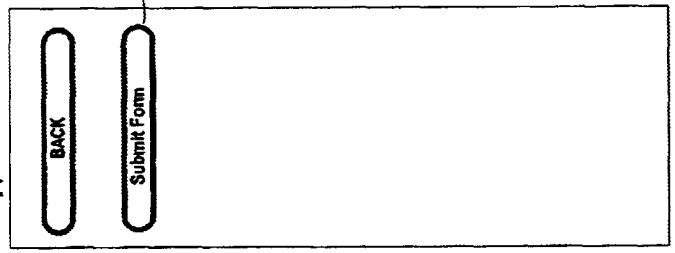
FIG. 17 is an exemplary screen display of the Shopper password application.

As shown in FIGS. 16 and 17, the Shopper is asked to fill out an ID form 1700 which is submitted by e-mail 1701. FIG. 17 shows the Account Manager Shopper Password page 1700 which is used by the Shopper to apply for a Password 1502. Once the form 1700 is completed, the "Submit Form" hyper-link 1701 is selected. The information is then verified 1702 and if the information is acceptable, the date is stored 1703 and the Password is e-mailed 1704 to the Shopper. If the Password is not used within 48 hours after it is sent, it will be canceled. Once the Password is e-mailed to the Shopper, the next screen is the "About Us" page.

For Merchants to list their businesses or organizations or use any of the services, they likewise must have a Password. As shown in FIG. 15, the Merchant Password means includes a Business Services page 1503. From the Business Services page 1503, the Merchant then applies for a Password 1504, as shown in FIG. 15. If not, Merchant can select the Account Manager 1505. If the Account Manager 1505 is not selected then the Back hyper-link can be selected in order to return to the prior page. "About Us" 1506 can then be ended.

Figure 18:
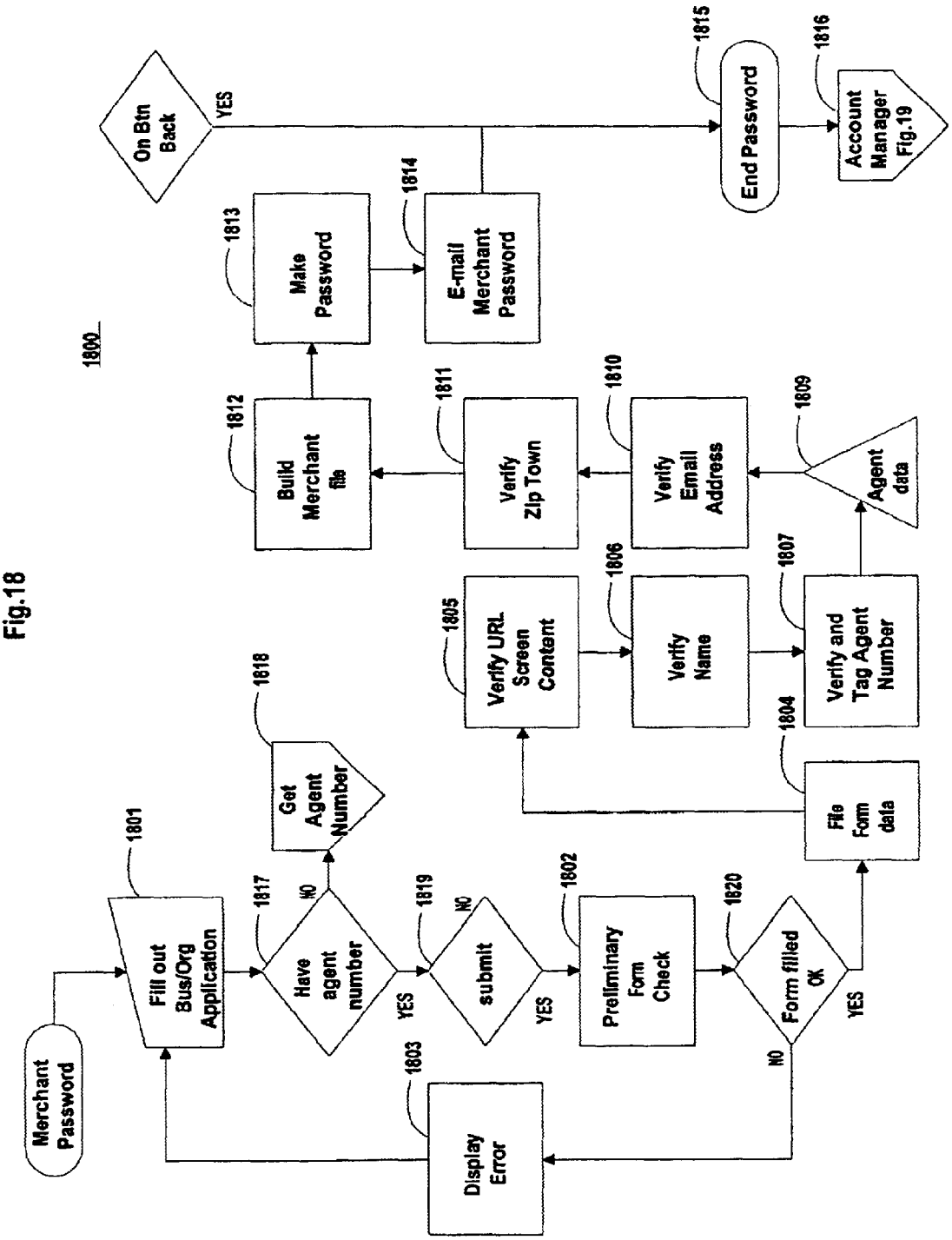
FIG. 18 is a system flow diagram of the merchant password operations for the Community Page.

In order to apply for a Password, Customer or Merchant fills out Business/Organization Application as shown in FIGS. 18, 20 and 21. The application 2100 has spots or blanks for the following information to be filled in: "Password" 2001; "Agent Number" 2002; "Company Name" 2003; "E-mail Address" 2004; and "Web site URL" 2005.

The Password Means also includes Special Passwords issued to Towns in order to be able to add or delete information about the Town. For instance, an "About Our Town" Category can be provided which includes a Community Listing for schools, churches, organizations, local government, libraries, police, fire department and the like. If the e-mailed Password is not used with 48 hours, it expires and is deactivated.

Figure 36:
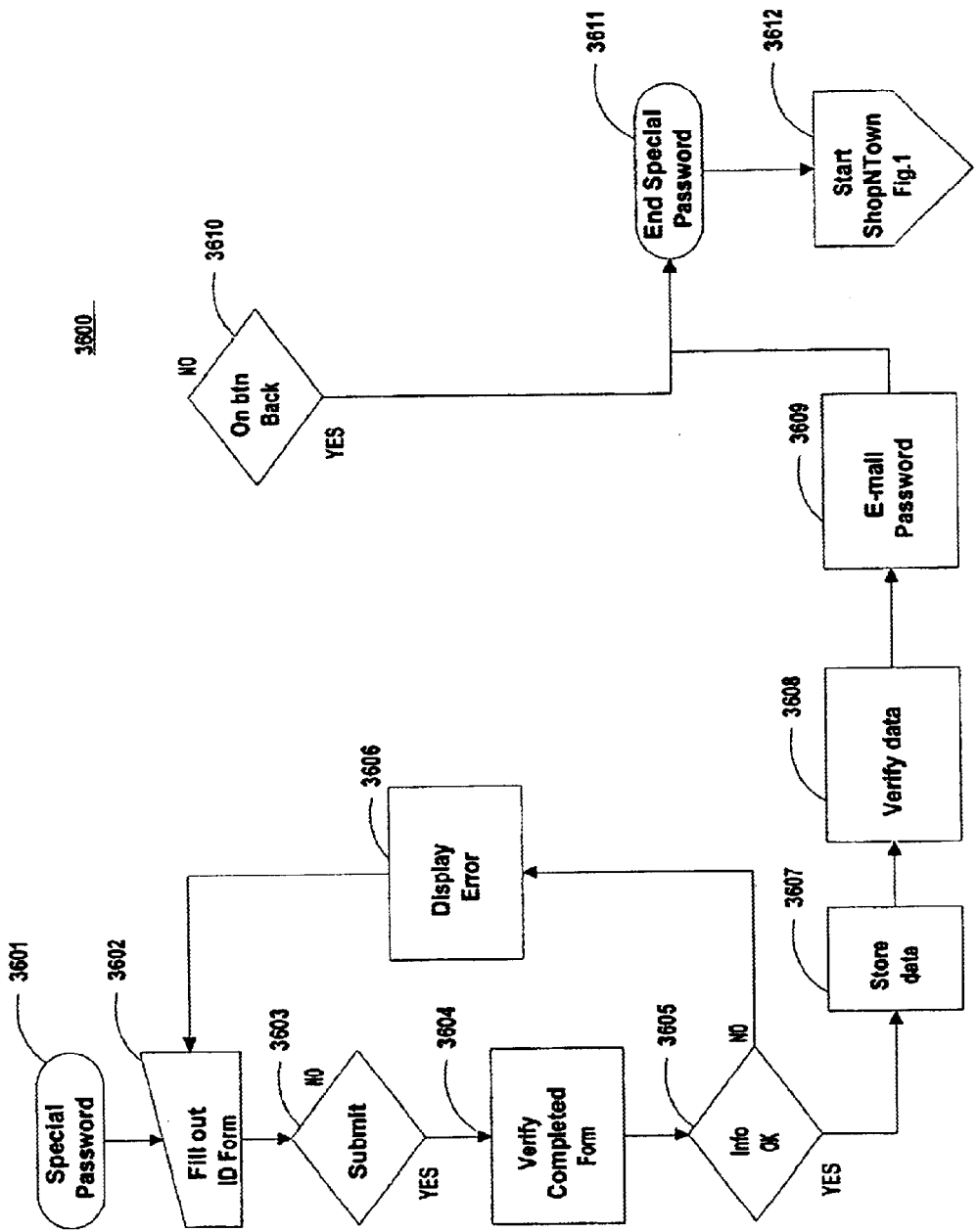
FIG. 36 is a system flow diagram of the Town special password operations.

As shown in FIG. 36, a Special Password 3601 is obtained in the following manner. An ID form is filled out 3602 and submitted 3603. The completed form is verified 3604 and if the information is acceptable 3605, the data is stored 3607. If not, an error message 3606 is displayed and the ID Form must be reentered 3602. If the information was acceptable, it is verified 3608 and a Special Password is e-mailed 3609. The "Back" hyper-link can then be used 3610, the Special Password Section ended 3611 so as to return to the start 3612.

Means for selling and placing Advertisements or Coupons that generate revenue are also provided. Agents can be Banner Agents that sell or broker advertising space in the form of Banner Ads. Coupon Agents sell advertisement space via coupons. In addition, web site developers are given two (2) Agent Numbers. One Agent Number is used as an access number to view their account activity. The other Agent Number is used by their clients when they list their own web site so that the developer receives a percentage of the revenues received by the system 10 from client activity on the system 10. The Agent Number can be amended from the system 10 default Agent Number to the Agent Number of a developer at a later date, with that developer then receiving a percentage of activity from that date forward.

While the password verification form application 1801 is being filled out by a Customer/Merchant, as shown in FIG. 20, while the Password is being entered, the only hyper-links which are lit and thereby selectable are "Submit Form" 2006 and "Back" 2007. When the Submit button is clicked, the Merchant data is automatically brought up, if the Password is valid. FIG. 21 shows the page after the Password is verified and shows that once the Application 2100 is filled in, the s hyper-links which are lit and available for selection are: "Back" 2007; "Add Community Listing" 2008; "Add Categories" 2009; "Add Coupons" 2010; "Add Banners" 2011; "Post Jobs" 2012; "Account Review" 2013; "Stastics" 2014; and "Renewal" 2015. The services of the system are then available to the Merchant.

Figure 18A:
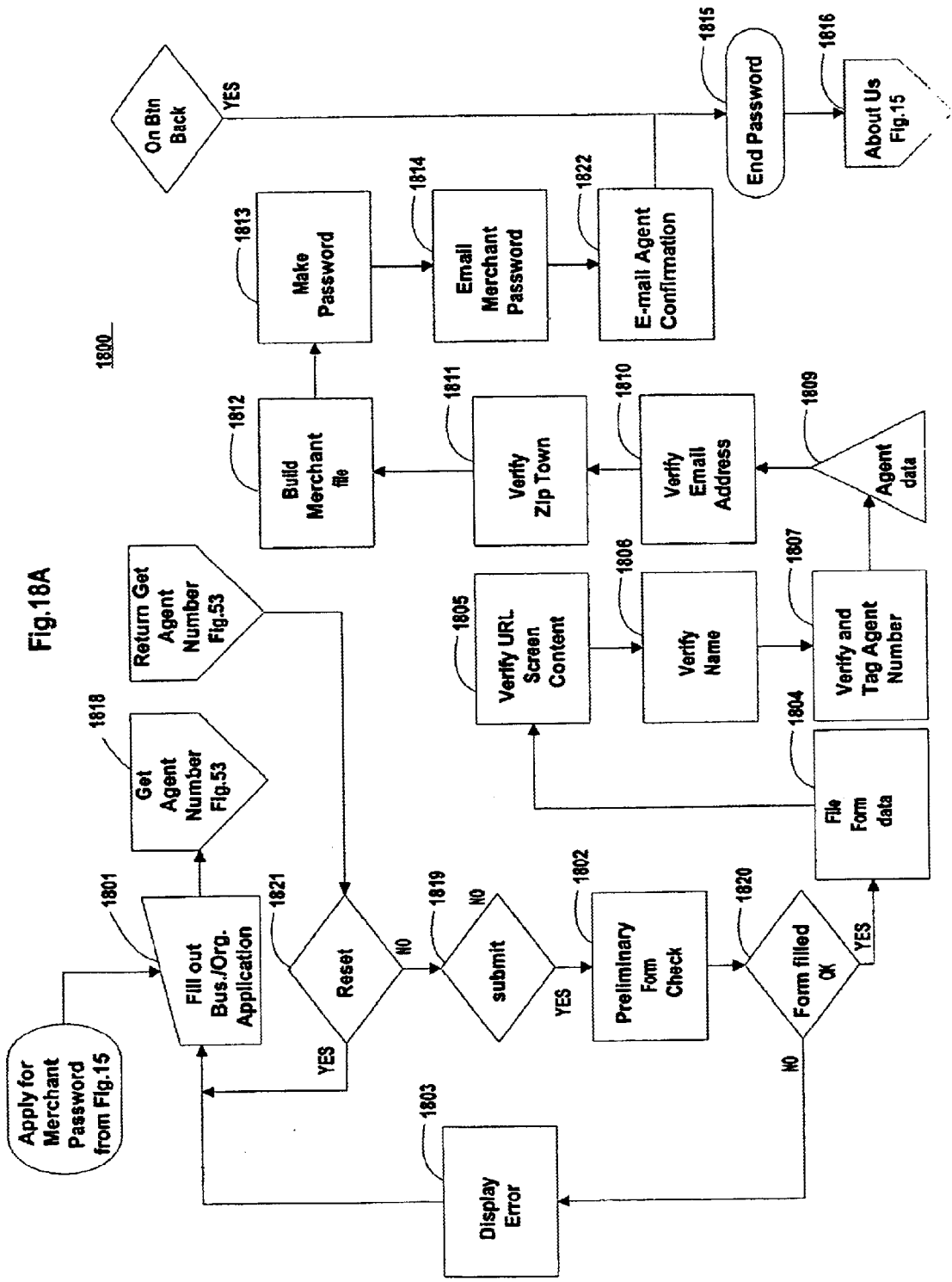
FIG. 18A is a system flow diagram for an alternative of the Merchant password operations for the Community Page.

As shown in FIG. 18, if the Customer/Merchant has an Agent Number 1817, it is submitted 1819. If not, the Customer/Merchant must obtain an Agent Number 1818. A preliminary form check 1802 is then performed on the application 1801. If there is an error, an error message is displayed 1803. If the application is acceptable 1820, the data is filed 1804. The URL screen content 1805, Name 1806 and Agent Number 1807 are verified. The relevant Agent data 1809 is then stored. Alternatively, as shown in FIG. 18A, an email confirmation can be sent to the Agent 1822 after the password is emailed or faxed to the Merchant 1814. Once Password is ended 1815, the user is returned to the About Us page 1816.

Once the e-mail address 1810 and zip code or town 1811 are verified, a Customer File 1812 is built. Once a Password is created 1813, it is e-mailed to the Customer/Merchant 1814. The "Back" hyper-link can be used to go back to prior screens and end Password 1815. Customer is then returned to the Account Manager page as exemplified in FIG. 19.

Figure 56:
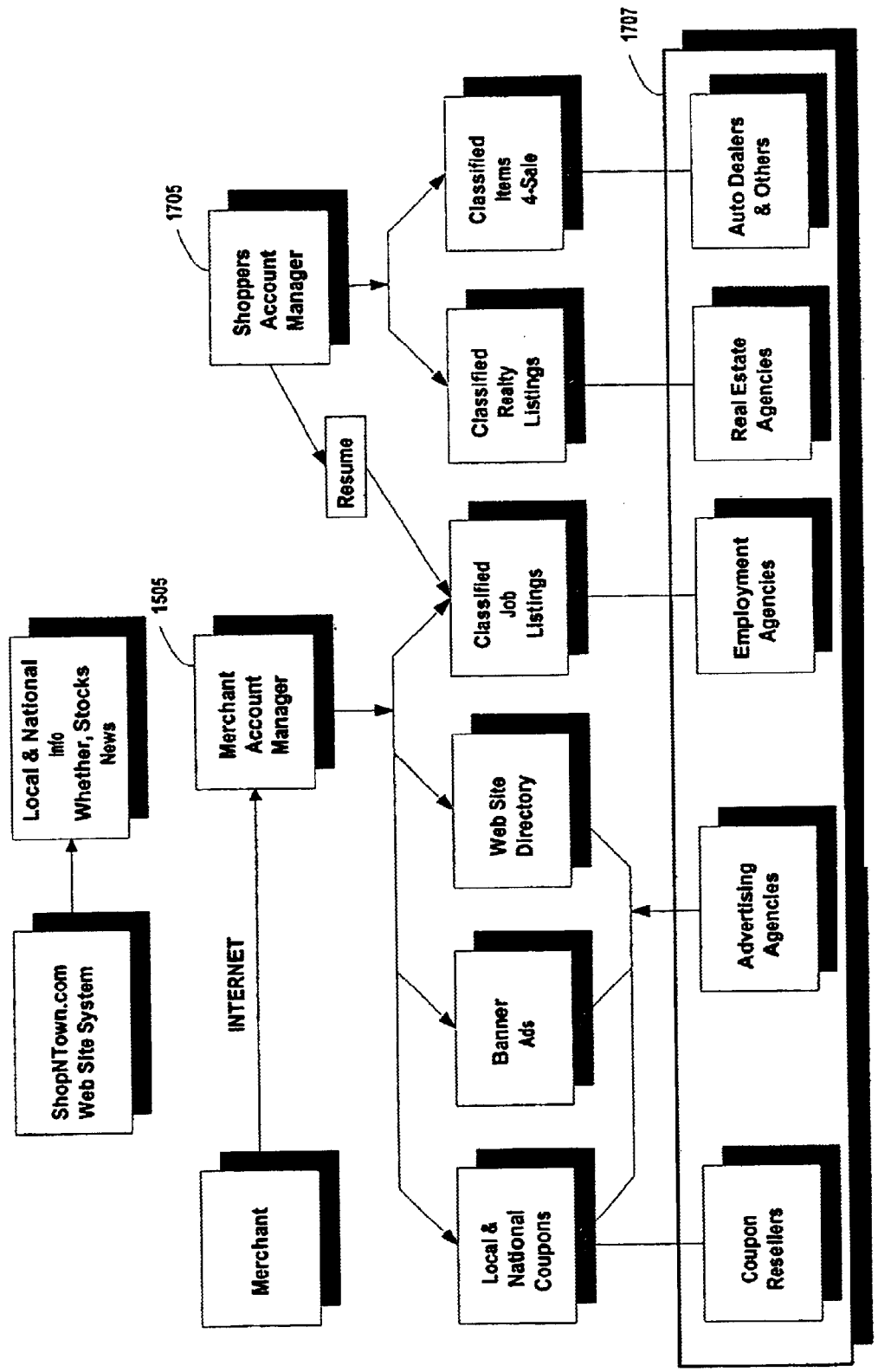
FIG. 56 is a simplified flow diagram illustrating those aspects of the system which can be altered via the Internet.

The system 10 is adapted to permit simultaneous access to the database by a plurality of users (Shoppers, Merchants and others), after entry of a password, via the Internet. As shown in FIG. 56, a Merchant may access the database via the Internet and change one or more features of the system 10 (i.e.: the location and number of banner ads relating to the Merchant) using a Merchant's Account Manager 1505. The Merchant's Account Manager 1505 allows the Merchant to directly vary information contained within the database relating to the Merchant's coupons, banner ads, hyper-link locations, and classified job listings. Further, the system 10 includes a Shopper's Account Manager 1705 which permits a Shopper to directly vary information contained within the database via the Internet relating to the Shopper's classified realty listings, classified items "4 sale", and to select employers the Shoppers wishes to submit his or her resume or employment information to. In addition, one or more Agent Account Managers could also be provided to permit third-party agents to vary Merchant information on behalf of the Merchant.

Referring again to FIG. 19, means for reviewing and/or adding or deleting services are provided. Account Manager is the access point for a Customer/Merchant to add services. Once the Password is entered 1901, Online Help 1902 can be selected. If not, the Password is verified 1903.

If the Password is not verified, a "Lost Password" hyper-link 1904 can be selected so that by entry of the Business/Organization Information 1905, a new Password will be e-mailed 1906. If the Password 1903 is verified, then the ID Form is automatically filled in from the Data Base 1907, and the Customer File is read 1908.

Figure 19:
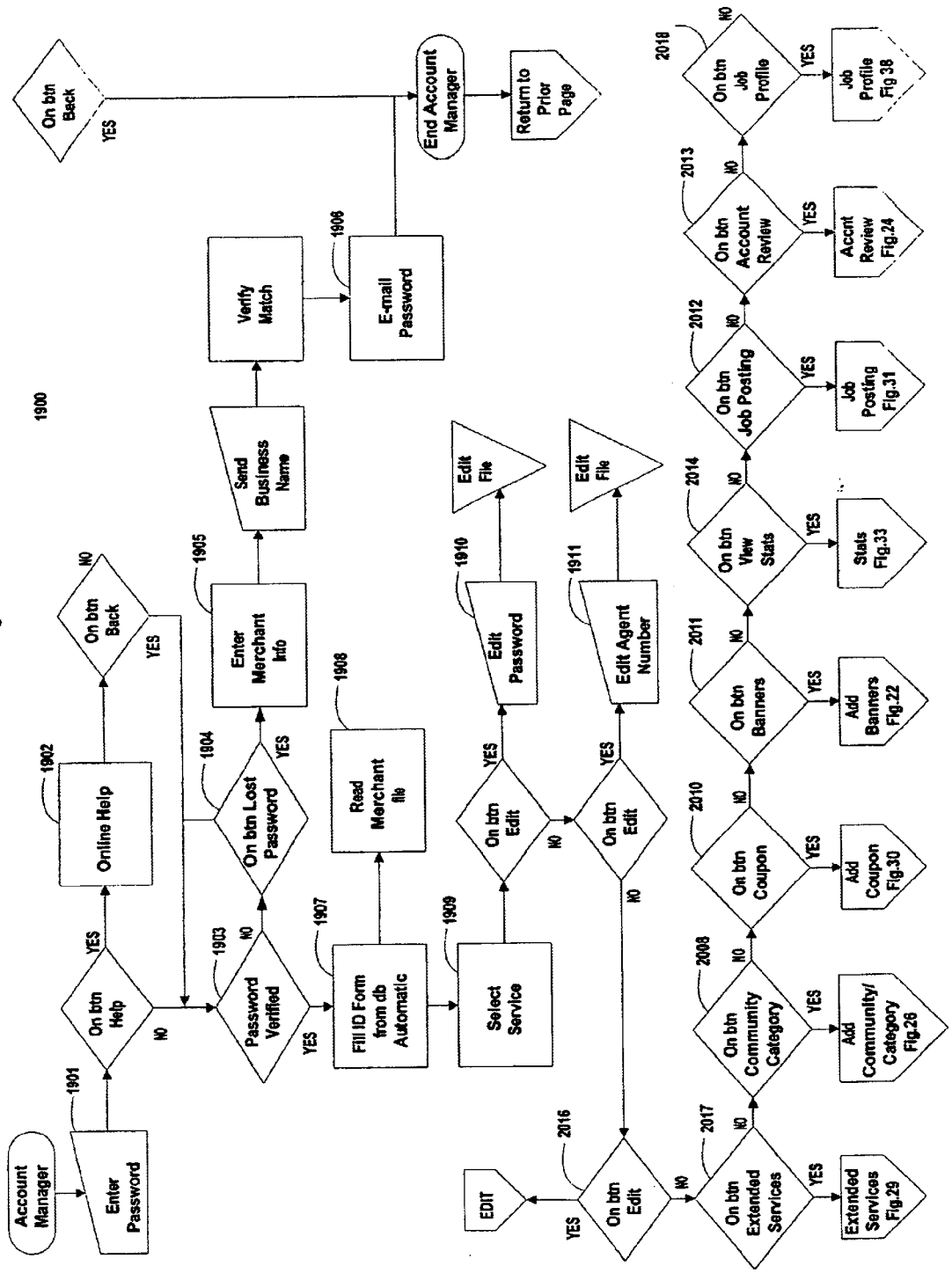
FIG. 19 is a system flow diagram of the Account Manager.
Figure 52:
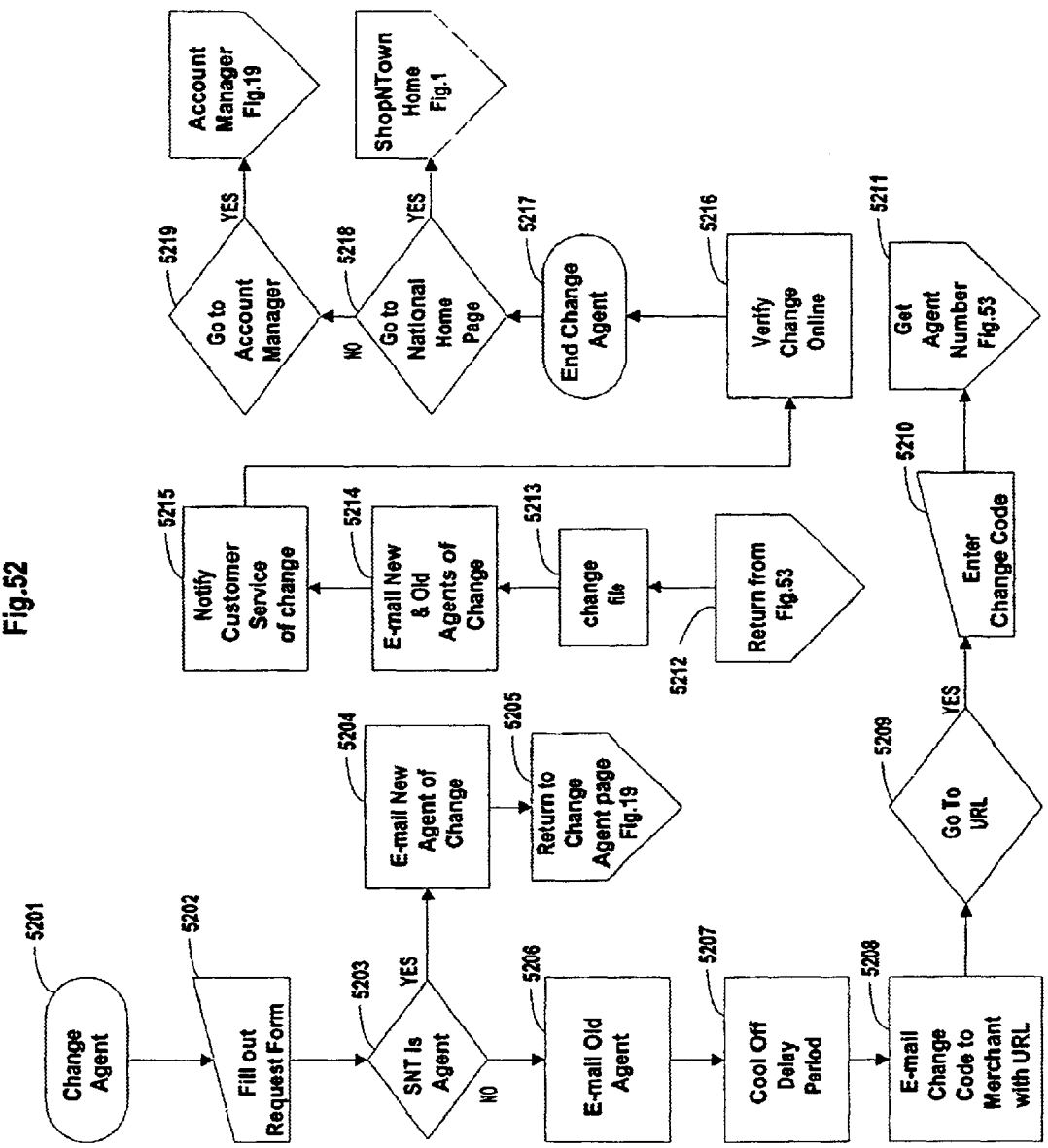
FIG. 52 is a system flow diagram of the Change of Agent operations.

The Merchant can then select one or more Services 1909. The Password can be edited 1910. Also, the Agent Number can be edited 1911. As shown in FIGS. 19 and 52, the Customer/Merchant can select: "Add Community Listing" 2008; "Add Categories" 2009; "Add Coupons" 2010; "Add Banners" 2011; "Statistics" 2014; "Job Posting" 2012; "Account Review" 2013; "Edit" 2016; "Extended Services" 2017; and "Job Profile" 2018. The Merchant cannot simply write over the existing agent number, so as to avoid excessive switching between Agents.

Figure 19A:
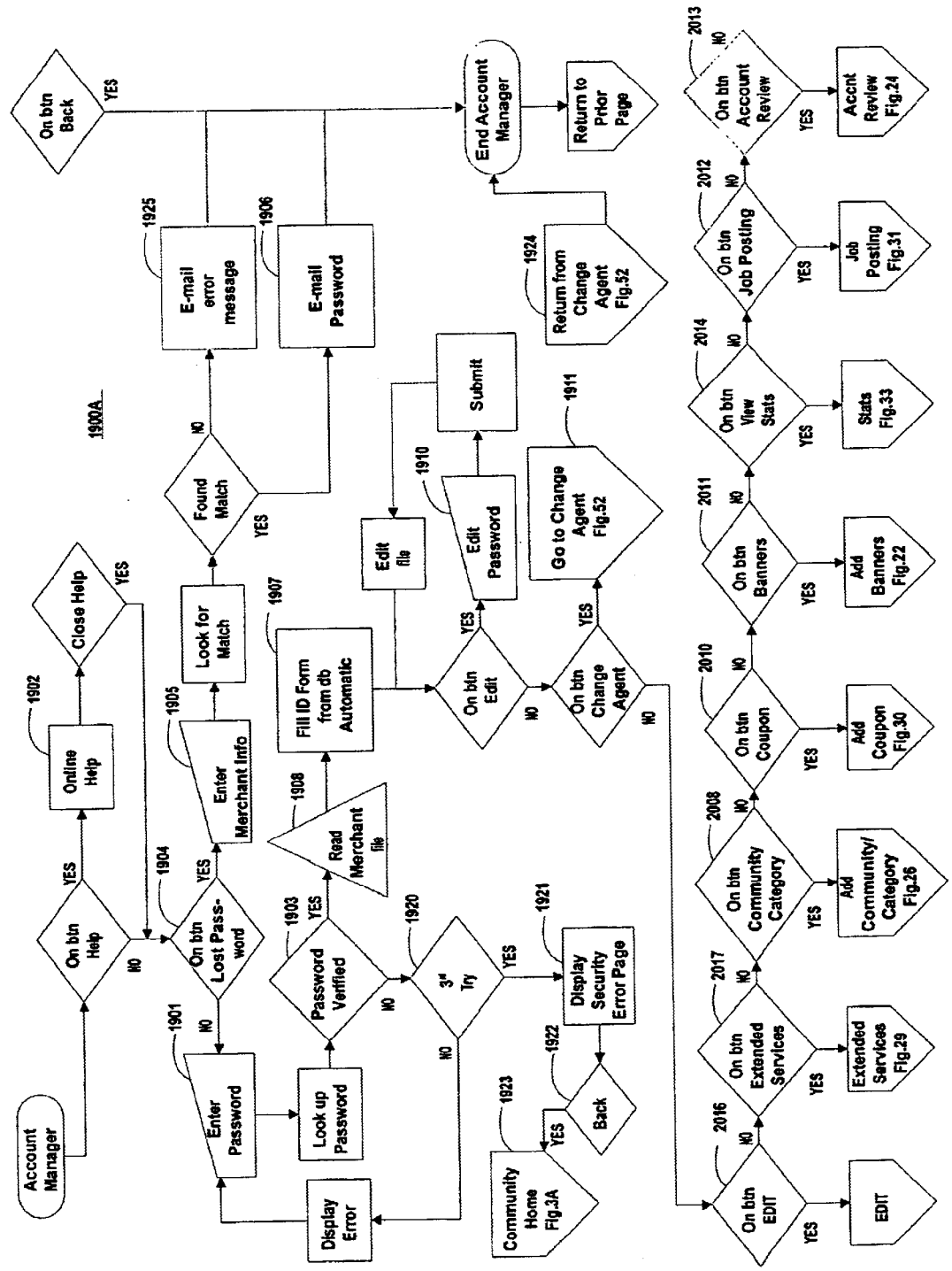
FIG. 19A is a system flow diagram for an alternative for the Account Manager.

Alternatively, as shown in FIG. 19A, if the password is not verified 1903 after three tries 1920, a Security Error page is displayed 1921 and the user can go back to the Community page 1923. Likewise, the Agent can be changed 1911 and an error message 1925 can be sent by email or fax if a password is lost and no merchant match can be made. Likewise, Job profile 2018 can be omitted from the possible selections.

Figure 22:
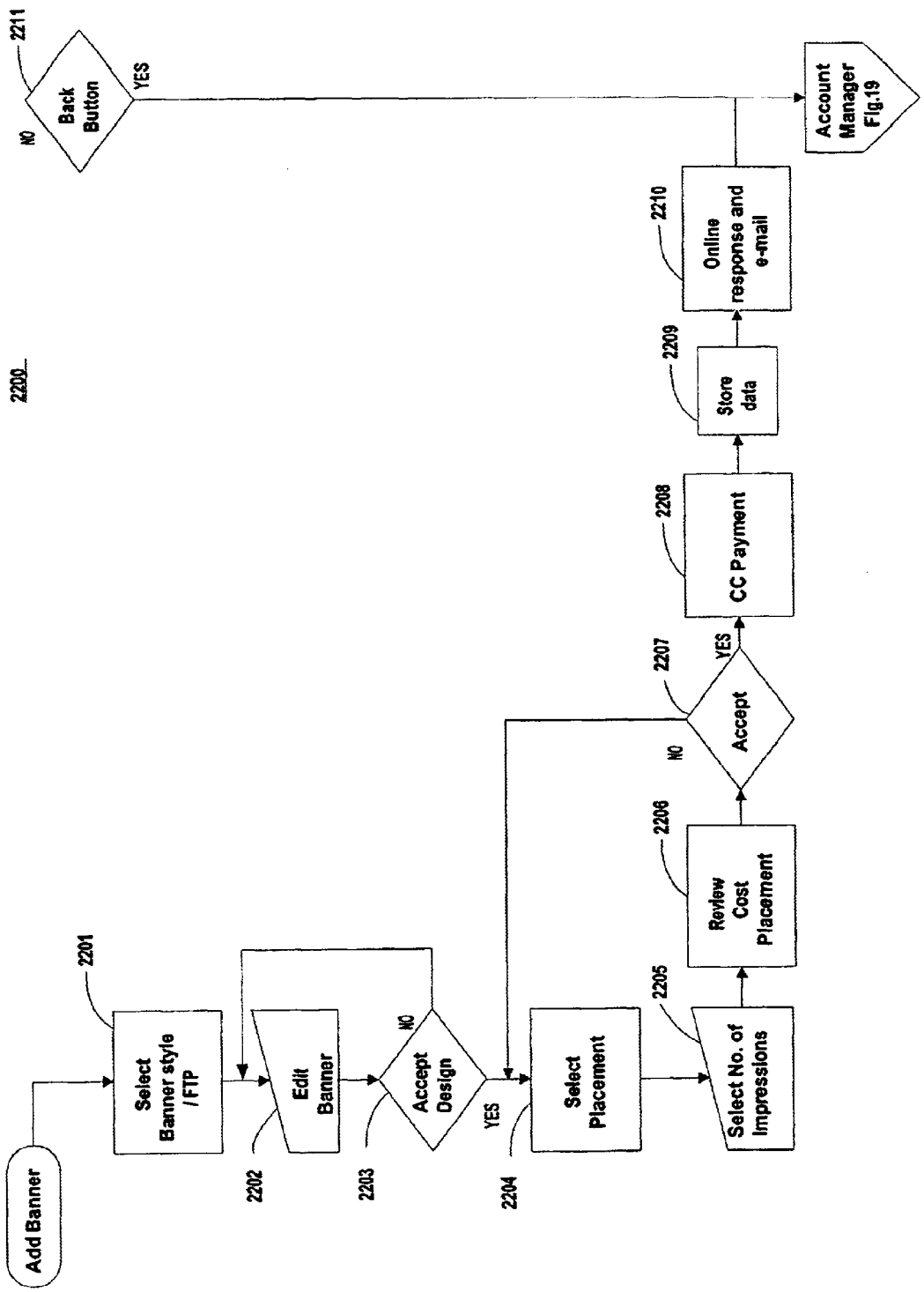
FIG. 22 is a system flow diagram of the Banner Ad editor.

Means for creating, placing adding or deleting Ads or Coupons are also provided. Business or organizations which are Merchants can add Banner Ads to: the National Home Page 102; the First Community Page 300 or to specific categories in the towns they are listed in. As shown in FIG. 22, a Banner Ad is added by selecting the Banner Style from the FTP 2201. The Banner Style can be edited 2202. If the design is accepted 2203, then the Placement is selected 2204. The number of impressions or frequency is then selected 2205 and the cost of placement is reviewed 2206. If accepted 2207, the credit card payment is made 2208, the data is stored 2209 and an online response is provided by e-mail or fax 2210. The "Back" hyper-link 2211 is then used to return to the Account Manager Screen.

Figure 22A:
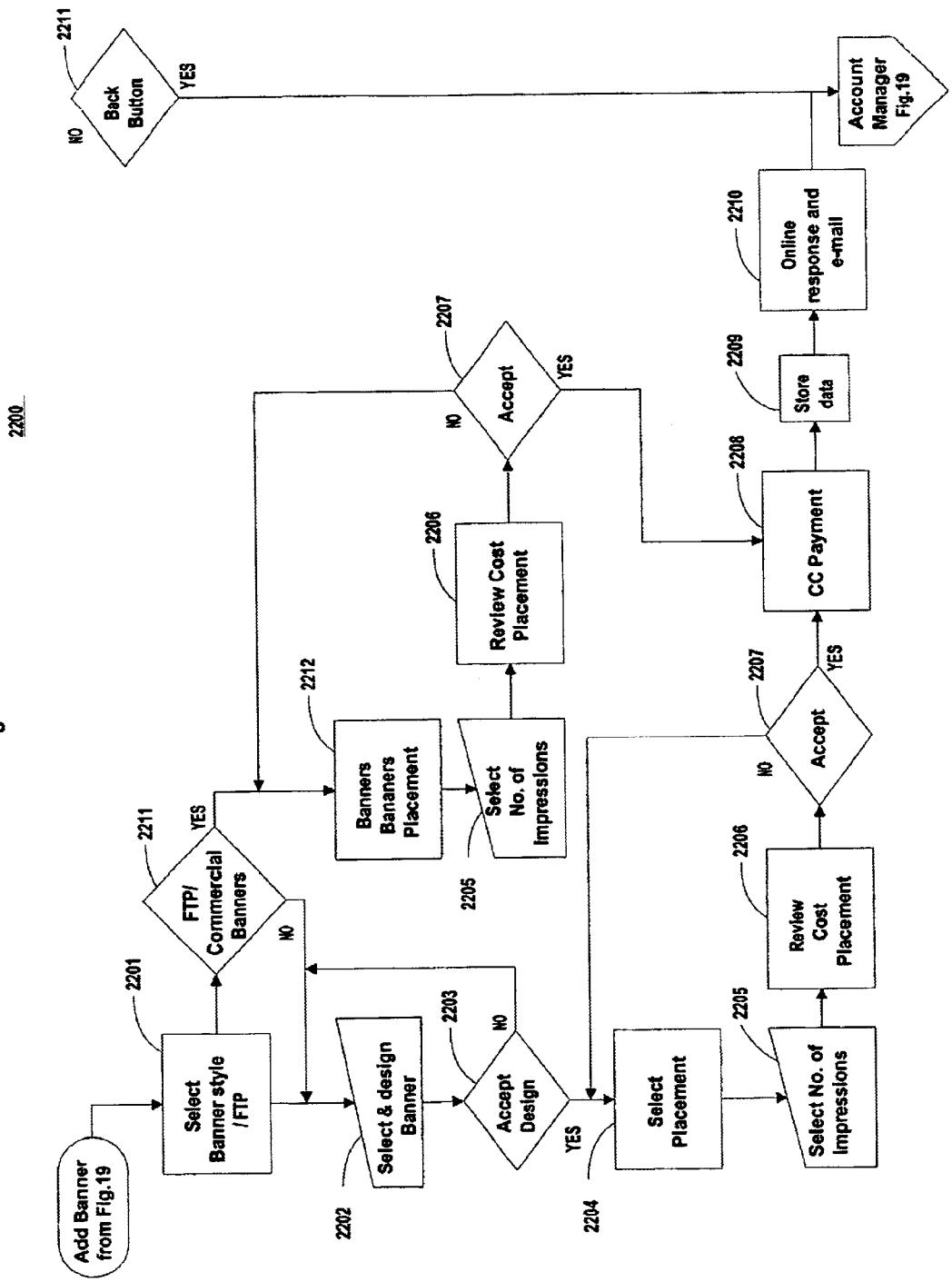
FIG. 22A is a system flow diagram for an alternative for the Banner Ad editor.

Alternatively, as shown in FIG. 22A, if FTP/Commercial Banners are selected 2211, the Banners are placed 2212, the number of impressions selected 2205, the cost placement is reviewed 2206 and either accepted or rejected 2207. If accepted, then credit card payment is made 2208. If rejected, then the user is returned to selection of Banners 2211. If FTP is not selected, then the banner is selected and designed 2202.

Figure 23:
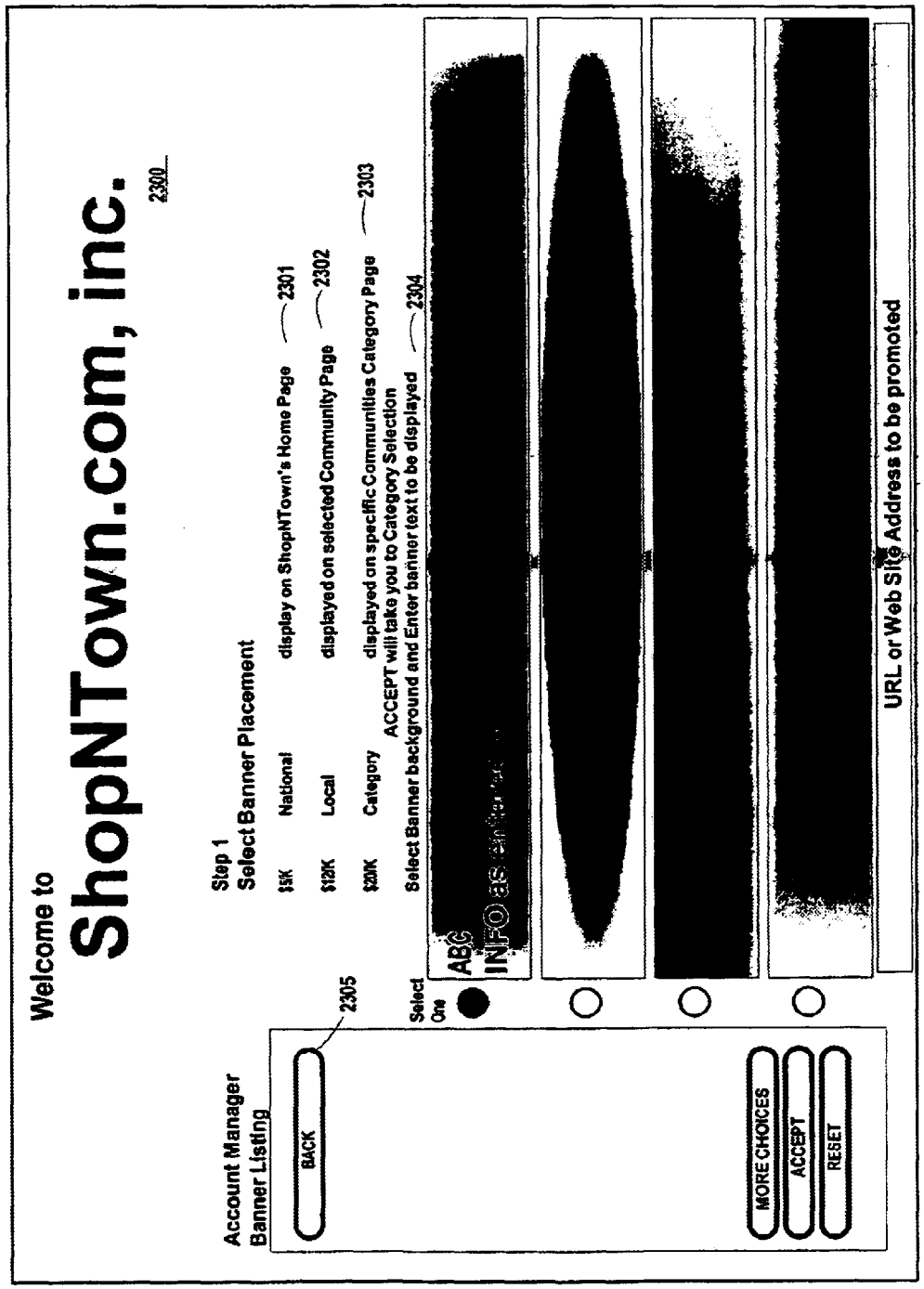
FIG. 23 is an exemplary screen display of the Banner Listing page.

FIG. 23 shows the Account Manager Banner Listing page 2300. The Merchant/Customer can select the following Banner Ad Placements: National 2301 on the National Home Page 102; Local 2302 which is displayed on selected Community Pages; and Category 2303 which is displayed on a specific Community's Category Page. The advertising rates are based upon a monetary rate per 1000 hits to the advertiser's web page. The National Banner has the lowest dollar rate per thousand hits. The Category Banner has the highest dollar rate per thousand hits. The Local Banner has the second lowest dollar rate per thousand hits.

Means are provided to enable Merchants to design and place their own Banner Ads. The Merchant can select the Banner background and enter the Banner text to be displayed 2304. The hyper-link which can be selected on the "Banner Listings" page of FIG. 23, are: Back 2305; More Choices 2306; Accept 2307 or Reset 2308.

Figure 24:
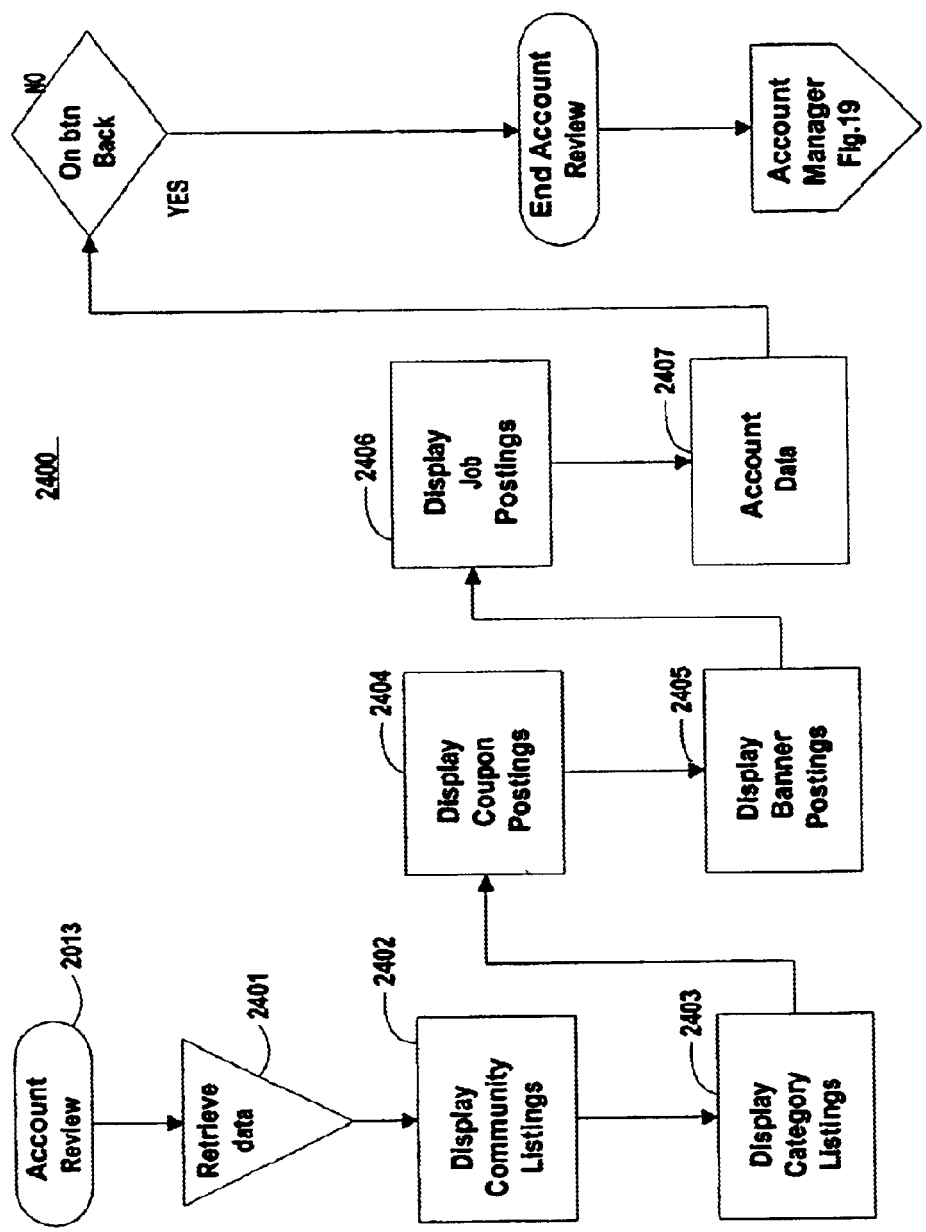
FIG. 24 is a system flow diagram of the Account Review.

Account Managing Means are also provided. As shown in FIG. 24, Account Review 2013 is part of the Account Manager function of the system 10. It enables Merchants to see how their various ads, coupons or listings are placed in the system 10 and the costs being incurred. From Account Review 2013, Customers can retrieve data 2401, and display: Community Listings 2402; Category Listings 2403; Coupon Postings 2404; Banner postings 2405; and/or Job Postings 2406. In addition, Account Review 2013 can provide Account Data 2407. FIG. 25 is an exemplary display for an Account Manager Preview Page 2500. The Account Manager Preview page 2500 shows a message being listed for the Merchant 2501 in the system 10. Also shown is a display 2502 of the Communities for which the ad is posted.

Credit Card or Check Payment Means 2503 are provided as the way to automatically pay for new or additional listings. The categories for which postings have been selected are also displayed 2504. The total costs are shown 2505. A message summarizing when the posting will take place 2506 is also shown.

Figure 26:
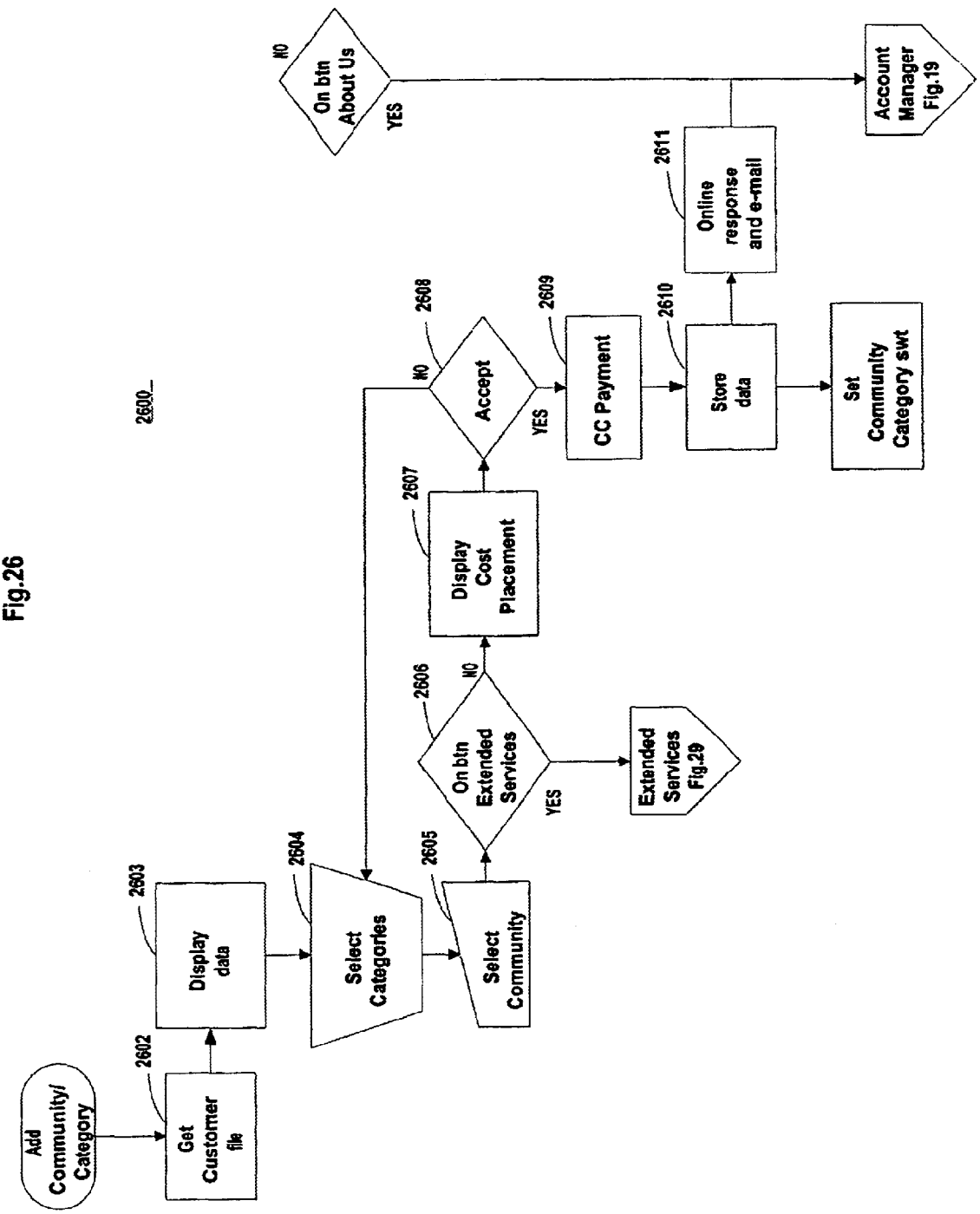
FIG. 26 is a system flow diagram of the addition of Community pages by Merchants.

Means are provided for adding additional Communities or Categories. FIG. 26 shows how additional Communities or Categories can be added by Merchants. Hence, the web pages of these businesses or organizations are added to additional Communities and/or Categories. A Password has been secured and verified prior to this operation. The Merchant file is accessed 2602 and the data is displayed 2603. Categories and Communities can be selected 2604 and 2605. Extended Services 2606 can also be selected. The Cost of Placement is displayed 2607. If accepted 2608, credit card payment is made 2609 and data is stored 2610. An online response and e-mail or fax confirmation is provided 2611, prior to return to the "Account Manager Preview Page" 2500.

Figure 26A:
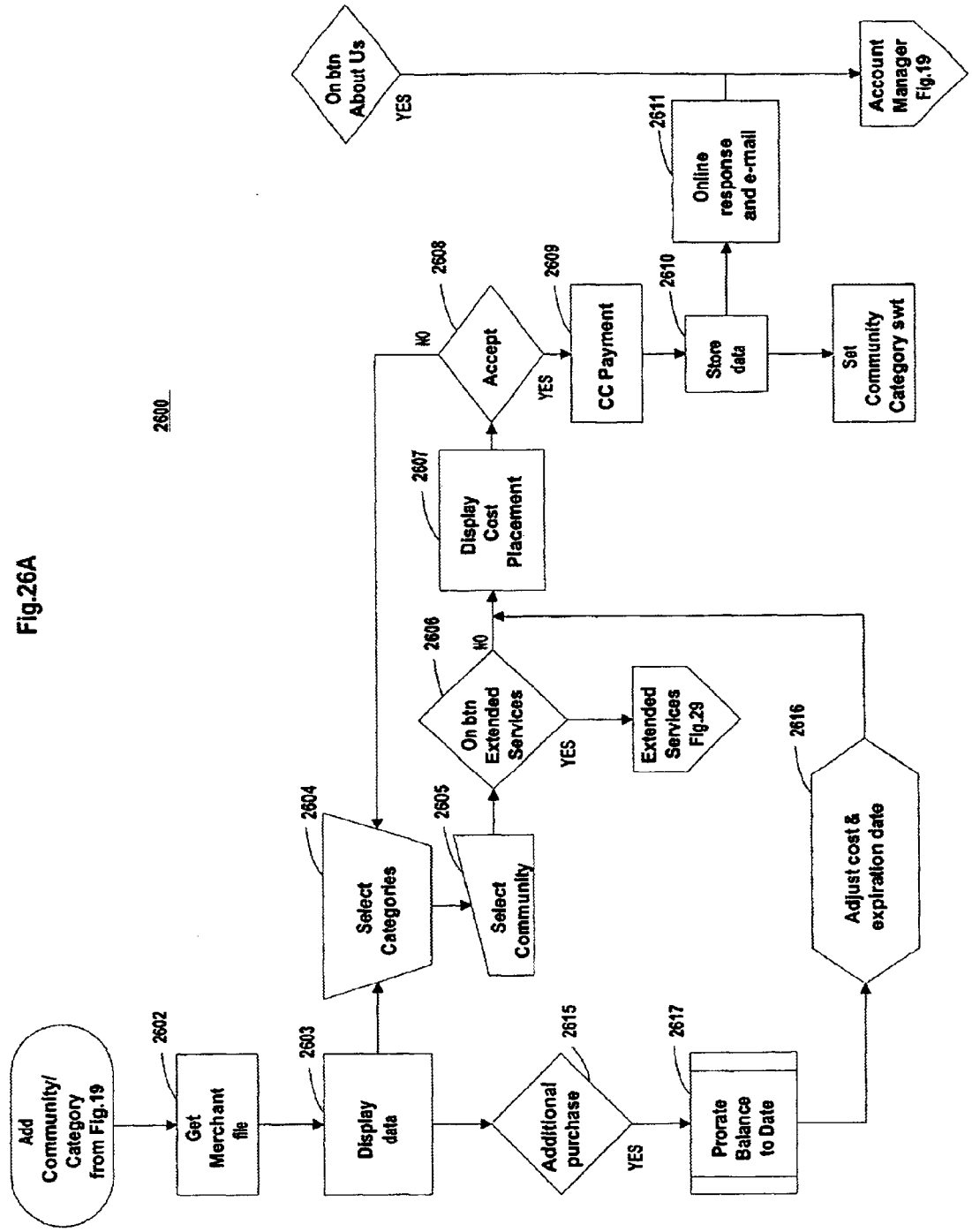
FIG. 26A is a system flow diagram for an alternative for the addition of Community pages by Merchants.

Alternatively, as shown in FIG. 26A, if additional purchases are made 2615 after data is displayed 2603, the balance is prorated to date 2617 and the cost and expiration date are adjusted 2616.

Figure 27:
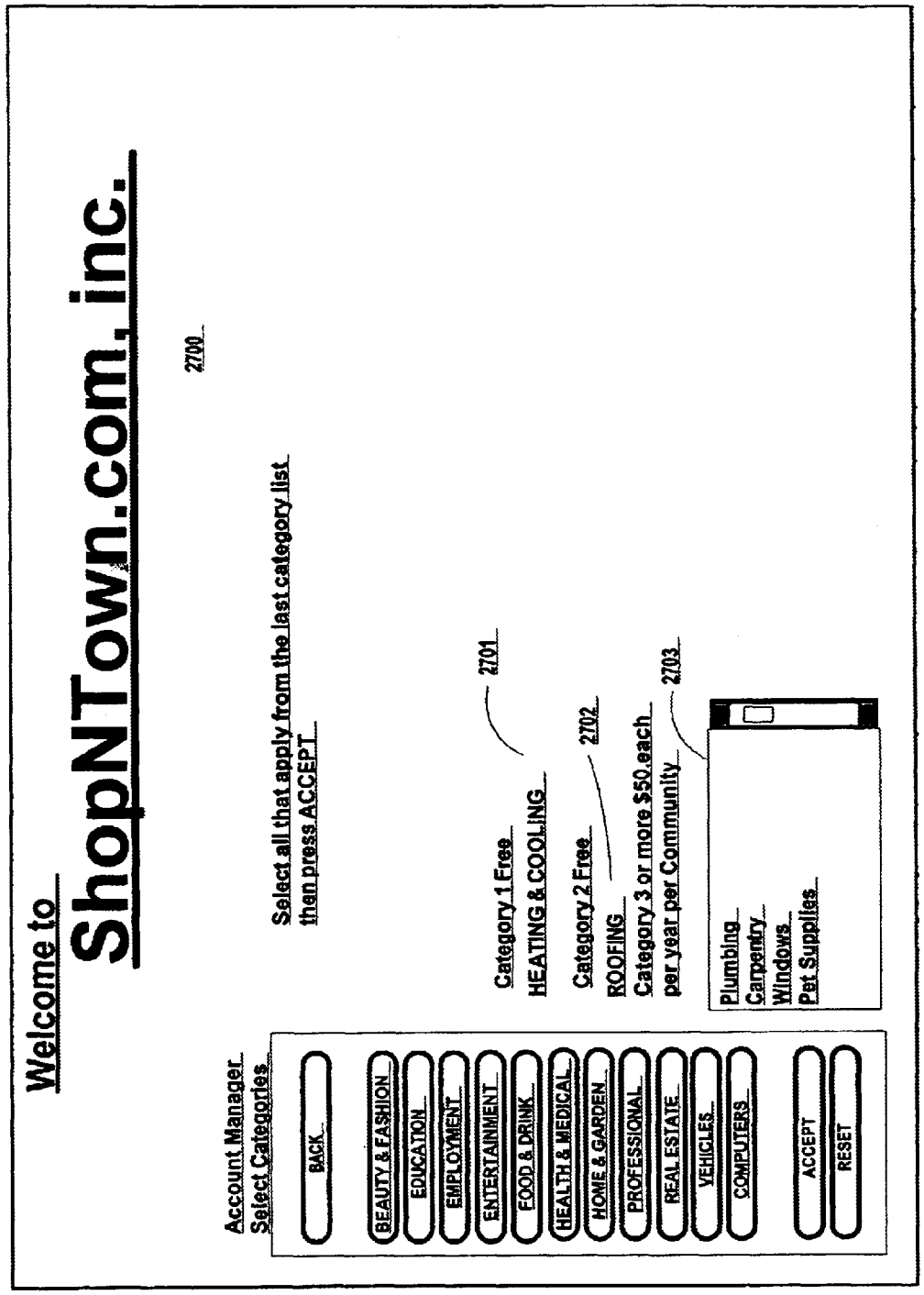
FIG. 27 is an exemplary screen display of the Select Categories page.
Figure 28:
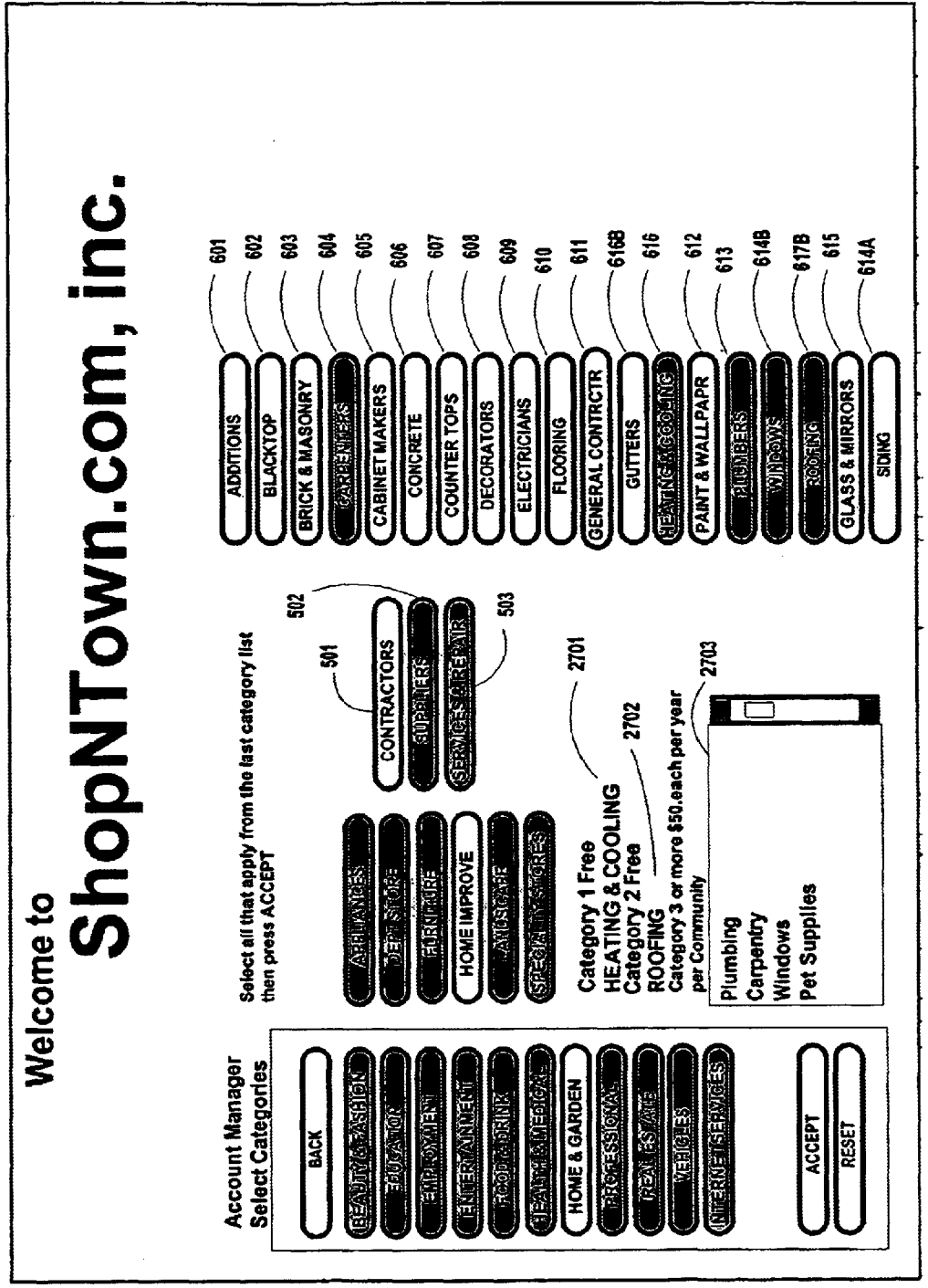
FIG. 28 is an exemplary screen display of the Select Categories page after the "Home and Garden" category has been selected.

FIGS. 27 and 28 are the exemplary displays for an Account Manager Selecting Categories page 2700. The first two Categories 2701 and 2702 can be free of charge in the preferred embodiment. The addition of three (3) or more categories 2703 is added for an additional fee. As shown in FIG. 28 the Final Categories that apply are available for selection. Final Categories 601–603, 605–611, 616B, 612, 615 and 614A are lit and selectable. Empty Final Categories 604, 616, 613, 614B and 617B are darkened and cannot be selected.

Figure 29:
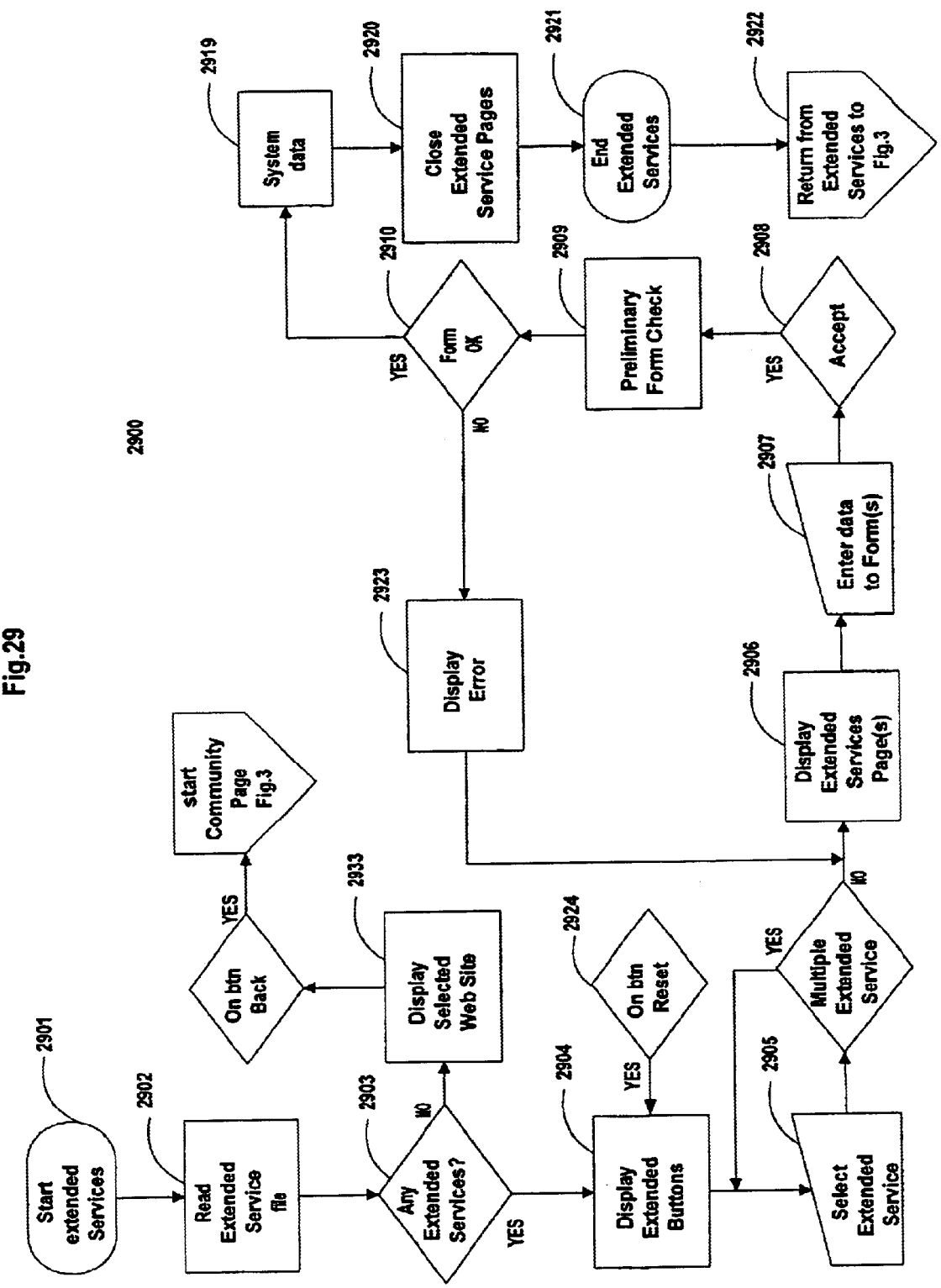
FIG. 29 is a system flow diagram of the Extended Services operations.

Extended Services Means are also provided as shown in FIG. 29. Extended Services 2901 provide the ability to add, for example, a Shopping Basket, Appointment Schedule, Calendar Schedule, Credit Card Payment, Special Items, Estimates, order By Fax, Menu, Information and/or a polling Form to a Static Web site. Extended services allow a Shopper to conduct commercial transactions with a Merchant. The commercial transactions occur between the Shopper and the system 10 rather than between the Shopper and a Merchant's web site. Once Extended Services 2901 are selected, the Extended Service File is read 2902. If selected 2903, the Extended Service buttons are displayed 2904 and Extended Service is selected 2905. The Extended Service pages are displayed 2906 and data is entered into the form 2907. If accepted 2908, the form is checked 2909 and 2910. Extended services are ended 2921 and the user is returned to Extended Services 2922 (FIG. 3). Alternatively, the following steps may be added. If acceptable, the Extended Services are selected and if accepted and if payment is due, the costs and credit card forms are displayed. If accepted, then Credit Card Payment is accessed, credit card transaction is completed and system data is accessed.

If Extended Services 2903 is not selected 2903, the Selected Web site is displayed 2933 and Back button 2924 is used to return to the Start of Community Page.

Figure 30:
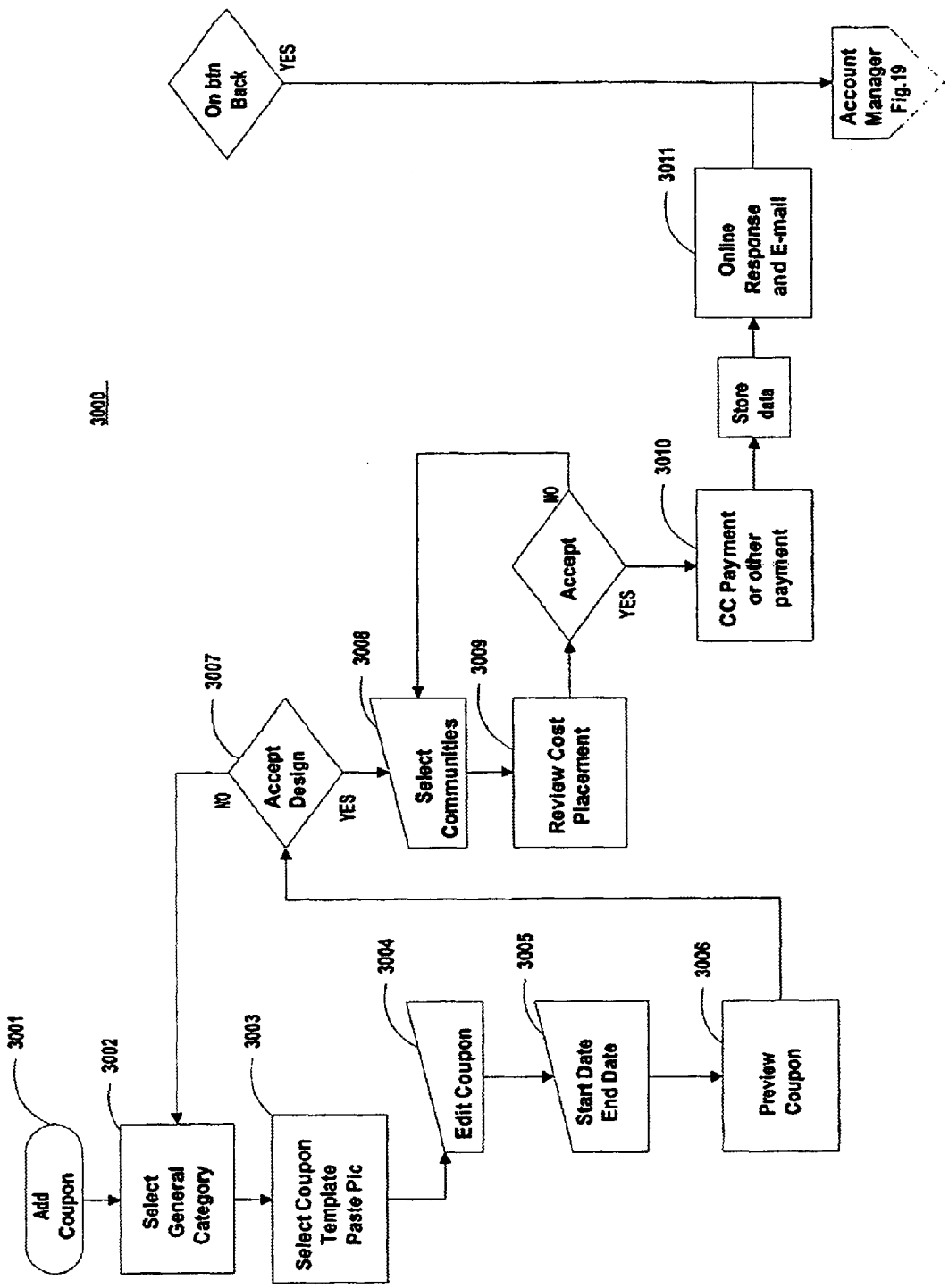
FIG. 30 is a system flow diagram of the Coupon editor.

Coupon Design Means are also provided. FIG. 30 shows how a Customer can design a Coupon online and/or by using FTP in graphics before selecting specific Community, Categories and Run Time 3001. A General Category 3002 and Coupon Template/FTP 961 3003 are selected. The Coupon is edited 3004 and start and end dates are selected 3005. The Coupon is then previewed 3006. It accepted 3007, the Communities are selected 3008 and the cost of Placement is reviewed 3009. If accepted payment is made by credit card 3010 and confirmed by email or fax as described above 3011. Alternatively, a picture can be pasted when the coupon template is selected 3003.

Figure 31:
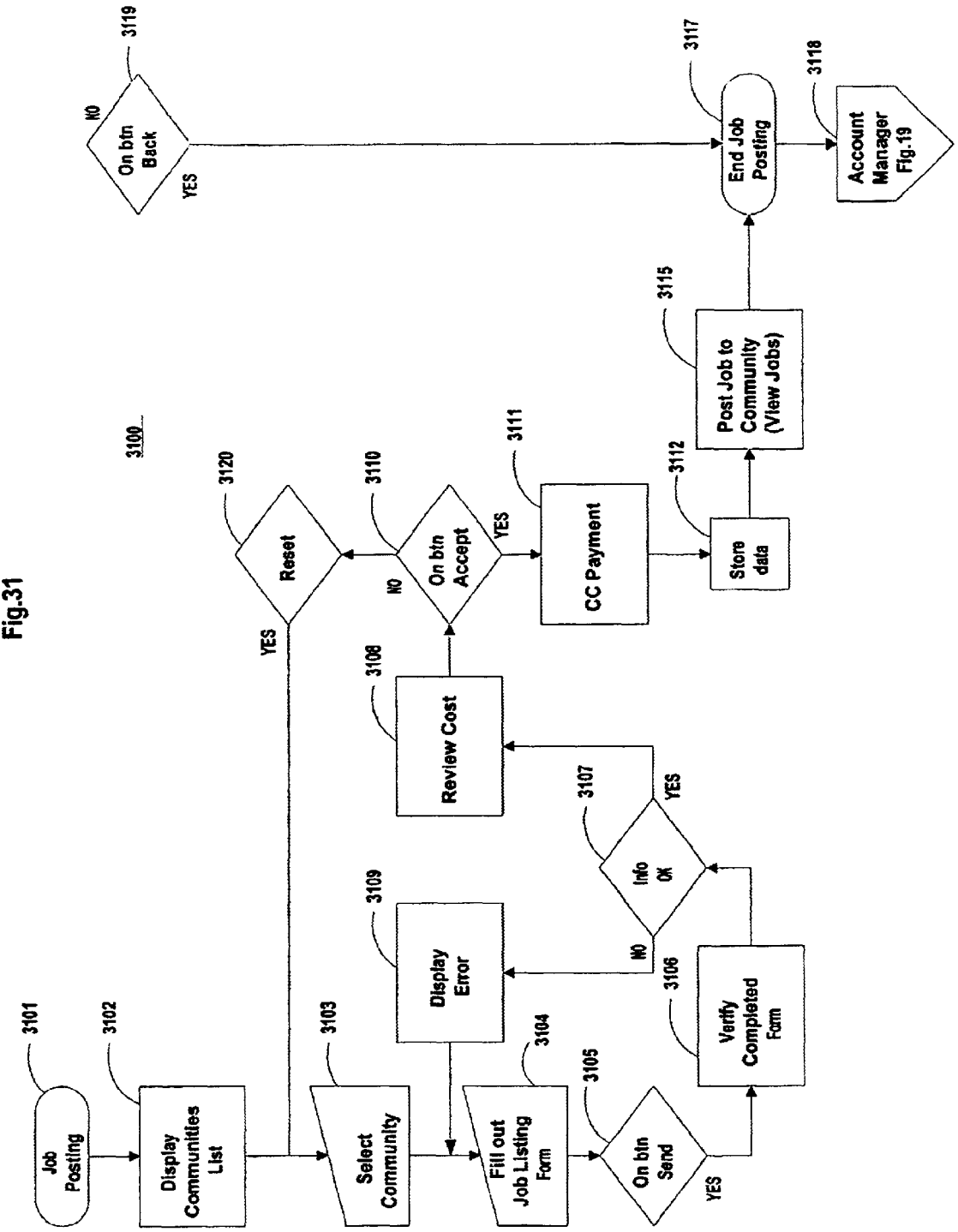
FIG. 31 is a system flow diagram of the Job Postings operations with respect to Merchants.

FIG. 31 shows the Means that allow Merchants and, in particular, Employers with a system account to post Job Openings in communities they select 3101. Merchants that are not listed with ShopNTown.com the system 10 can post job listings for a fee, based upon the number of Towns. The job profiles and resumes of Shoppers are compared online for a fast response. The Employers can select the Candidates by profile, but not by name. An Employer can e-mail the Job Description to the Candidate through a drop box.

Figure 31A:
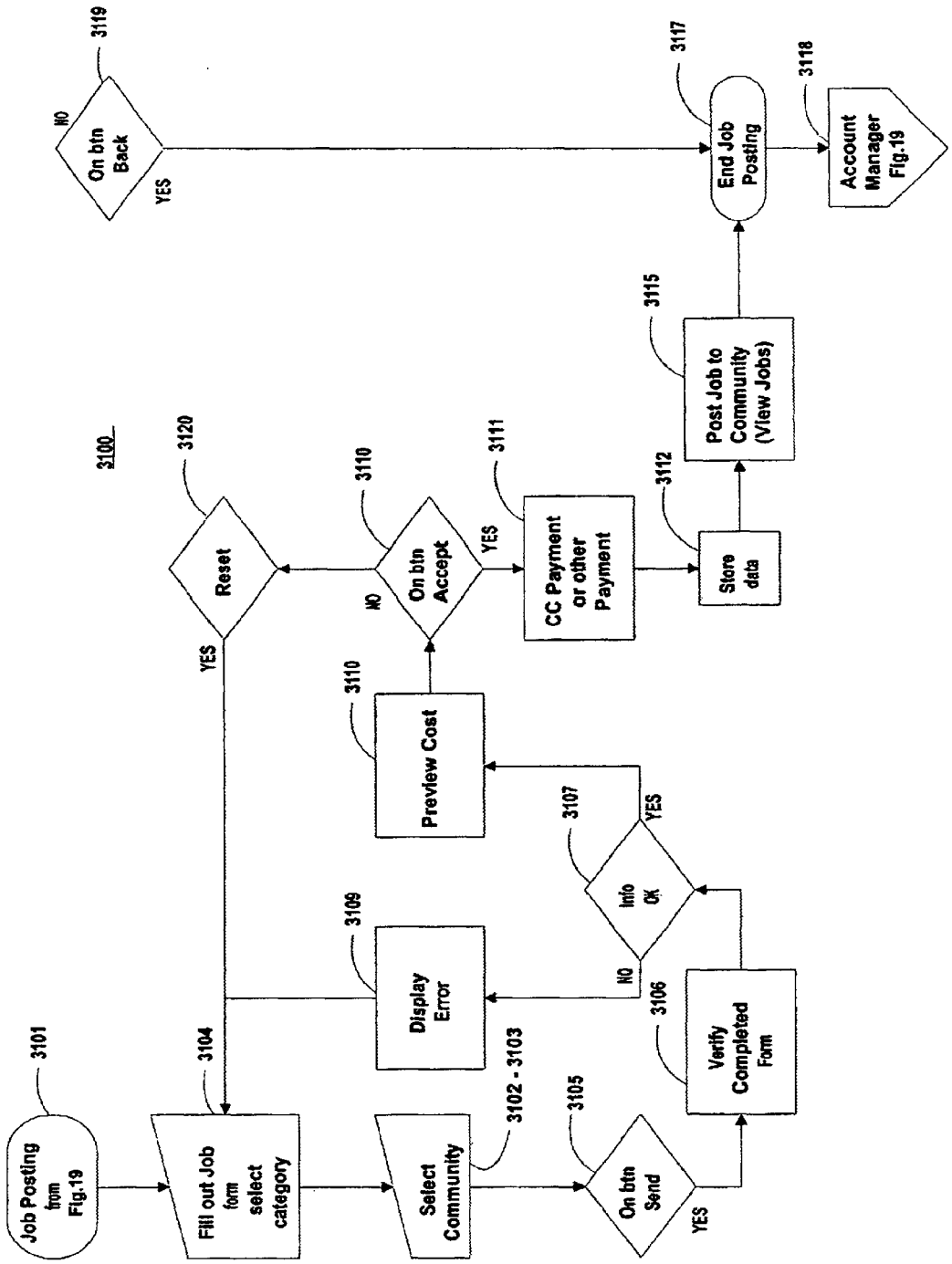

In FIG. 31, the permitted Communities are displayed 3102. The desired Community is then selected 3103 and the Job Profile Information is entered 3104. Once the "Send" hyper-link 3105 is activated, the Completed Form is verified 3106. If the information is acceptable, the cost is previewed 3108. If not, an error message is displayed 3109 and the Job Listing Form must be re-entered. If accepted 3110, a credit card payment is made 3111. If not accepted 3110, it is reset 3120 and the process starts over. The Job Posting data is then stored in the database 3112. The Job is then posted to the Community and the Job can be viewed 3115. The Job Posting is ended 3117 and one can.return to the Account Manager Screen 3118. Alternatively, the steps of displaying the communities 3102 and selecting the community 3103 can be combined into a single step 3102/3103 as shown in FIG. 31A.

Figure 38:
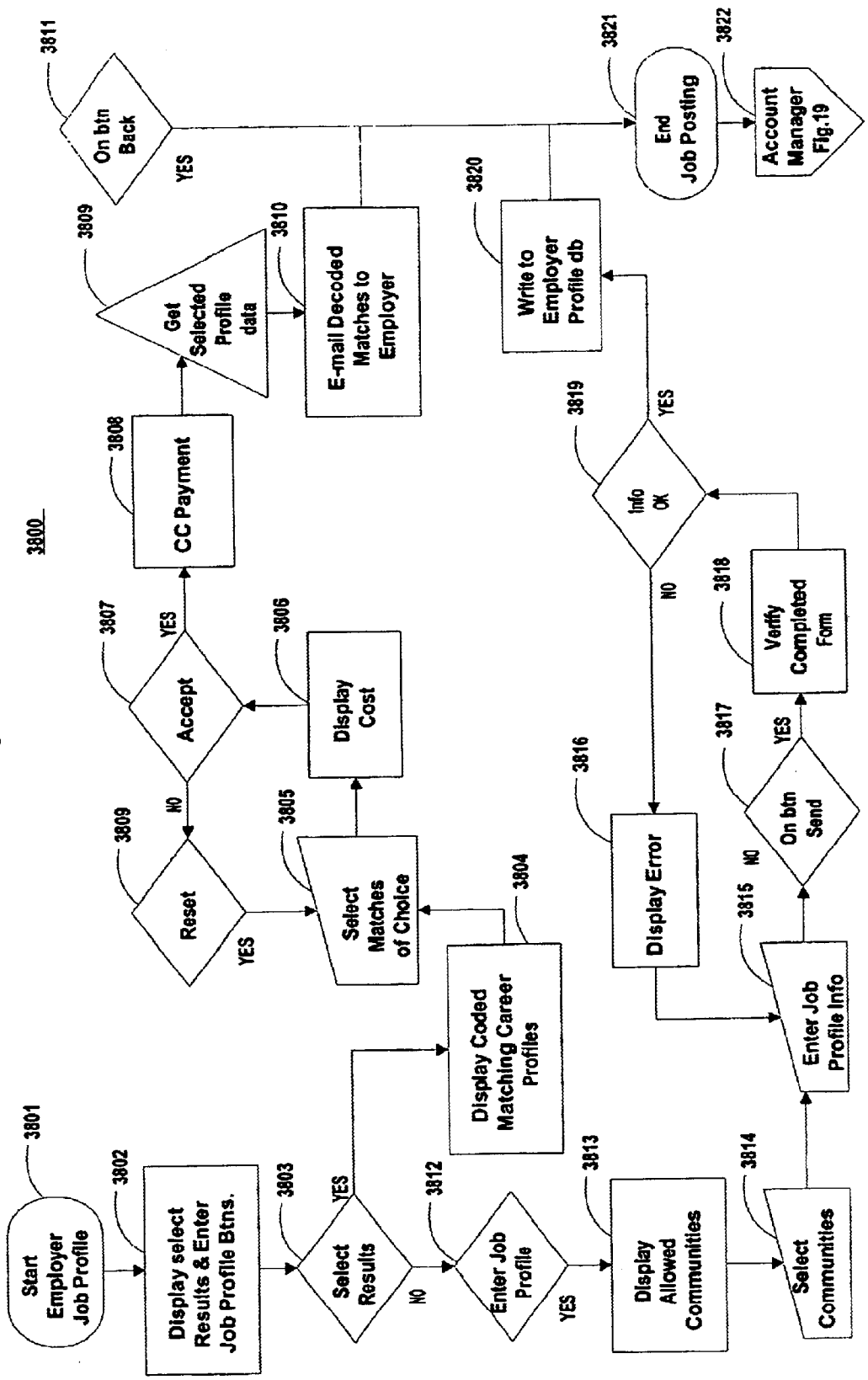
FIG. 38 is a system flow diagram of the Job Profile operations.

Alternatively, as shown in FIG. 38, means are provided for an Employer to enter a Job Profile to the system 10 or view a list of matching Career profiles from individuals who have agreed to be interviewed for a previously entered Job Profile. In return for having filled out a Career Profile, the Employee is given a list of Employer Names and Job Profiles which match his or her Career Profiles. The Employee then selects which Employer he or she wants to interview with. Once the Employer pays the requisite fees for the Career Profiles Selected, the Employee name and contact information is provided to the Employer.

To Start an Employer Job Profile 3801, the Selected Results are displayed and "Enter Job Profile" hyper-links are selected 3802. If the Results are selected 3803, the coded Matching Career Profiles 3804 are displayed. The desired Matches are then selected 3805 and the Cost is displayed 3806. If accepted 3807, then credit card payment is made 3808 and the selected Profile data 3809 is accessed. The decoded Matches are then e-mailed or faxed to the Employer 3810 and the Job Posting is ended 3821 and the Employer is returned to Account Manager 3822.

To enter a Job Profile 3812, the allowed Communities 3813 are displayed. The Communities are then selected 3814 and the Job Profile Information 3815 is entered and Sent 3817. If the form is verified as completed 3818 and 3819, the information is written to the Employer Profile database 3820 and the Job Posting is ended 3821. If not, an error is displayed 3816 and the Job Profile information must be reentered 3815.

As shown in FIG. 40, means for entering a Career Profile are provided wherein Shoppers can enter a Career Profile for automated matching to earlier submitted Job Profiles. Shoppers select the Job Postings of the Employers they would like to respond to with an online application. The application is then filled out and forwarded to all selected Employers. A Password is required to access this function.

When a Career Profile 4001 is started, the Password is checked 4002. If it is not correct, an Error 4004 is displayed. If accepted, the Career/Application is activated 4005. If the "Career Profile" hyper-link is not activated 4006, a "Fill Out Application" hyper-link is 4007. The Application is then displayed 4022 and filled out 4024. The form is checked 4025 and if it is acceptable 4026 it is submitted 4027. If not submitted, it is reset 4028 and the user starts over with a new Application 4022. If the Application is not acceptable 4026, error 4023 is displayed and the user start over with the new Application 4022. If the Application is accepted 4026 and submitted 4027, a confirmation is displayed 4029, the information is written to an Application file 4030 and an e-mail or fax is sent to the Selected Employers 4031 before Career Profile is ended 4020 and the user is returned to Job Postings 4021.

If the "Career Profile Form" hyper-link is selected 4008, the stored information is retrieved 4009 and the form automatically filled in based on the database information 4010. The information is then edited or completed 4011 and submitted 4013. If it is not submitted 4013, then it is reset 4012 for completion or editing 4011. If submitted 4013, the Career Profile database is accessed 4014 and Employer profile are searched for matches 4015. The Matching Employer list is displayed 4016 and the Matches to contact are selected 4017 and submitted 4018. If selected 4018, coded e-mail files are sent to the selected Employers 4019, prior to ending Career Profile 4020.

Figure 32:
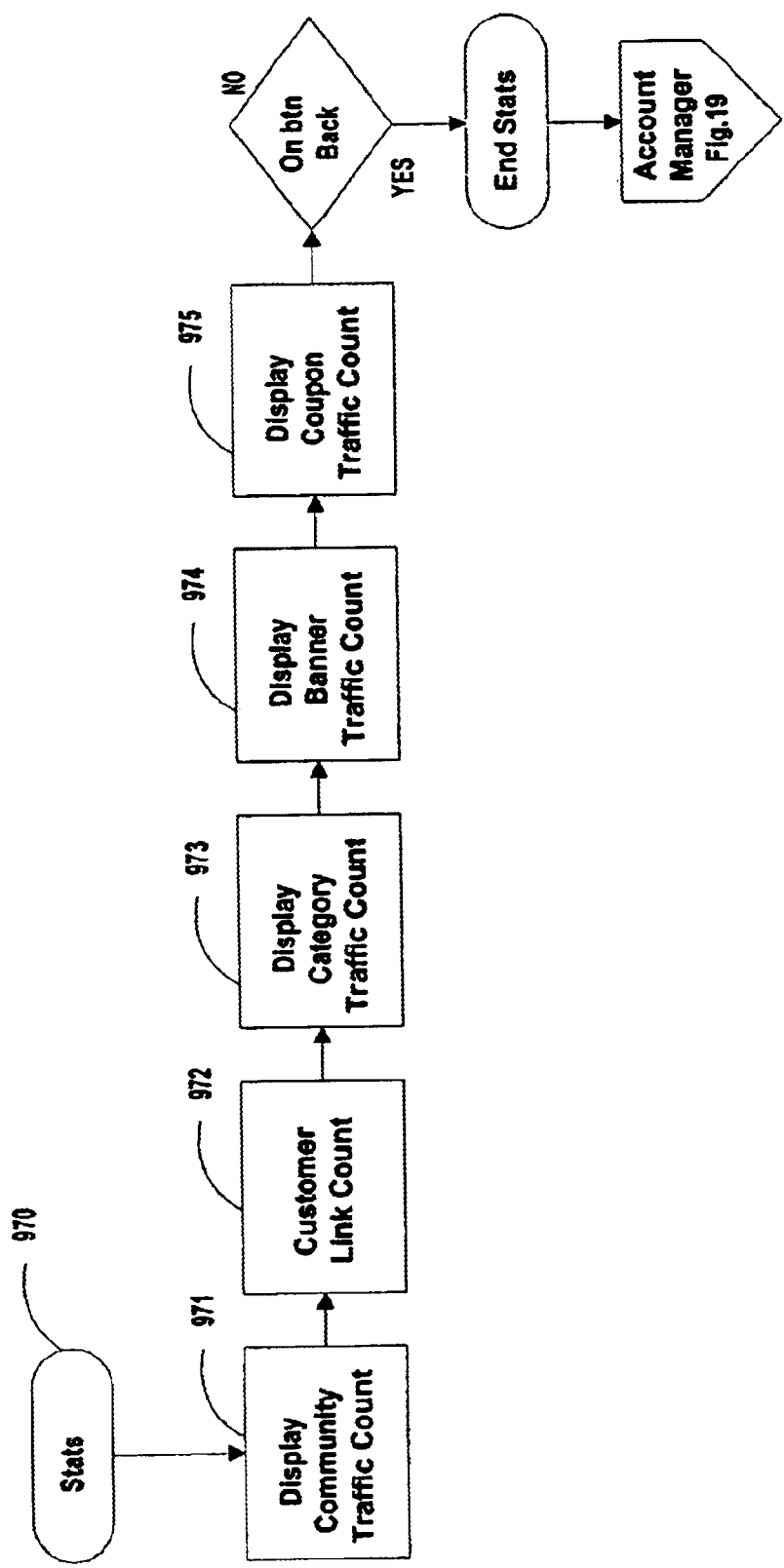
FIG. 32 is a system flow diagram of the Stats operations.

Stats 970 is another part of the Account Manager System which serves as means for recording statistics regarding various functions and usage of the system 10. As shown in FIG. 32, Stats 970 allows Customers to review counts regarding the services provided. Stats 970 displays Community Traffic Count 971, Customer Link Court 972, Category Traffic Count 973, Banner Traffic Count 974, and Coupon Traffic count 975.

Figure 32A:
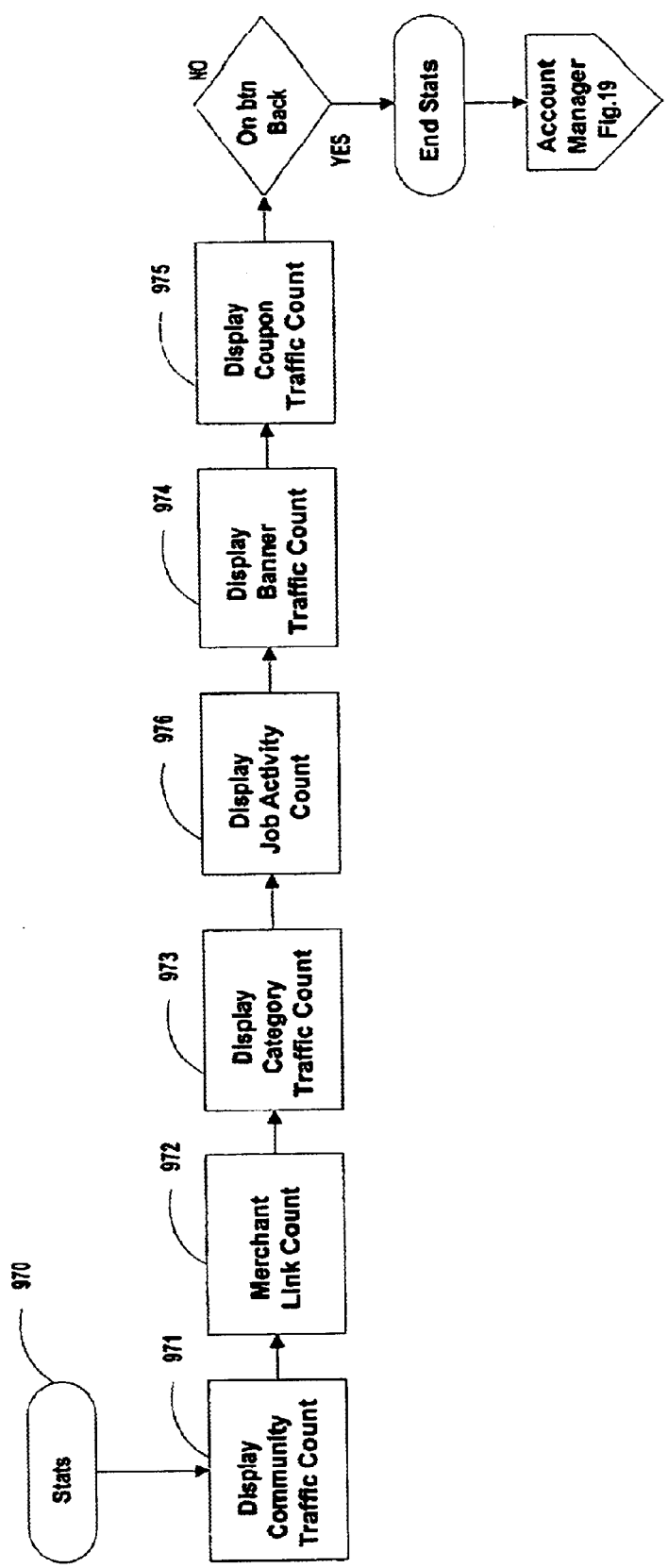
FIG. 32A is a system flow diagram for an alternative for the Stats operations.
Figure 33:
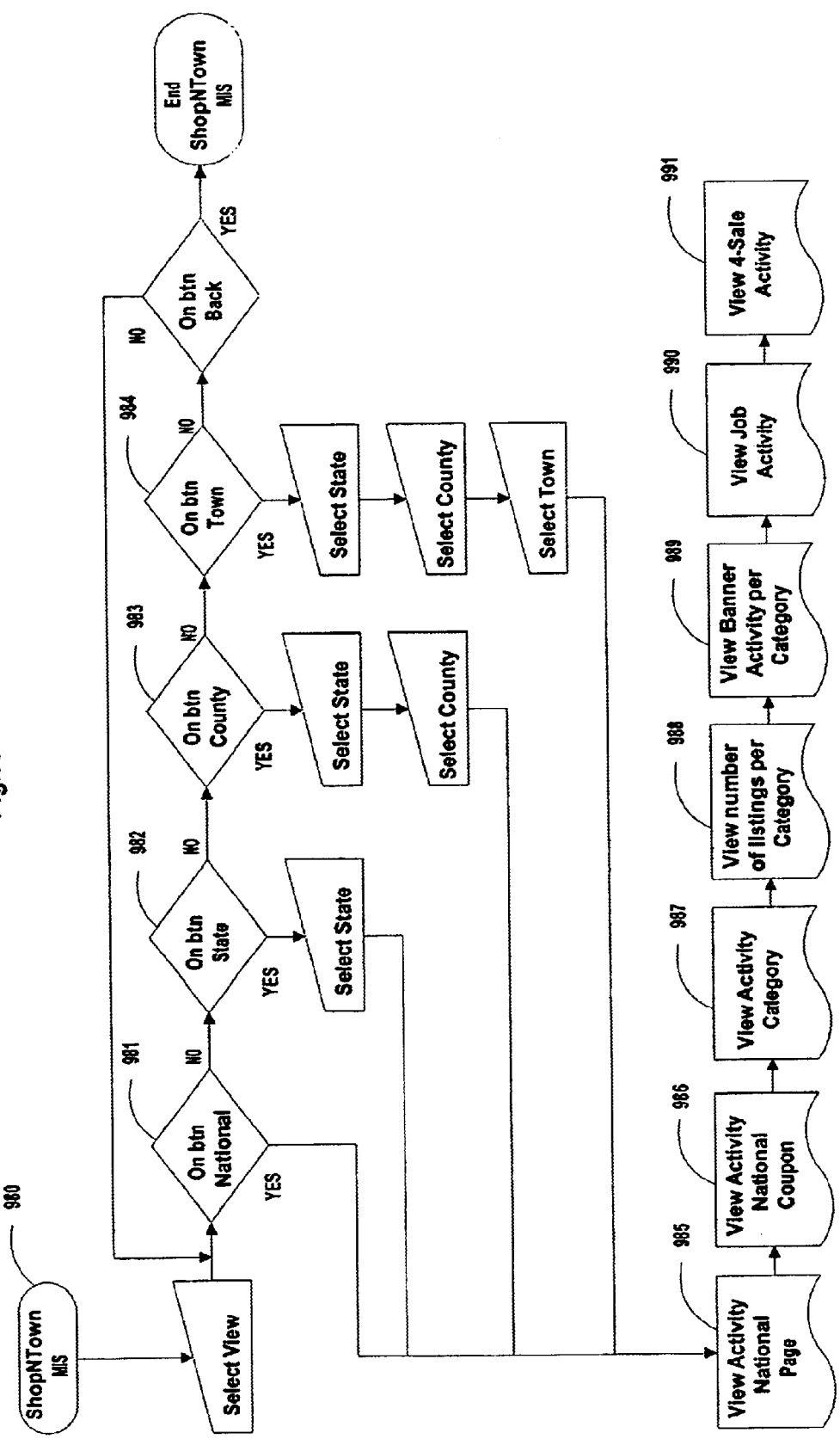
FIG. 33 is a system flow diagram of the Market Analysis operations.
Figure 33A:
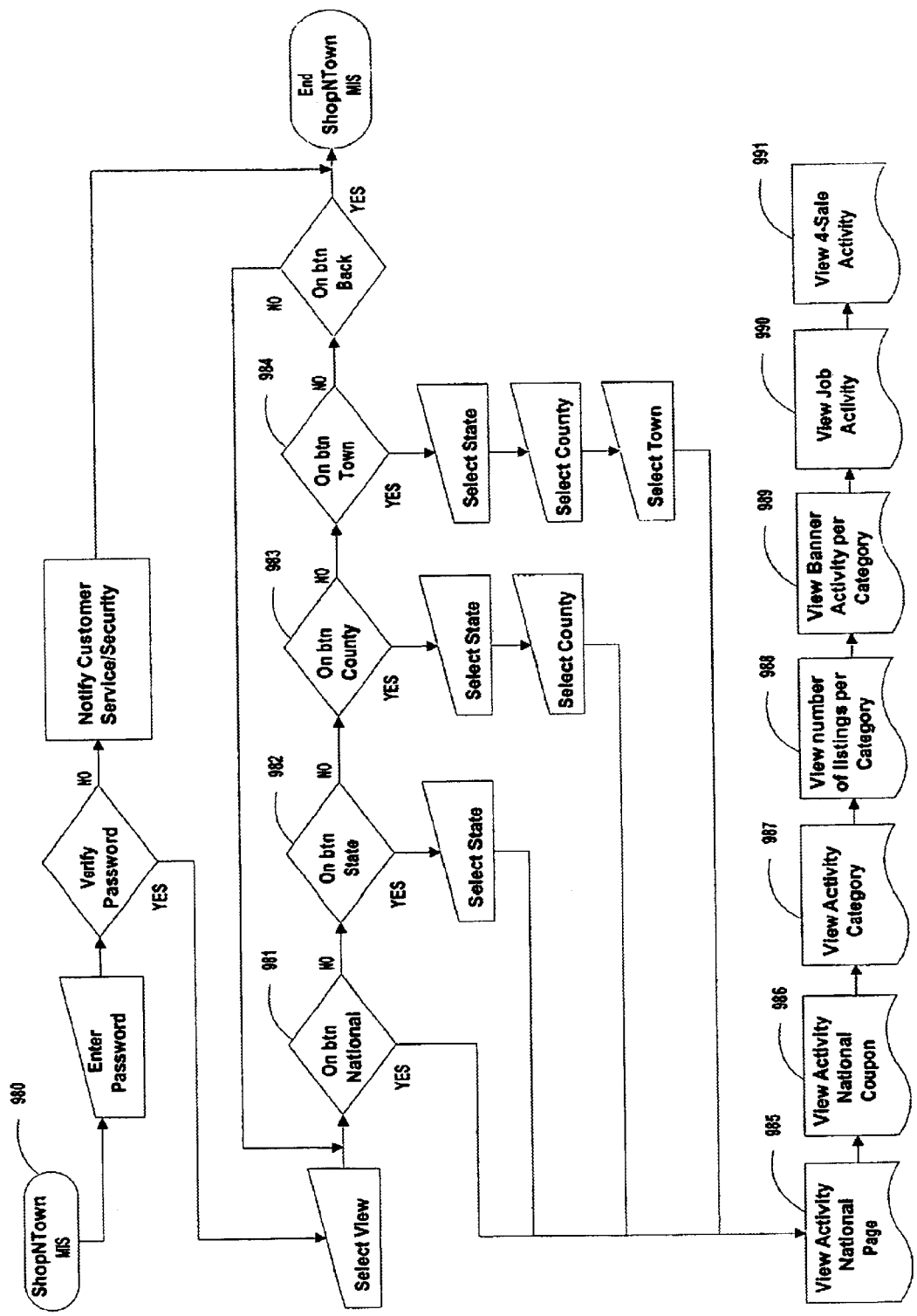
FIG. 33A is an alternative of a system flow diagram of the Market Analysis operation.

Alternatively, as shown in FIG. 32A, after the Category Traffic Count 973 is displayed, the Job Activity Count 975, can be displayed before displaying the Banner Traffic Count 974.

Means for providing Marketing Analysis information is also provided. Authorized personnel also have access to Marketing Analysis 980. By selecting National 981, State 982, County 983, Town 984, the following can be viewed: Activity National Page 985; Activity National Coupon 986; Activity Category 987; Listings Per Category 988; Banner Activity Per Category 989; Job Activity 990; and For Sale Activity 991.

Figure 34:
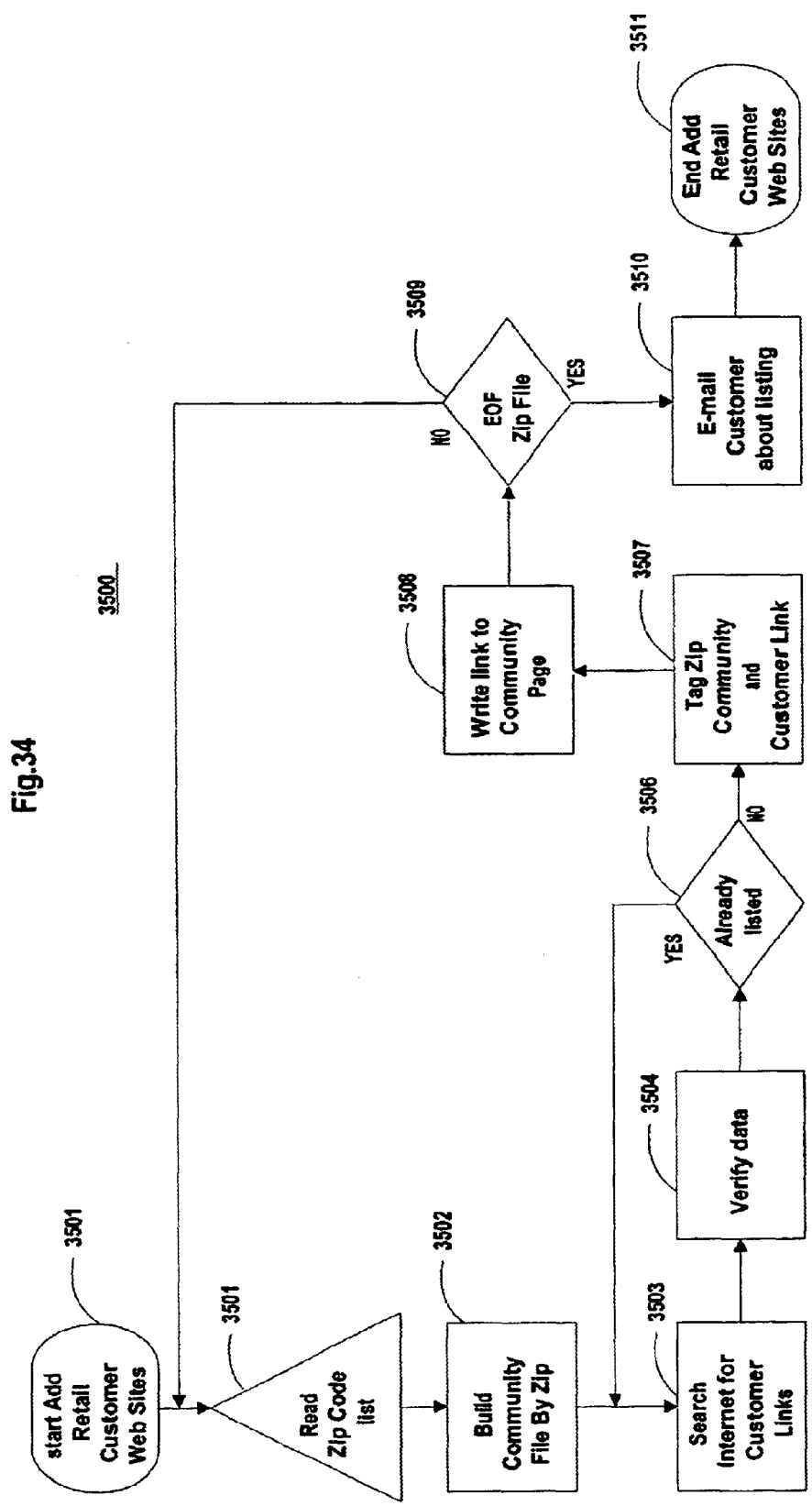
FIG. 34 is a system flow diagram of the verification of a Merchant's listing.

Means for building databases regarding Communities and/or their web sites is also provided. As shown in FIG. 34, Customers URL's will be searched, verified and automatically listed. Retail customer web sites are added 3500. The Zip code list is read 3501. A Community File is built by Zip Code 3502. The Internet is searched for customer Links 3503. The data is verified 3504 and if not already listed 3506, the Zip code Community and Customer Link are tagged 3507. The Link is written to the Community Page 3508. The Customer is e-mailed about the listing 3510 and the Retail Customer web sites are added 3511.

Figure 35:
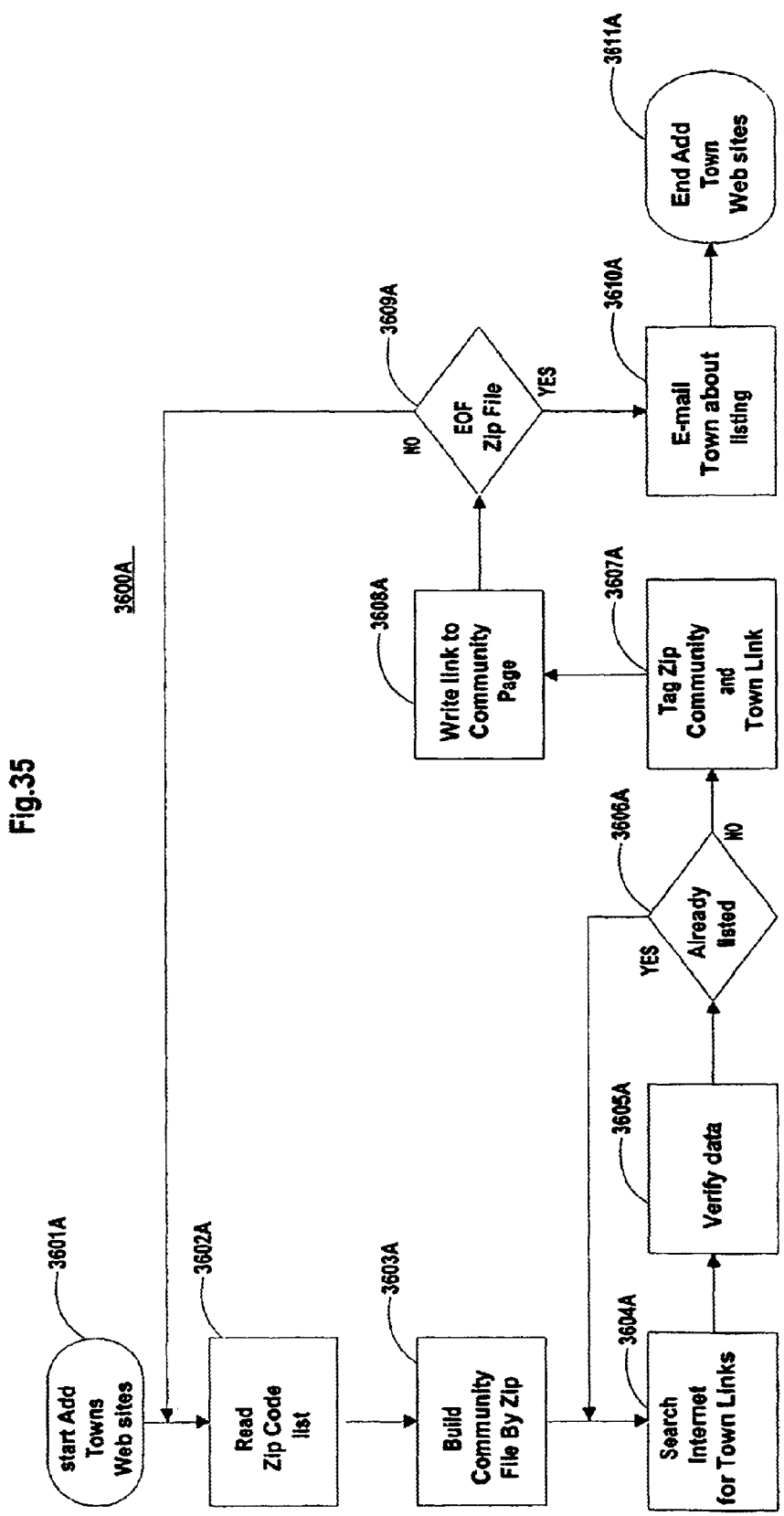
FIG. 35 is a system flow diagram of the addition of Town websites to the system.

Means for building a Town Web site database is also provided. A database of Town Websites is also built, as shown in FIG. 35. Town websites are added. The Zip Code list is read 3602A. The Community File is built by Zip Code 3603A. The Internet is searched for Town Links 3604A. The data is verified 3605A and if not already listed 3606A, the Zip Code Community and Town Link are tagged 3607A. The Link is written to the Community Page 3608A. The Town is e-mailed about the listing 3610A. The Town web sites are then added 3611A. If a new zip code is added to a town, the existing content will be shown in both zip codes for the balance of the service contracted for. Any new data will have to be entered into each zip code community.

As shown in FIG. 36, special passwords 3601 can be obtained. An ID form is filled out 3602, submitted 3603, verified 3604 and if the data is acceptable 3605, it is stored 3607. If not, an error message is displayed 3606. After the data is stored 3607, it is verified 3608 and a password is emailed 3609. The special password page is ended 3611 and the user returned to the start 3612.

Figure 37:
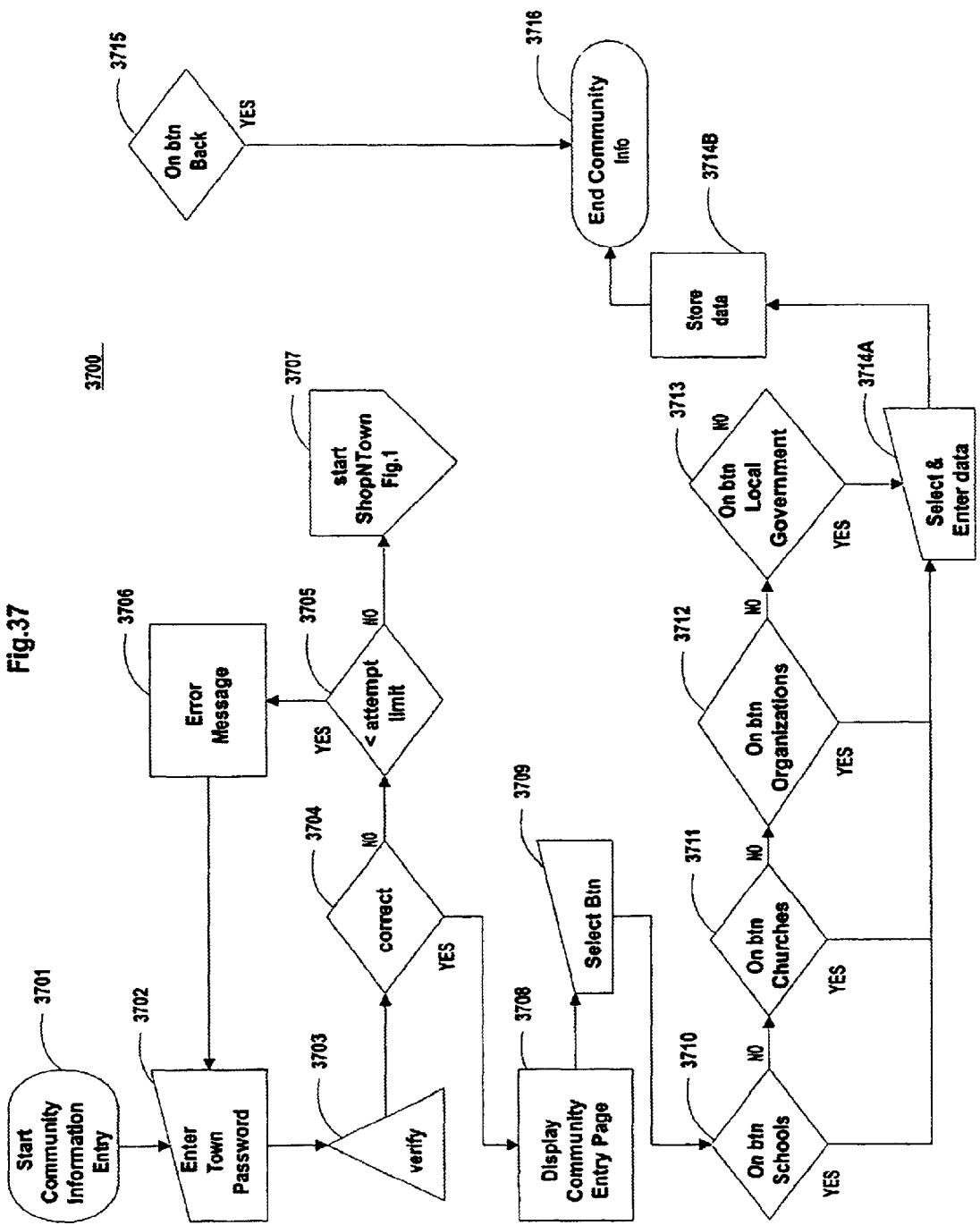
FIG. 37 is a system flow diagram of the community information entry operations.

As shown in FIG. 37, Means for entering Community Information by a Town are provided. To start the entry of Community Information 3701, the Town Password is entered 3702. If the correct Password for that Town is entered 3704, the Community Enter Page is displayed 3708. If not, the number of attempts to do so is limited 3705 and an error message 3706 is shown, if a valid Password is not entered. Once the limit is reached, the user is returned to the Start 3707.

Once the Community Entry Page is reached 3708, the Select button 3709 is used to select information about Schools 3710, Churches 3711, Organizations 3712 and/or Local Governments 3713. The selected data is then entered 3714A and stored 3714B. The "Back" hyper-link 3715 then ends the Community Information section 3716.

Figure 39:
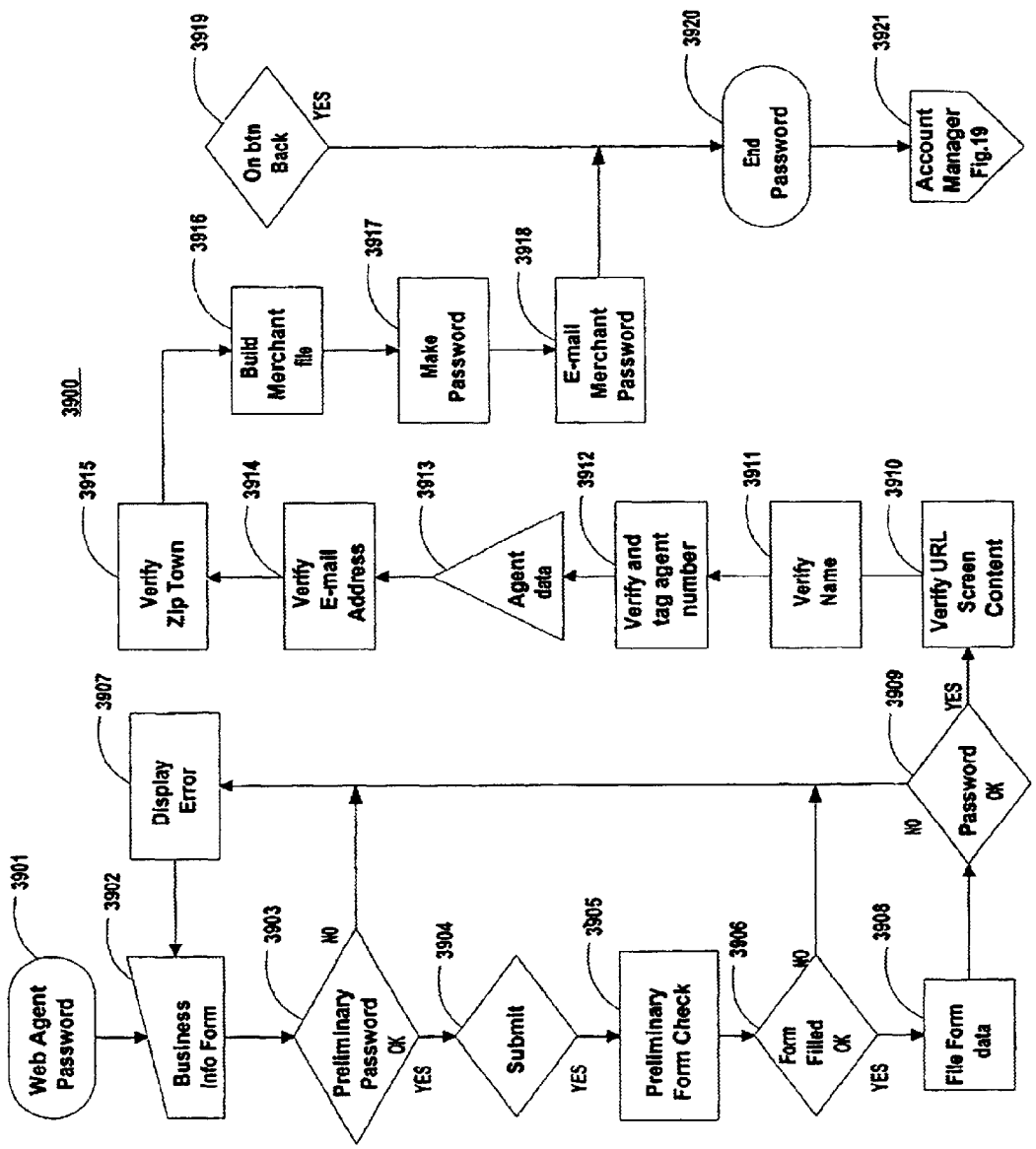
FIG. 39 is a system flow diagram of the Web Agent password operations.

Means are also provided for recording Agent Data, Accounting for Commissions and issuing Passwords to Agents. As shown in FIG. 39, Web site Agents are sent two e-mails. The first provides information about the system 10 and is linked to the system's 10 National Home Page 102. The second e-mail is for the web site developers to obtain a Password and Agent Number. The second e-mail is linked to a special password page that cannot otherwise be reached. Web Agent Password 3901 is obtained by filling in Business Information Form 3902 and obtaining Preliminary Password 3903 and submitting the form 3904. If the form is accepted 3905 and 3906, the form data is filed 3908. If the password is not accepted, error 3907 is displayed and the business information form must be reentered. The Agent data is entered 3913. The e-mail address 3914 and Zip Town 3915 are verified. A merchant file 3916 is built, a Password 3917 is generated and e-mailed to the Merchant 3918. The Password Module can be ended 3920 and the user is returned to Account Manager 3921.

Figure 39A:
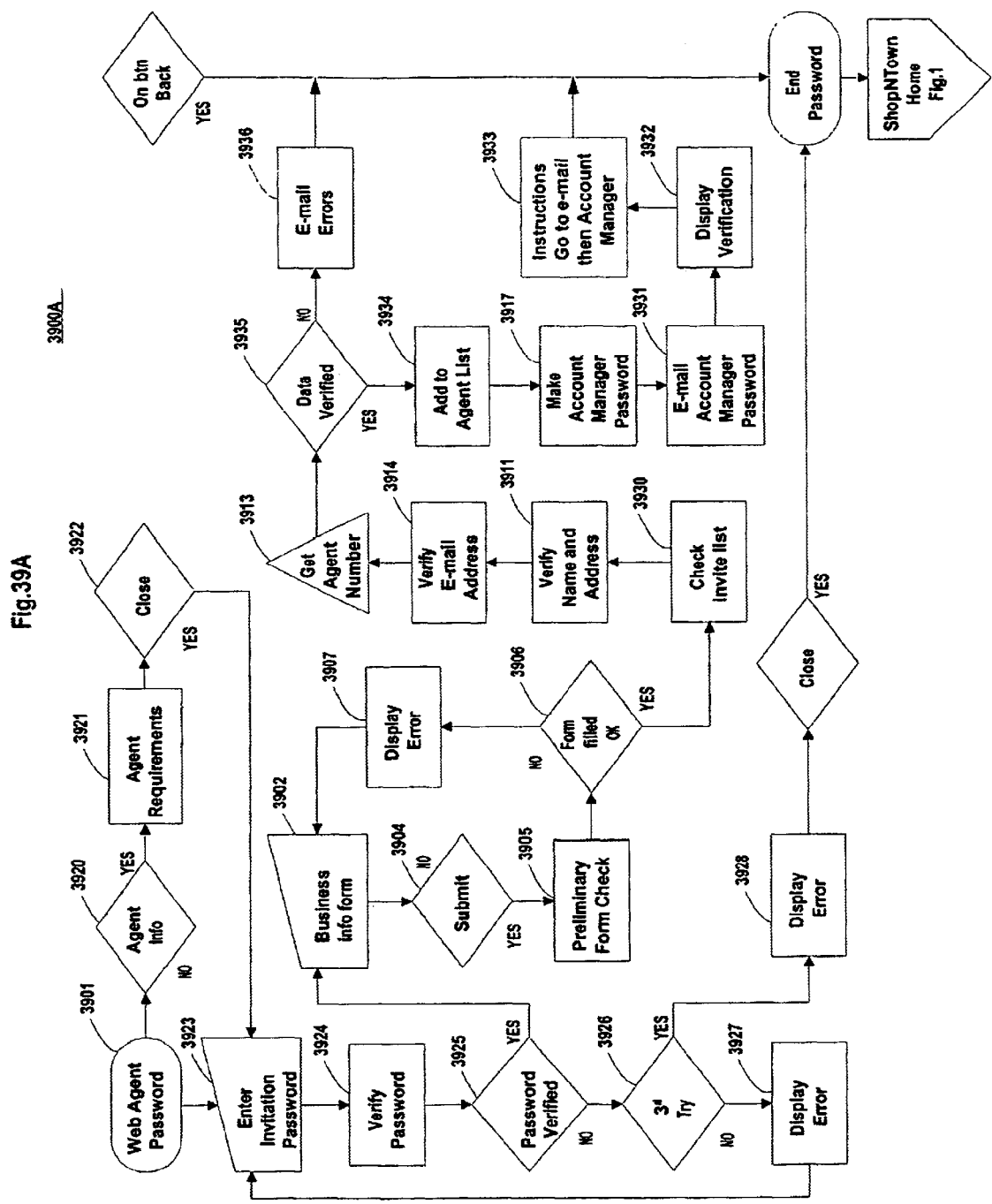
FIG. 39A is a system flow diagram of an alternative for the Web Agents password operations.

Alternatively, as shown in FIG. 39A, online help can be provided in the form of Agent Info 3920, Agent Requirements 3921 and close 3922. Likewise, the entry of an invitation password 3923 can be required, followed by verification of the password 3924 and the display of an error message 3927 and 3928 and closure 3929, if after three tries 3926 the password cannot be verified 3925. In addition, if the form is filled out correctly 3906, the invite list can be checked 3930 before the name and address are verified 3911. In addition, once the agent number is given 3913 and the data verified 3935, the individual is added to the agent list 3934. After the account manager password is made 3917, the Account Manager password is emailed 3931, verification is displayed 3932 and instructions go to email and then the Account Manager 3933. If the data cannot be verified 3935, an email error 3936 is sent.

Means for selecting and accessing information about particular Towns is provided. As shown in FIG. 41, About Our Town 4101 starts when About Our Town button 4102 is selected. The items to be listed with links are selected 4103. The list and links are displayed 4104. The user can return to the Community Page 4106 (FIG. 3).

Figure 42:
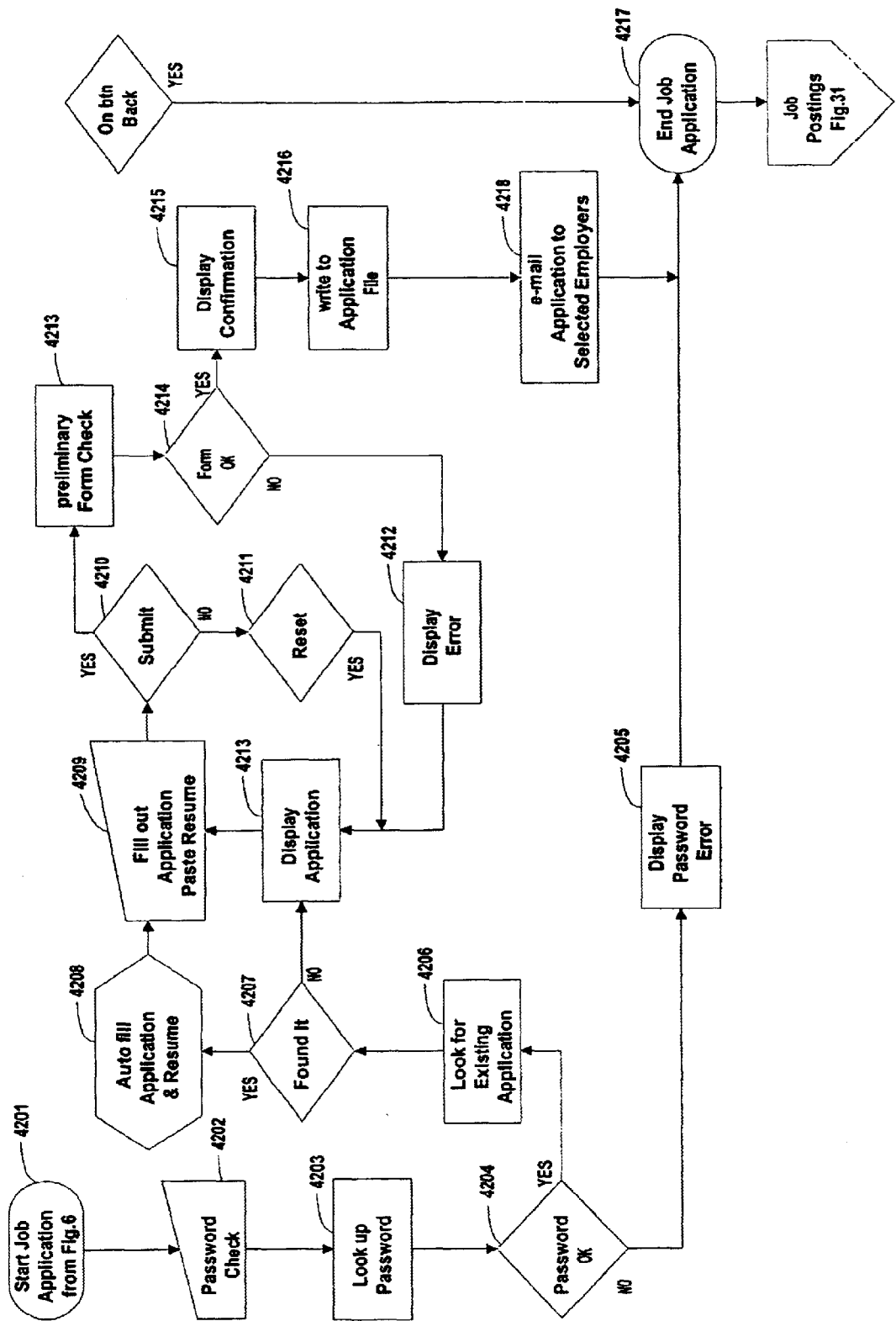
FIG. 42 is a system flow diagram of the job application operations.

Shoppers may also submit a Job Application 4201, as shown in FIG. 42 and attach a resume 4209 by pasting it in. Shoppers may also select from the Job Postings, the employers they would like to receive an online job application. The application is filled out in this module and forwarded to all selected employers. A password is required in order to do so. Password 4202 is checked, looked up 4203 and if accepted 4204, an existing Job application is searched for 4205. If found 4207, the prior application is displayed 4213 and an application and resume are automatically filled in from such prior information 4208. A resume can be attached 4209. If submitted 4210, the form is checked 4213 and if acceptable 4214, a confirmation is displayed 4215. The new application is then written to the Application file 4216 and the Application is emailed or faxed to the selected employers 4218. Job Application 4217 can then be ended.

Figure 43:
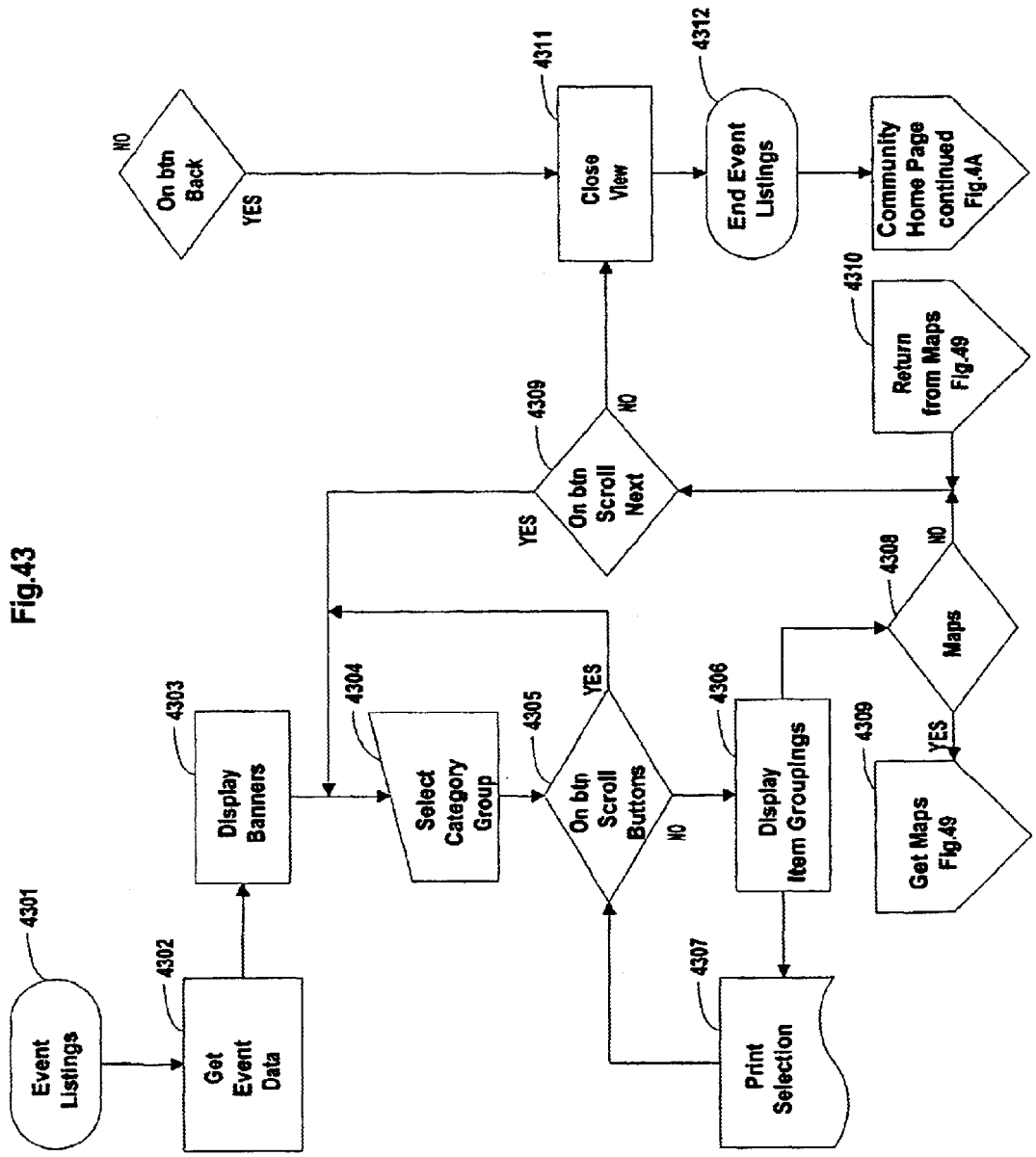
FIG. 43 is a system flow diagram of the Event Listings operations.

Events are listed in groupings by category. Events will be anchored by category and moved by scroll bar. Events may be viewed by anyone for no charge. The postings runs for a set number of days determined by the system and is automatically deleted thereafter. As shown in FIG. 43, to view event listings 4301, event data is obtained 4302 and display banners are viewed 4303. Category groups are then selected 4304. The user scrolls 4305 in order to display Item Groupings 4306 and print selections 4307. Maps can be viewed 4308 and obtained 4309. The view is then closed 4311 and Events Listing is ended 4312.

Figure 44:
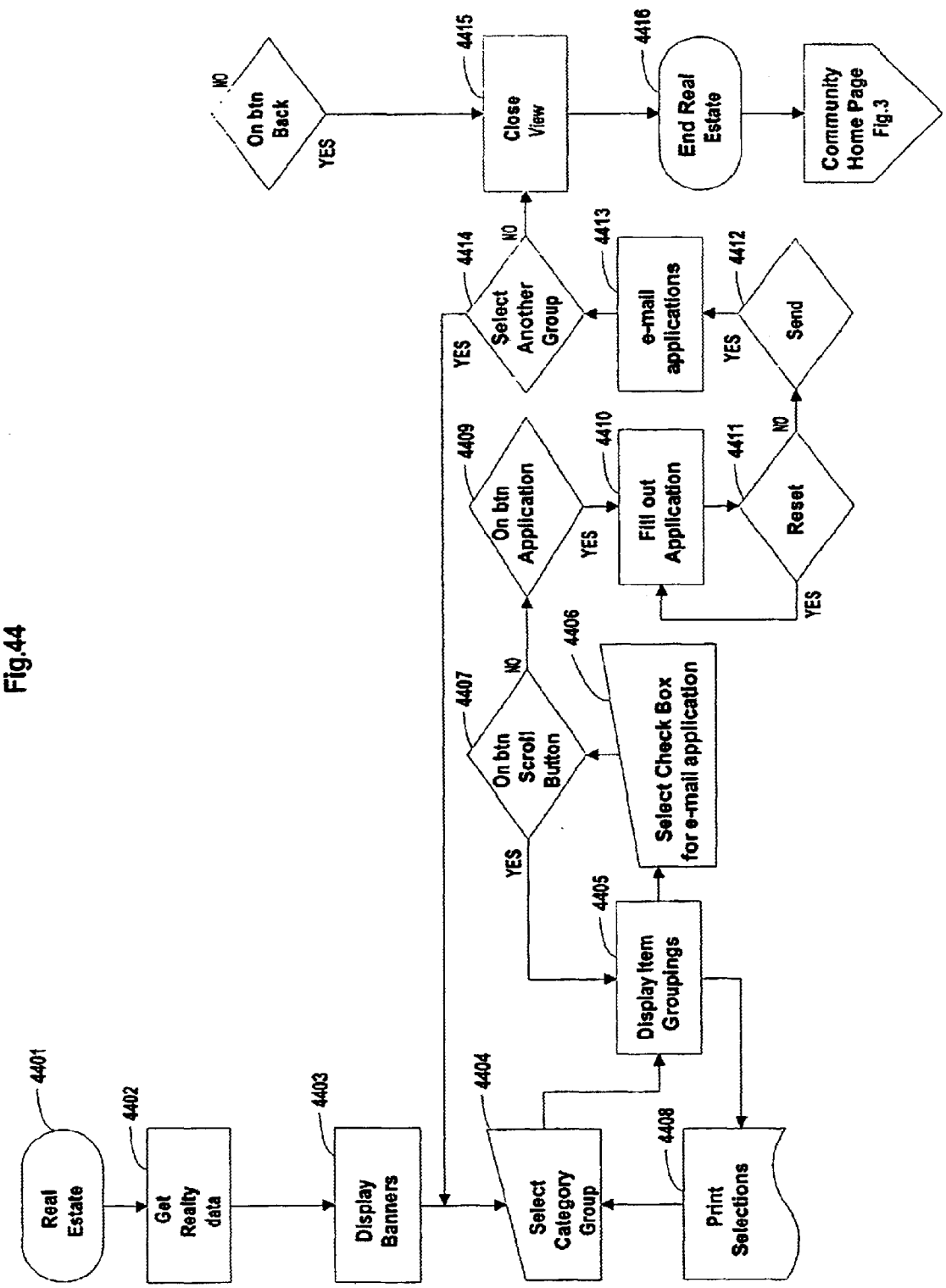
FIG. 44 is a system flow diagram of the Real Estate Listings operations.

Similarly, Real Estate Listings 4401 are viewed, as shown in FIG. 44 by obtaining the real estate data 4402 and viewing the display banners 4403. The category Group 4404 is selected and the item groupings displayed 4405. A check box is selected for an email application 4406 and by scrolling 4407, the selections 4408 can be printed. An application can be selected 4409 and filled out 4410 and if not reset 4411, sent 4412 as an email or faxed application 4413. The party originating the real estate listing can choose to receive applications by email and/or fax. Unless another group is selected 4414, the view is closed 4415, so as to end the Real Estate Listings 4416.

Figure 45:
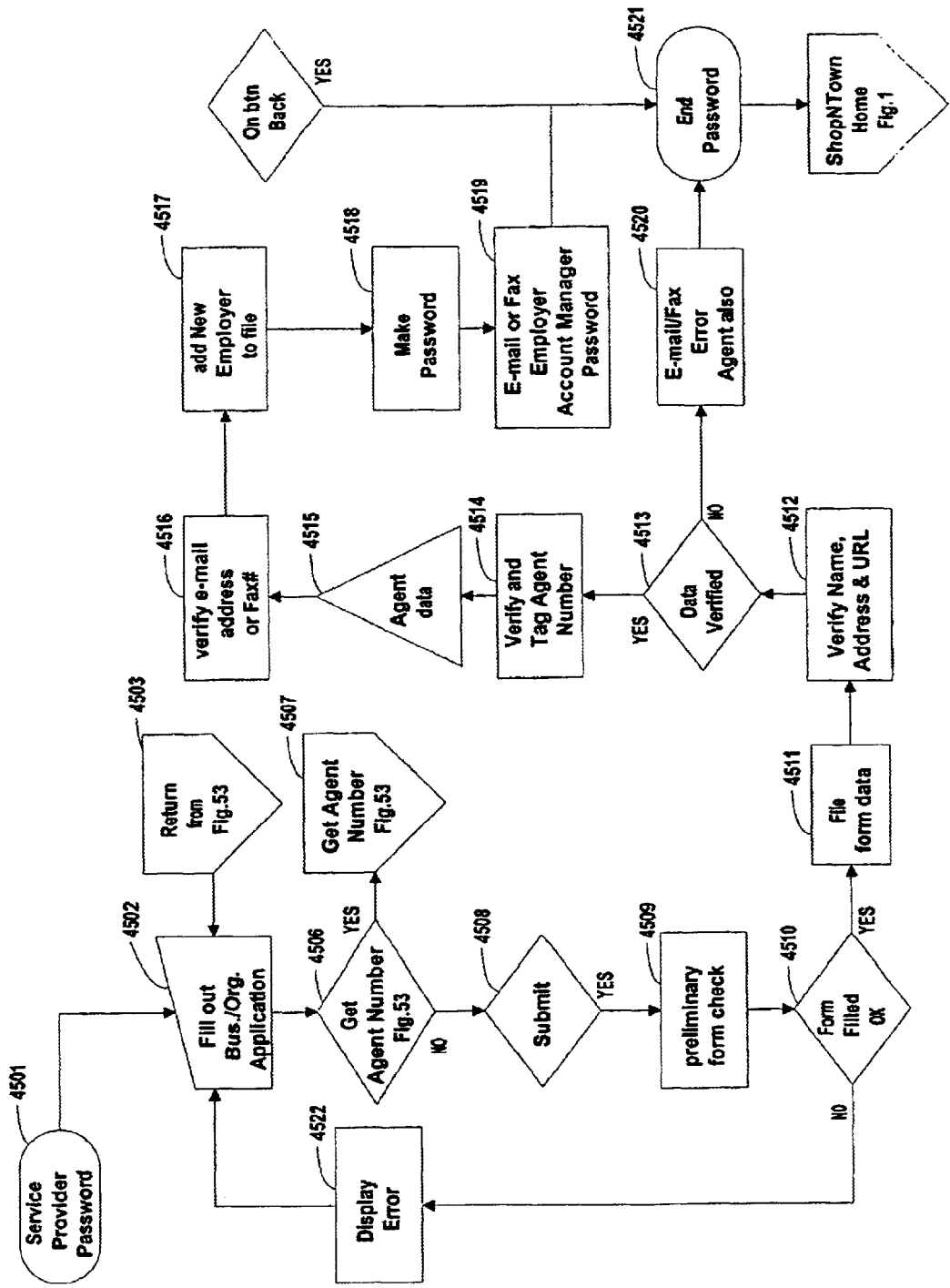
FIG. 45 is a system flow diagram of the Service Provider password operations.

Service providers, such as advertising agencies, employment agencies, coupon resellers, public relations firms, event bookers and other business promoters, may be listed in system directories. They can promote their own or the businesses of others with coupons, banner ads and job listings. Email access and/or fax machines are needed so as to apply online for passwords. A web site URL is needed in order to access extended services or community directories. To obtain a service provider password 4501, as shown in FIG. 45, an Application is filled out 4502. At the Agent Number page 4506, the Agent Number can be obtained 4507. Once the Application is submitted 4508, a preliminary form check 4509 is made. If acceptable 4510, the form data is filed 4511 and the name, address and URL are verified 4512. If verified the data is verified 4513 and the agent number is verified and tagged 4515. After verifying the email address or fax number 4516 with respect to agent data 4515, the new employer 4517 is added to the file. A new password 4518 is made and the employer account manager password is emailed 4519. The password view is then ended 4521.

Figure 46:
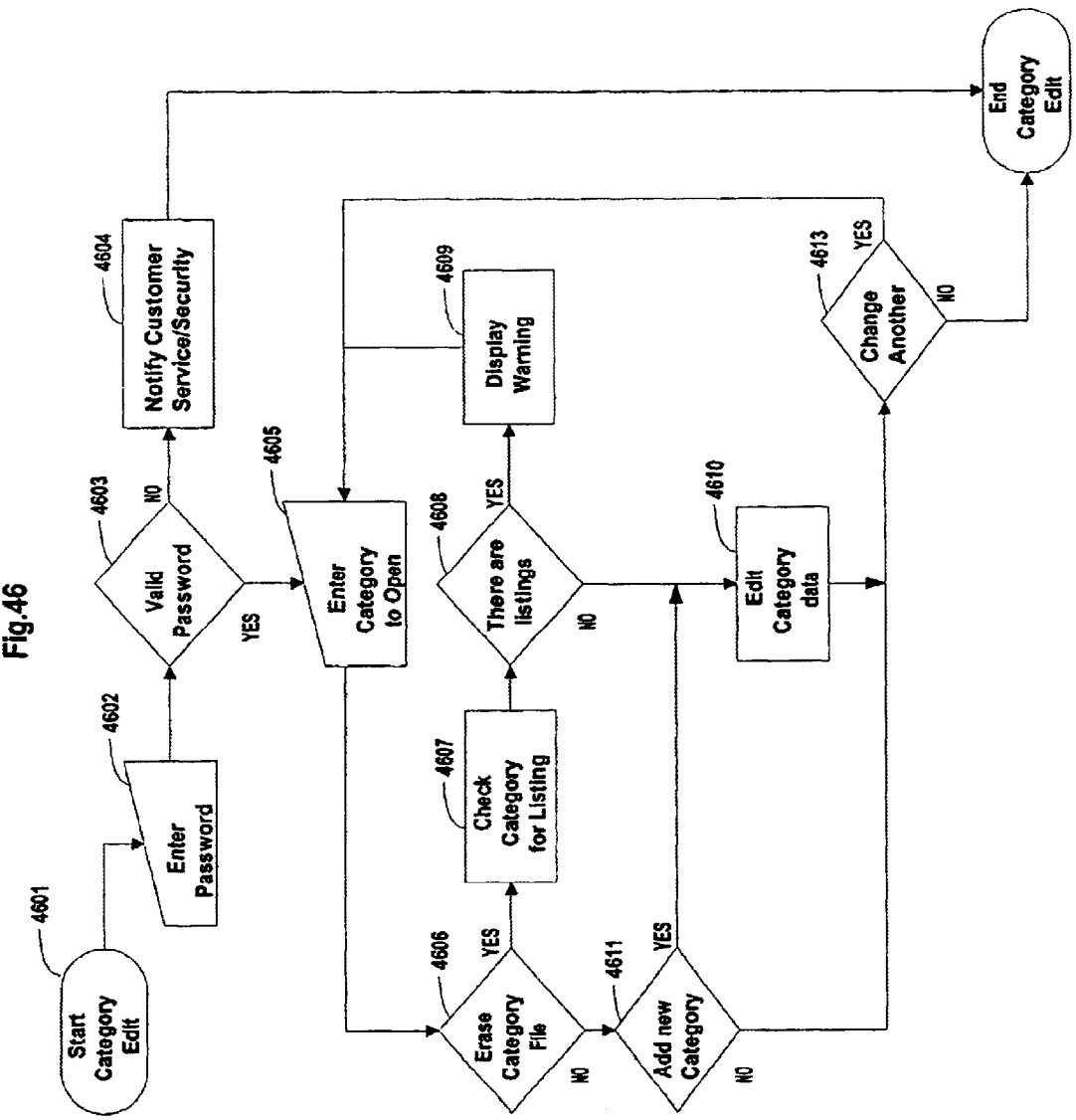
FIG. 46 is a system flow diagram of the Category edits operations.

As shown in FIG. 46, category buttons can be added or deleted. For instance, if it is found that a category has not had listings posted to it, it can be removed. Likewise, if new categories are needed, they can be added by the system administrator using this feature. A password is entered 4602 and if valid 4603, a category to open must be entered 4605. Existing category listings are searched 4607 and can be erased 4606 or added 4611. Category data can be edited 4610 and others changed 4613.

Figure 47:
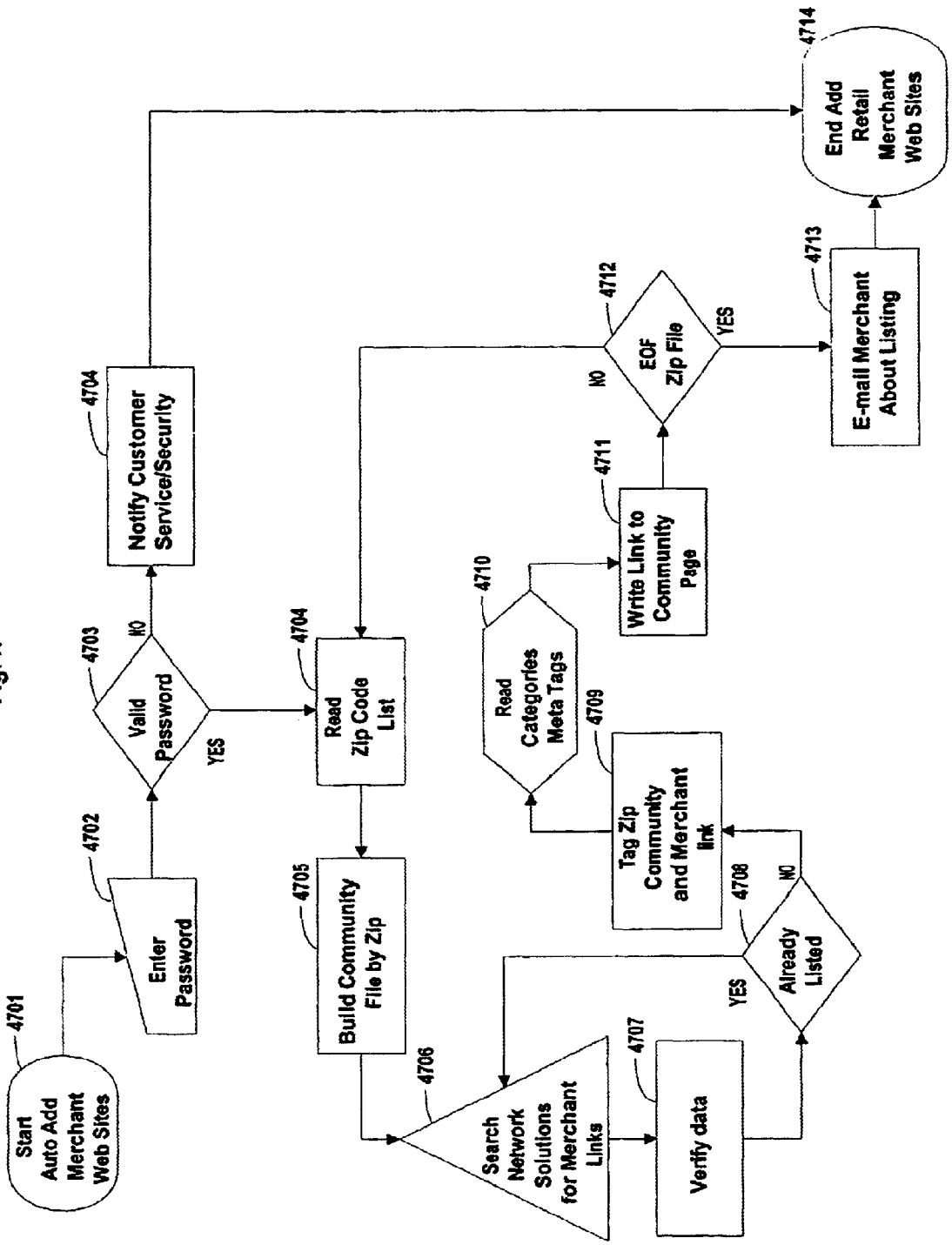
FIG. 47 is a system flow diagram of the addition of Automotive Merchant's websites to the system.

Merchants URLs can be searched as shown in FIG. 47. To start Auto Add Merchant Web sites 4701, a password is entered 4702. If the password is valid 4703, the zip code list is read 4704 and a community file by zip is built 4705. Network Solutions is searched for Merchant links 4706 and the data is verified 4707. If not already listed 4708, the merchant link and zip community is tagged 4709. The metatag categories tags are read 4710. A link is written to a community page 4711. If an EOF zip file exists 4712, then the Merchant is emailed about the listing 4713 and the Add Merchant Web sites module is closed 4714.

Figure 48:
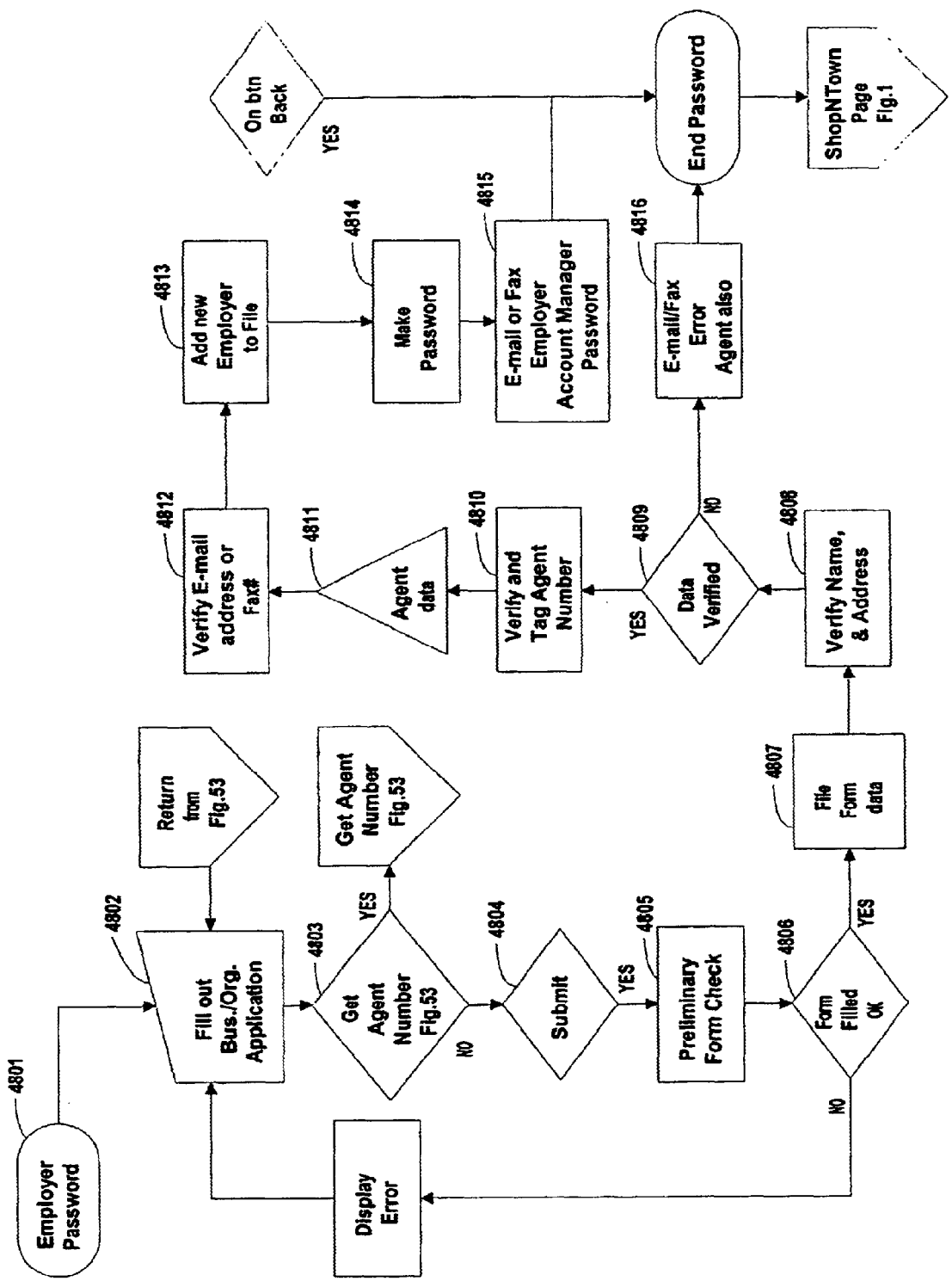
FIG. 48 is a system flow diagram of the Outside Employer's password operations.

Outside employers who are not listed in the system, may nevertheless offer Coupons or use Job Listings to find employees. Email or fax access is necessary and they must apply online for a password. The password allows them to gain access into a Employer Job Listing page. If the employer has a web page and enters the URL on the form, they will then have an Account Manager like any Merchant on the system. As shown in FIG. 48, to obtain an employer password 4801 an Application is filled out 4802 and an Agent number is obtained 4803. After the Application is submitted 4804, checked as to form 4805 and accepted 4806, the form data is filed 4807. The name and address are verified 4808 as well as the data 4809. If it fails an error message is sent by email or fax 4816. If verified 4809 then the agent number is tagged 4810 and added to the agent data 4811. The email address or fax is then verified 4812 and the new employer is added to the file 4813. A password is then made 4814 and an email or fax is sent to the employer containing the account manager password 4815.

Figure 49:
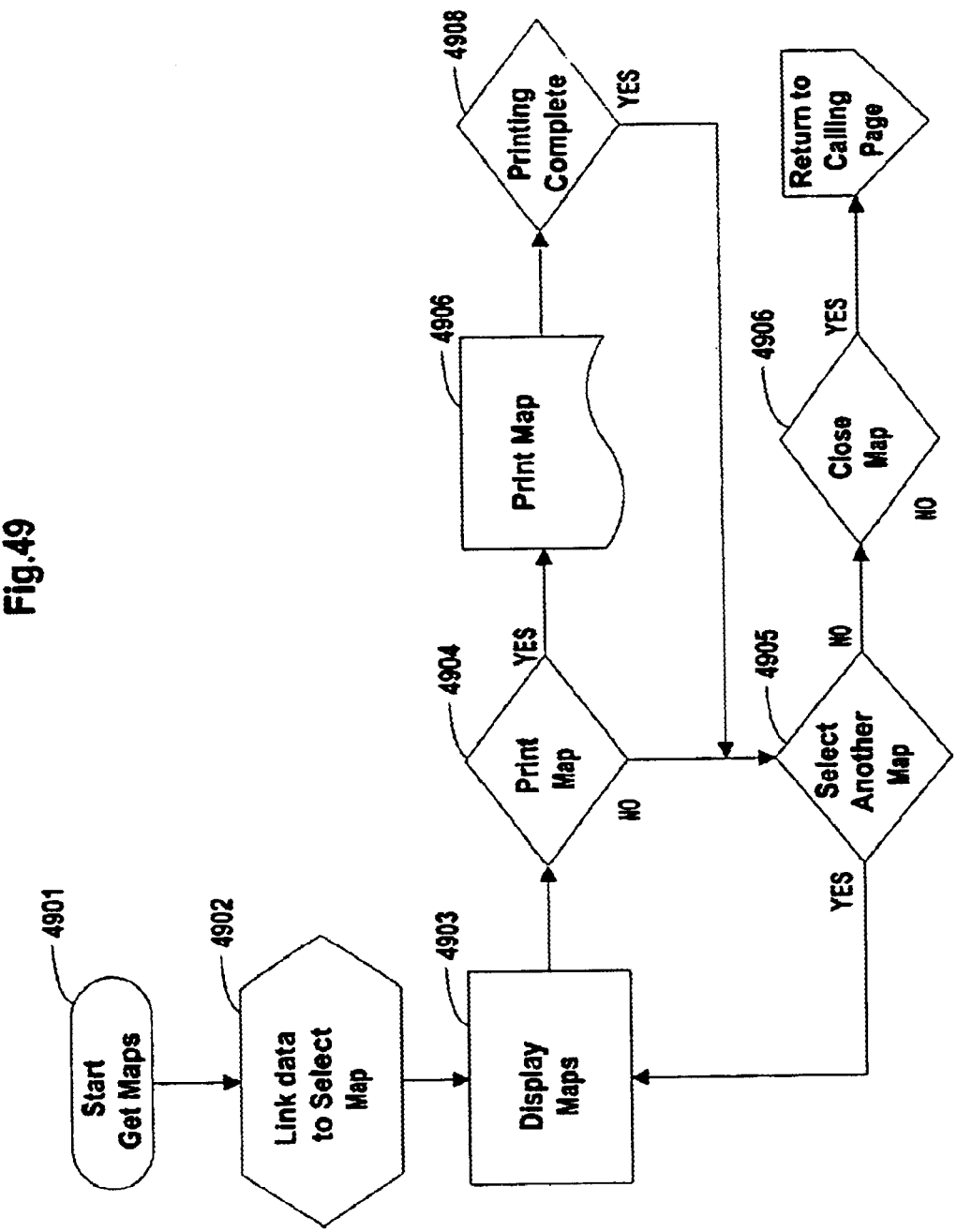
FIG. 49 is a system flow diagram of the third party map operations.

Maps supplied by third parties can also be made available to users of the system. As shown in FIG. 49, the process of getting maps is started 4901 by using link data to select a map 4902. The maps are then displayed 4903 and selected for printing 4904 and then downloaded and printed 4906. Once printing is complete 4908, another map may be selected 4905. Once all the desired maps are downloaded and printed, the view is closed 4906.

Figure 50:
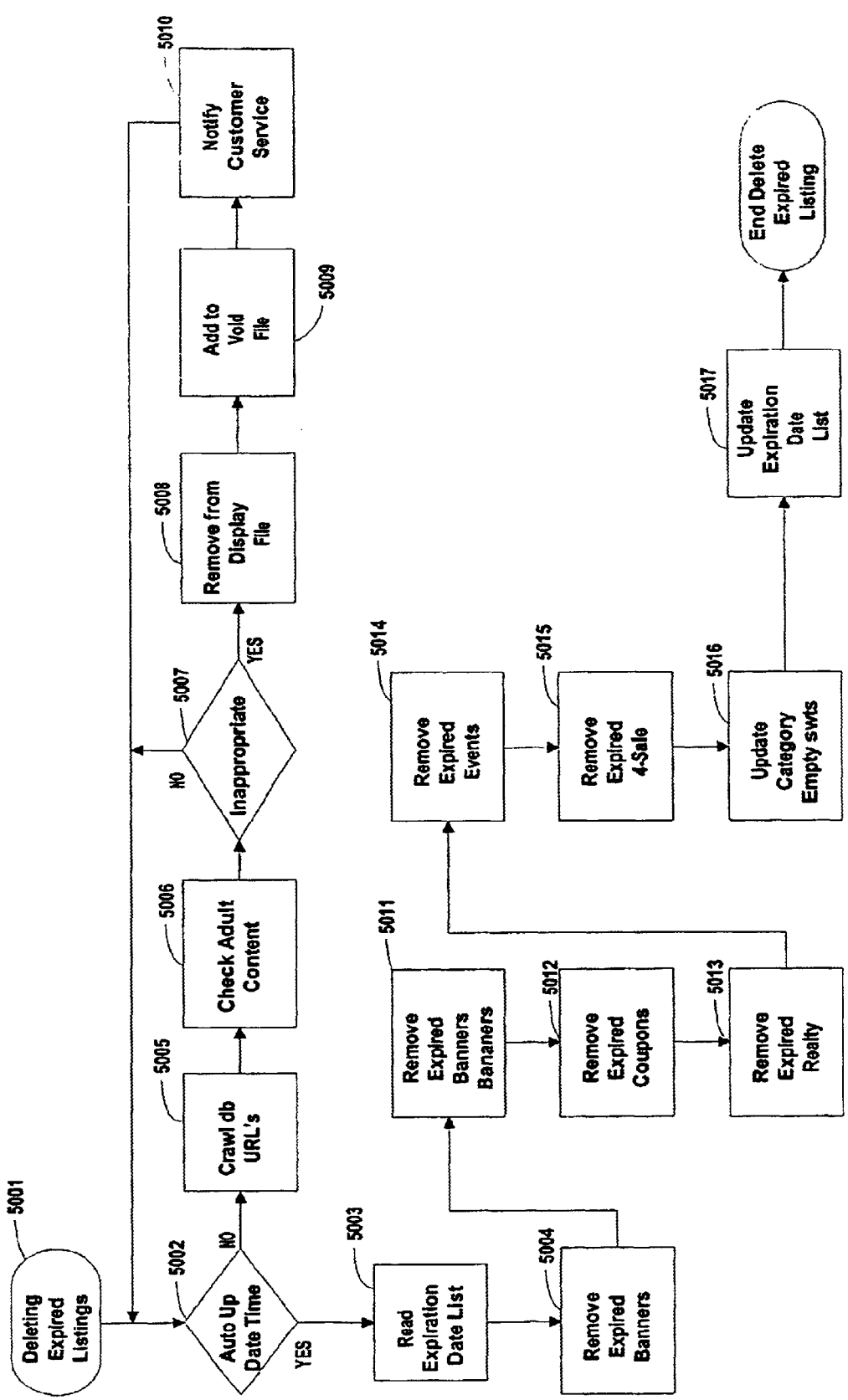
FIG. 50 is a system flow diagram of the Expired Listings deletion operations.
Figure 51:
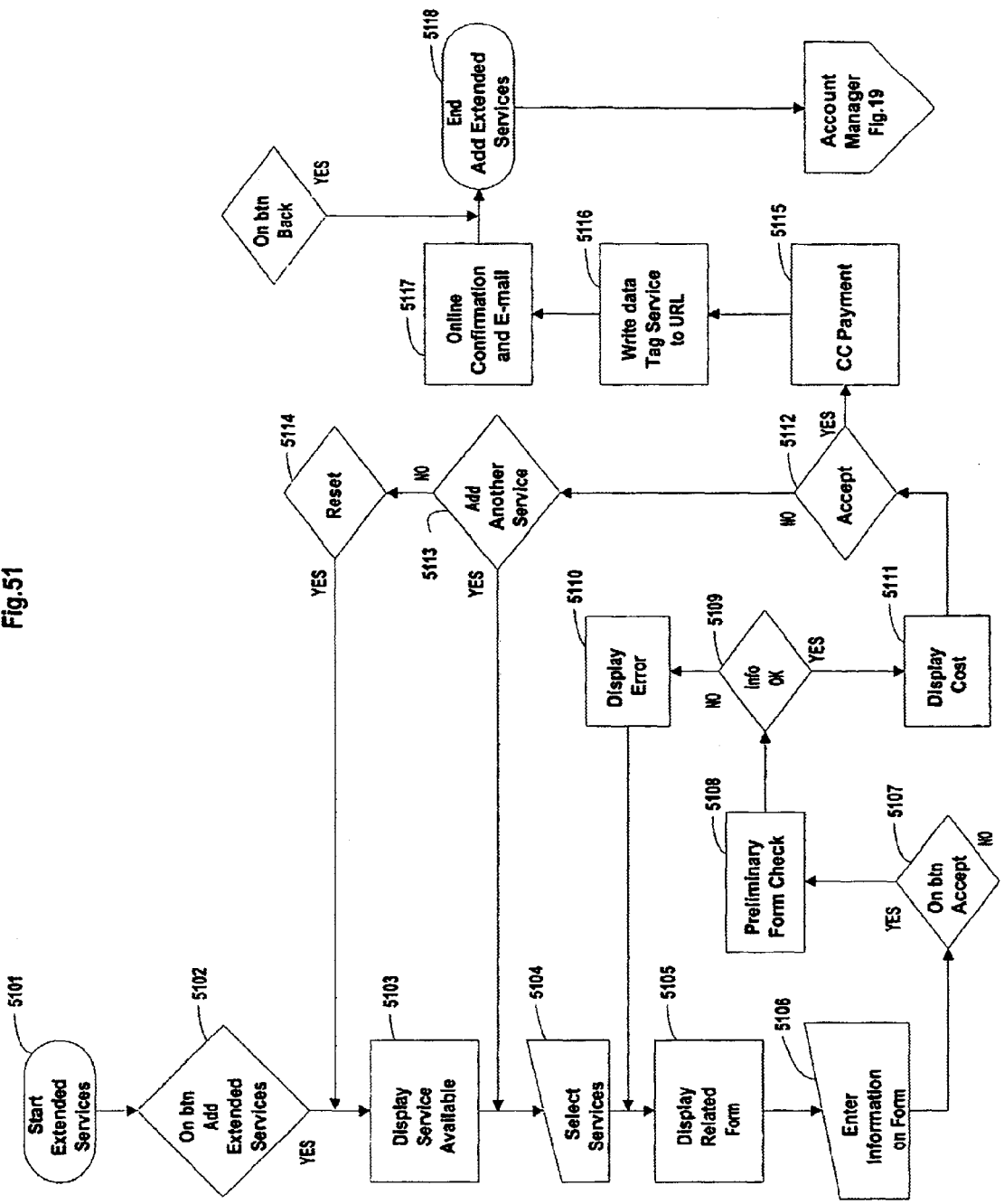
FIG. 51 is a system flow diagram of the Extended Services purchase operations.

As to an expired listing, automatic expirations occur daily. If categories of listings are rendered empty by removal of expired listings, the category buttons on a page such as FIG. 10B are made to appear dim or otherwise inactive and incapable as actuating a hyper-link, so that empty final categories cannot be selected. As shown in FIG. 50, deletion of expired listings 5001 commences with automatic updating of the date and time 5002. The database of URL's corresponding to listing is crawled 5005 and checked for adult content 5006. If found to be inappropriate 5007, the listing is removed from the display file 5008, added to the void file 5009 and customer service is notified 5010. If appropriate 5007, the expiration date list is read 5003 and expired banners removed 5004. Expired banners 5011 are then removed, as well as expired coupons 5012, expired reality listings 5013, expired events 5014, and expired 4 Sale listing 5015. Empty categories are then updated 5016 and the expiration date list is updated 5017.

Merchants can purchase Extended Services. Extended Services allow a static web site of a Merchant to be interactive with a choice of added services like: scheduling; credit card transactions; menus; fax orders; ticket sales and newsletters, among others. Extended Services 5101 starts by selecting the Extended Services button activating the link 5102. The available services are displayed 5103 and then selected 5104. The appropriate information form is displayed 5105 and the information is entered on the form 5106. If accepted 5107, the form is preliminarily checked 5108. If the information is correct 5109, the cost is displayed 5111. If not, an error message is shown 5110 and the process restarts. If the cost is accepted 5112, a credit card payment 5115 is made. If not, and another service is desired 5113, the selection process restarts. If no other service is desired, the process is reset 5114. After a credit card payment is made 5115, the data is then tagged 5116 and an online confirmation and email or fax 5117 is made, prior to ending the Add Extended services process 5118.

The Change Agent process 5201 is shown in FIG. 52. A request form 5202 is filled out. If the system is currently the Agent for the user, the new Agent is emailed a notice of the change 5204 and the user is returned to the Change Agent Page 5205. If the old Agent is not the system 5206, a cooling off delay period 5207 is provided before a change code is emailed to the Merchant with a URL 5208. If the Merchant has a URL 5209 and a change code is entered 5210 and an Agent Number is obtained 5211 from the Agent Number page. Upon return from the Agent Number Page 5212, the file is changed 5213. The old and new agents are then emailed as to the change 5214 and customer service is notified of the change 5215. The change is verified online 5216 and the Change Agent operation is ended 5217, enabling return to National Home Page 5218 or Account Manager 5219.

Figure 53:
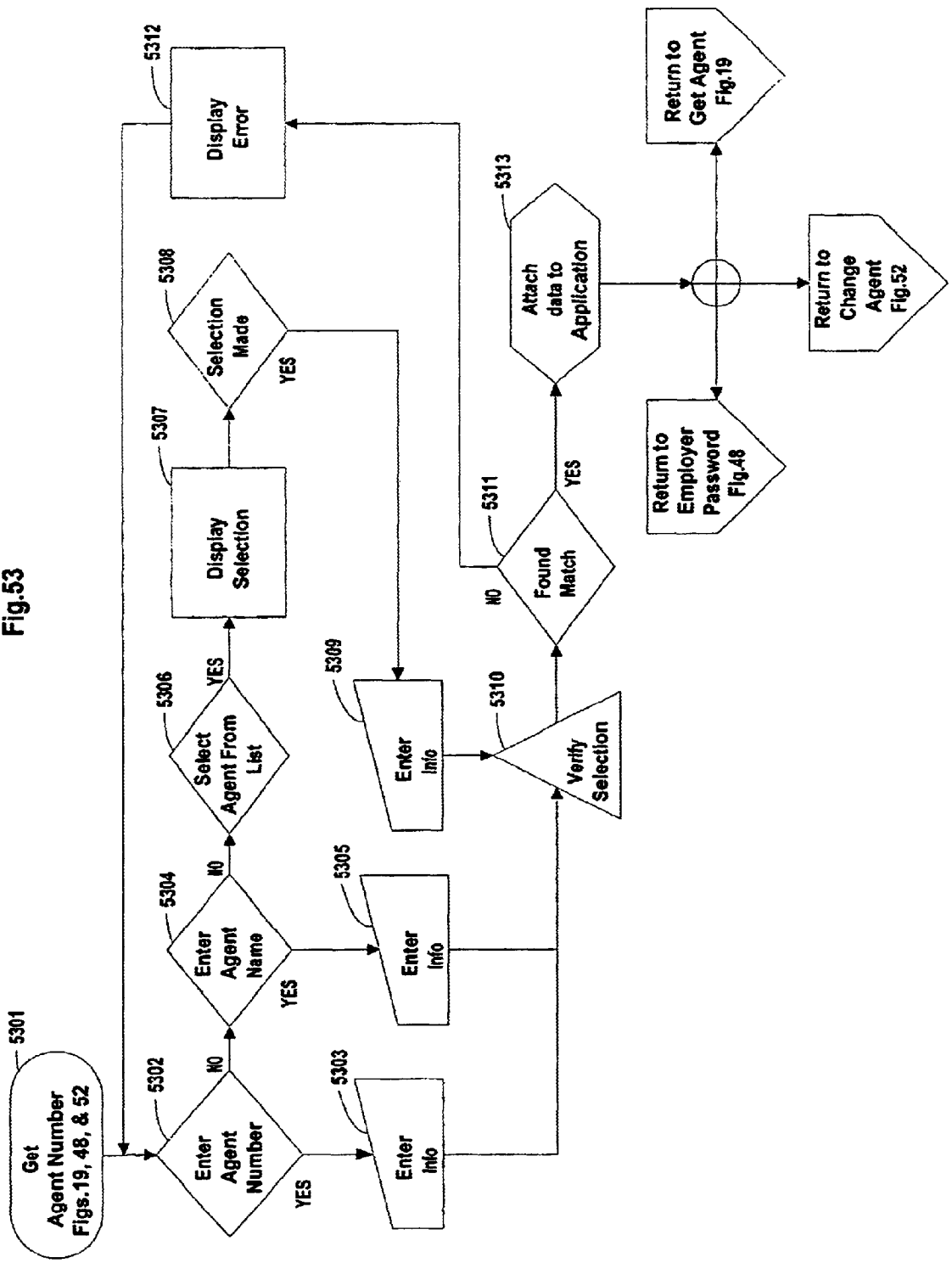
FIG. 53 is a system flow diagram of the Select Agent operations.

As shown in FIG. 53, Merchants and organizations can select their Agents from available web site developers. Otherwise the system is the default Agent. If a web site developer is designated as the Agent and meets the requirements for same within 30 days of the transactions on the system, that Agent will receive the commissions due from the Merchant's purchases pursuant to the commission structure set up in the system. An Agent Number is obtained 5301 and entered 5302. Otherwise, the agent name can be entered 5304 or selected from a list 5306. The selection is displayed 5307 and the selection is made 5308. The information is then entered 5303, 5305 and 5309. The selection is verified 5310 and if a match is found, the data is attached to the Application 5313 and the user can return to the Employer Password view, the Change Agent Page view or the return to get agent page. If not match is found 5311, then the error is displayed 5312 and the process restarts.

Accounting means are also provided as part of the system 10 for recording such financial matters are revenues generated, costs incurred, activity on the system 10 etc.

An online edit feature can be provided in order to block the display of inappropriate pictures. Every picture entered for classified, coupons, banners or any other video or pictures to be displayed by the system would have to review and review the pictures prior to display. The staff of reviewers or censors would view several pictures at a time on a video screen or the like, and would have the capability to pass, block or hold some or all of the pictures. Passed pictures could be anonymously passed to another reviewer or censor, so as reduce the risk of collusion or sabotage. The system will only display of the passed pictures, as opposed to those merely designated as new. Rejected pictures would be store. Fees collected with respect to the rejected pictures could be retained. A file containing the identification of those submitting rejected photos could be retained so that new applicants could be checked against this file. Law enforcement agencies would be contacted where appropriate.

The foregoing description and drawings merely explain and illustrate the invention, and the invention is not limited thereto, except as those skilled in the art, who have the disclosure before them will be able to make modifications and variations to the system without departing from the scope of the invention.

What is claimed is:

1. An on-line, interactive web site information system for increasing access to localized business and markets, the system having one of more functions for displaying advertising, information and business listings and referring users such as shoppers or merchants to the web sites of merchants listed with respect to certain localized geographic locations such as town and cities, and certain categories, comprising:

means for substantially automated creation and entry of said business listings and advertising by users of said system, wherein the users have direct access to modify, add or remove the advertising information and/or business listings;

means for substantially automated selection by said merchants of said categories and said localized geographic locations wherein said advertising, information and/or business listings will appear so as to enable geographic targeting of said users of said system and to allow merchants in the geographic areas to direct the advertising, information and/or business listings to localized geographic locations so as to provide greater exposure to said merchants within the localized geographic locations;

means for displaying said advertising, information and/or business listings for a duration of time based on said selected categories and said localized geographic locations;

means for viewing said advertising, information and/or business listings based on the selection by the user of at least one of said localized geographic locations and at least one of said categories in which the merchant advertisements, business listings and/or information is displayed;

means for linking said advertising, business listings and/or information to the web pages of others;

at least one-hyper link corresponding to a category to link users to the web site of at least one merchant;

means for building databases from the information provided by users of the system;

means for recording and providing account review information to users of the system;

means for users to access the system to add and delete said information, business listings and advertisements for display on the system;

extended services means;

means for recording statistics about usage of the system;

marketing analysis means for monitoring activity among the various functions of the system; and means for generating revenue through the selection by the merchants of one or more of said functions.

2. The invention according to claim 1 wherein said system further comprises accounting means for keeping track of the revenues generated by the system and any commissions owed to others.

3. The invention according to claim 1 wherein said system further comprises means for substantially automated updating of said business listings, advertising and information.

4. The invention according to claim 1 wherein said system further includes means for substantially automated, on-line payment for said business listings, information and advertising.

5. The invention according to claim 1 wherein said system further comprises means for substantially automated display of coupons for a selected time period.

6. The invention according claim 5 wherein said coupons automatically stop being displayed upon the expiration of said time period.

7. The invention according to claim 1 wherein said system further comprises means for substantially automated display of advertising for a selected time period.

8. The invention according to claim 7 wherein said advertising automatically stops being displayed upon the expiration of said time period.

9. The invention according to claim 1 wherein said system further comprises providing different levels of passwords to different users of the system.

10. The invention according to claim 1 wherein said hyper-link comprises an area simulating the appearance of a button that can be selected.

11. The invention according to claim 10 wherein said hyper-link further appears to be lit up when links to business web pages exist for said category.

12. The invention according to claim 1 wherein said hyper-link further comprises means for indicating that there are no links to business web pages in a given category.

13. The invention according to claim 12 wherein said means for indicating that there are no links web pages in a given category comprises an area having the appearance of a darkened button.

14. The system of claim 1 wherein the creation and entry of said business listings and advertising by users of said system occurs in real time.

15. An on-line, interactive web site information system having one of more functions for displaying advertising, information and business listings and referring users such as shoppers or merchants to the web sites of merchants listed with respect to certain localized geographic locations such as towns and cities, and certain categories comprising:

means for substantially automated creation of said business listings and advertising by users of said system;

means for substantially automated selection by said merchant of said categories and said geographic locations wherein said advertising, information and/or business listings will appear so as to enable geographic targeting of said users of said system and to allow merchants in the geographic locations to direct the advertising, information and/or business listings to localized geographic locations so as to provide greater exposure to said merchants within the localized geographic locations;

means for displaying said advertising, information and/or business listings;

means for viewing said advertising, information and/or business listings based on the selection by the user of at least one of said geographic locations and at least one of said categories in which the merchant advertisements, business listings and/or information is displayed;

means for lining said advertising, business listings and/or information to the web pages of others;

at least one-hyper link corresponding to a category to link users to the web site of at least one merchant;

means for building databases from the information provided by users of the system;

means for recording and providing account review information to users of the system;

means for users to add and delete said information, business listings and advertisements for display on the system;

means for selecting the towns and categories in which to display said advertising business listings and information;

extended services means;

means for recording statistics about usage of the system;

marketing analysis means for monitoring activity among the various functions of the system;

means for generating revenue from said usage of said system comprising:
  fees from merchants for listing their web sites in specific geographic locations;
  fees from banner ads displayed in specific geographic locations;
  fees from coupons made available in specific geographic locations;
  fees from for sale listings displayed in specific geographic locations; and
  fees from extended service; and accounting means for keeping track of the revenue created by the system and any commissions owed to others.

16. The invention according to claim 15 wherein said for sale listings further include means to offer items for sale on a best offer basis.

17. The invention according to claim 15 wherein said system further comprises providing different levels of passwords to different users of the system.

18. The invention according to claim 15 wherein said hyper-link comprises an area simulating the appearance of a button that can be selected.

19. The invention according to claim 18 wherein said hyper-link further appears to be lit up when links to business web pages exist for said category.

20. The invention according to claim 15 wherein said hyper-link further comprises means for indicating that there are no links to business web pages in a given category.

21. An on-line, interactive web site information system for increasing access to localized business and markets, the system allowing information to be inputted by merchants and other users and accessed by consumers based on selected localized geographic areas and topical categories, the system comprising:
  one or more Internet web pages having information organized into a hierarchy of geographic areas that allows the merchants and consumers to select from a plurality of topical categories in a plurality of localized geographic areas to input or view localized information, wherein merchants in the localized geographic areas may direct the information to localized markets so as to provide greater exposure to the merchants within the localized geographic areas;
  a web server for displaying the one or more Internet web pages;
  means for the merchants to input the information into the system for viewing by the consumers on the one or more Internet web pages using a substantially automated process, wherein the means for inputting the information comprises means for selecting the localized geographic areas and topical categories to list and/or display the information, and wherein the merchant has direct access to modify, add or remove the information;
  means for the consumers to select at least one of the topical categories in at least one of the plurality of localized geographic areas;
  means for displaying the information to the consumers based on the selected at least one of the topical categories in the at least one of the plurality of localized geographic areas;
  means for monitoring usage of the system;
  means for providing statistics regarding the usage of the system; and
  means for generating revenue based on the information inputted by the merchants.

22. The system of claim 21, wherein the information includes business advertising.

23. The system of claim 21, wherein the information includes coupons.

24. The system of claim 23, wherein the coupons are of limited duration.

25. The system of claim 21 which further comprises means for calculating fees based on the usage of the system.

26. The system of claim 21 which further comprises means to limit access to the information.

27. The system of claim 26 wherein the limiting means comprises a password required to access the information.

28. The system of claim 21, wherein the information includes job postings.

29. The system of claim 21 which further comprises means for providing extended services.

30. The system of claim 29 wherein the extended services include allowing commercial transactions.

31. The system of claim 21 wherein the at least one of the plurality of localized geographic areas is selected by town name.

32. The system of claim 21 wherein the at least one of the plurality of localized geographic areas is selected by zip code.

33. The system of claim 21 which further comprises means for the consumers to directly contact the merchants.

34. The system of claim 21 which further comprises means to allow for commercial transactions between the merchants and the consumers.

35. The system of claim 21 which further comprises means for the consumers to list items for sale, wherein the consumers select at least one topical category and at least one localized geographic area in which to list the items.

36. The system of claim 21 which further comprises hyperlinks to allow the consumers to access websites of the merchants.

37. The system of claim 21 wherein the means for the consumers to select at least one of the topical categories in at least one of the plurality of localized geographic areas comprises drill-down menus.

38. The system of claim 21 wherein the information comprises business listings.

39. The system of claim 21 wherein the inputting of the information into the system occurs in substantially real time.

40. A method for providing an on-line interactive web site for referring a consumer to one or more merchants or other users and for increasing access to localized business and markets, the method comprising the steps of:
  providing one or more pages containing information organized into a hierarchy of geographic areas that allows the merchants and consumers to select from at least one topical category in a plurality of localized geographic areas to input or view localized information, wherein merchants in the localized geographic areas may direct the information to localized markets so as to provide greater exposure to the merchants within the localized geographic areas;

providing means for the one or more merchants to connect to at least one web page of the one or more web pages;

allowing the one or more merchants to select at least one of the localized geographic areas and at least one of the topical categories to list or display information pertaining to the one or more merchants;

allowing the one or more merchants to input information into the system for viewing by the consumers on the one or more web pages through a substantially automated process, wherein the information is accessible on the one or more web pages under the localized geographic areas and topical categories selected by the one or more merchants, and wherein the merchant has direct access to modify, add or remove the information;

connecting the consumer to the one or more web pages;

allowing the consumer to select at least one topical category from at least one localized geographic area;

displaying the merchant information in response to the geographic area and topical category selected by the consumer;

monitoring the information that is accessed;

providing statistics regarding the information accessed; and generating revenue based on the information that is inputted by the merchants.

41. The method of claim 40 wherein the method further comprises the step of calculating fees based on the information accessed.

42. The method of claim 40 wherein the method further comprises the step of providing extended services.

43. The method of claim 42 wherein the step of providing extended services comprises providing commercial transactions between the merchants and the consumers.

44. The method of claim 40 wherein the method further comprises the step of prompting for a password to access the information.

45. The method of claim 40 wherein the information includes at least one coupon.

46. The method of claim 45 which further comprises the step of providing a set time period for the at least one coupon to be listed on at least one of the series of web pages, wherein the at least one coupon will automatically expire upon expiration of the set time period.

47. The method of claim 40 which further comprises the step of generating revenue from the one or more merchants for listing the merchant information in the hierarchy of geographic areas and topical categories.

48. The method of claim 40 which further comprises the step of providing means for the one or more merchants to update or edit the merchant information.

49. The method of claim 40 which further comprises the step of providing means for the consumers to access web-sites of the one or more merchants.

50. The method of claim 40 wherein the geographic areas and topical categories are provided in drill-down menus.

51. The method of claim 40 wherein the inputting of the information occurs in real time.

52. The method of claim 40 wherein the information comprises business listings.

53. An on-line, interactive web site information system for allowing information to be inputted by merchants and other users and accessed by consumers based on localized geographic areas and topical categories, the system comprising:

one or more Internet web pages having information organized into a hierarchy of geographic areas, wherein the geographic areas include a plurality of localized geographic areas organized into a plurality of topical categories;

a web server for displaying the one or more Internet web pages;

means for the merchants to input the information onto the one or more Internet web pages through a substantially automated process, wherein the means for inputting the information comprises means for selecting the geographic areas and topical categories to list and/or display the information, wherein merchants in the localized geographic areas may direct the information to localized markets so as to provide greater exposure to the merchants within the localized geographic areas;

means for the consumers to select at least one of the topical categories in at least one of the plurality of localized geographic areas;

means for displaying the information to the consumer based on the selected at least one of the topical categories in the at least one of the plurality of localized geographic areas;

means for monitoring usage of the system;

means for providing statistics regarding the usage of the system; and means for generating revenue based on the information inputted by the merchants comprising:

fees from merchants for listing their web sites in the localized geographic areas; and fees from coupons made available in the localized geographic areas.

54. The system of claim 53 wherein the means for the consumers to select at least one of the topical categories in at least one of the plurality of localized geographic areas comprises drill-down menus.

55. The system of claim 53 wherein the information comprises business listings.

* * * * *

(12) EX PARTE REEXAMINATION CERTIFICATE (10002nd)

United States Patent
Rinebold et al.

(10) Number: US 6,968,513 C1
(45) Certificate Issued: Jan. 9, 2014

(54) ON-LINE LOCALIZED BUSINESS REFERRAL SYSTEM AND REVENUE GENERATION SYSTEM

(75) Inventors: Walter A. Rinebold, Addison, IL (US); Robert G. Deeds, Jr., Villa Park, IL (US)

(73) Assignee: ShopNTown, LLC, Lombard, IL (US)

Reexamination Request:
No. 90/009,477, Jun. 3, 2009

Reexamination Certificate for:
Patent No.: 6,968,513
Issued: Nov. 22, 2005
Appl. No.: 09/527,734
Filed: Mar. 17, 2000

Related U.S. Application Data

(60) Provisional application No. 60/124,966, filed on Mar. 18, 1999.

(51) Int. Cl.
*G06F 13/00* (2006.01)
*G06F 1/00* (2006.01)
(52) U.S. Cl.
USPC .......................................... 715/854; 715/743

(58) Field of Classification Search
None
See application file for complete search history.

(56) References Cited

To view the complete listing of prior art documents cited during the proceeding for Reexamination Control Number 90/009,477, please refer to the USPTO's public Patent Application Information Retrieval (PAIR) system under the Display References tab.

*Primary Examiner* — Samuel Rimell

(57) ABSTRACT

An online interactive system comprising a business referral and income generation system linked to one or more listed web sites of businesses in a particular locality or geographical area. Revenue is generated by way of such methods as: Merchants listing their web sites in one or more web site directories for multiple communities; banner ads; local and national coupons issued by merchants; classified job listings; classified realty listings; "4 Sale" ads; and fees for supplemental services called "Extended Services" serving to provide interactive capabilities to static web sites. The system enables quicker and substantially automated and on-line self-posting, design, selection, updating and payment for listings, ads and coupons, among other things.

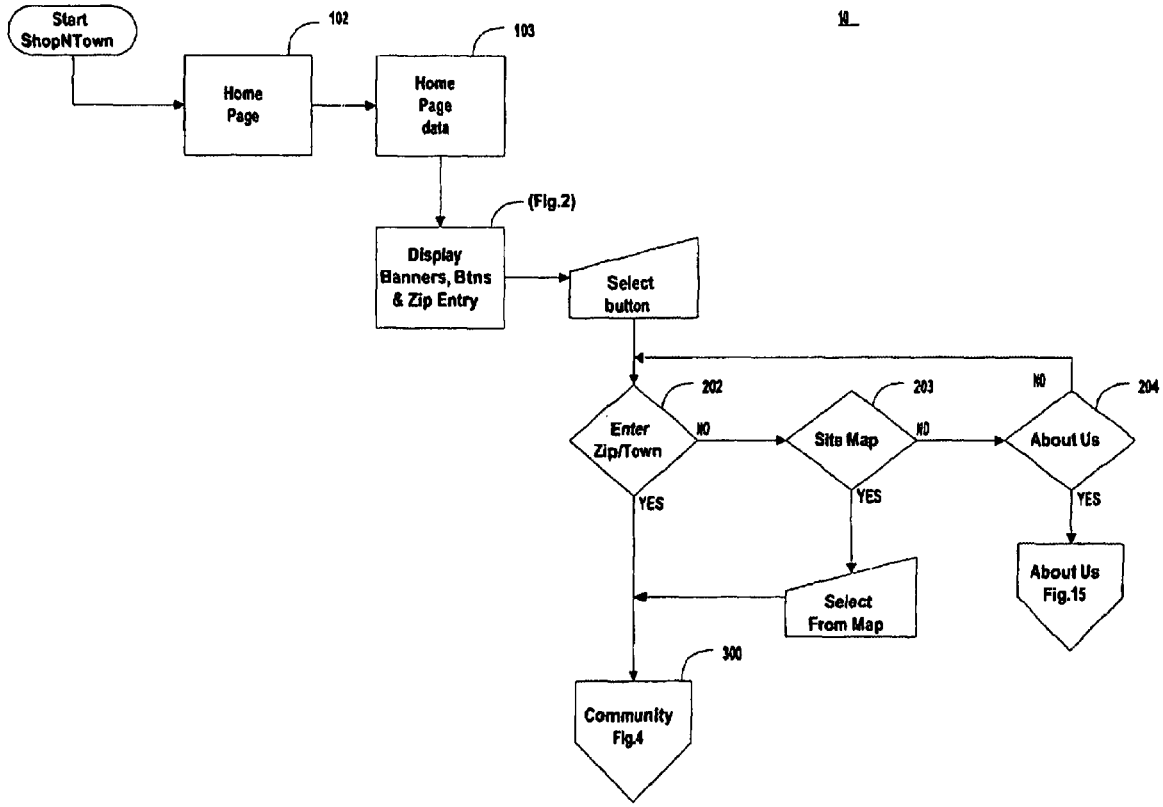

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 40-44, 47-48 and 50-52 are cancelled.

Claims 1-39, 45-46, 49 and 53-55 were not reexamined.

\* \* \* \* \*